US012739436B2

(12) United States Patent
Jung et al.

(10) Patent No.: US 12,739,436 B2
(45) Date of Patent: Sep. 15, 2026

(54) VIDEO SIGNAL PROCESSING METHOD AND APPARATUS USING MULTIPLE TRANSFORM KERNEL

(71) Applicant: SAMSUNG ELECTRONICS CO., LTD., Suwon-si (KR)

(72) Inventors: Jaehong Jung, Seoul (KR); Juhyung Son, Uiwang-si (KR); Dongcheol Kim, Suwon-si (KR); Geonjung Ko, Seoul (KR); Jinsam Kwak, Uiwang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/215,010

(22) Filed: May 21, 2025

(65) Prior Publication Data

US 2025/0287042 A1 Sep. 11, 2025

Related U.S. Application Data

(63) Continuation of application No. 17/868,724, filed on Jul. 19, 2022, now Pat. No. 12,335,526, which is a (Continued)

(30) Foreign Application Priority Data

Apr. 23, 2019 (KR) ........................ 10-2019-0047006
Sep. 21, 2019 (KR) ........................ 10-2019-0116474

(51) Int. Cl.
*H04N 19/625* (2014.01)
*G06T 9/00* (2006.01)

(Continued)

(52) U.S. Cl.
CPC ........... *H04N 19/625* (2014.11); *G06T 9/004* (2013.01); *G06T 9/007* (2013.01); *H04N 19/159* (2014.11);

(Continued)

(58) Field of Classification Search
CPC .. H04N 19/625; H04N 19/159; H04N 19/176; H04N 19/61; H04N 19/70;

(Continued)

(56) References Cited

U.S. PATENT DOCUMENTS 11,284,097 B2 * 3/2022 Kim ........................ H04N 19/12
2019/0387241 A1 * 12/2019 Kim ........................ H04N 19/12

(Continued)

FOREIGN PATENT DOCUMENTS

KR 10-1640973 B1 7/2016
KR 10-2018-0001485 A 1/2018

(Continued)

OTHER PUBLICATIONS

Office Action dated Oct. 23, 2024, issued by Korean Patent Office in Korean Patent Application No. 10-2021-7017617.

(Continued)

*Primary Examiner* — Richard T Torrente
(74) *Attorney, Agent, or Firm* — Sughrue Mion, PLLC

(57) ABSTRACT

A video signal processing method may comprise the steps of: confirming a prediction mode applied to a current coding unit; confirming whether a plurality of preset conditions are satisfied on the basis of at least one of the prediction mode of the current coding unit and a size of the current coding unit; parsing a first syntax element indicating a transform kernel applied to a transform unit included in the current coding unit when the plurality of preset conditions are satisfied; determining a transform kernel applied to horizontal and vertical directions of the current transform unit on the basis of the first syntax element; and generating a residual signal of the current transform unit by performing an inverse transform on the current transform unit using the determined transform kernel.

3 Claims, 21 Drawing Sheets

Related U.S. Application Data continuation of application No. 17/348,260, filed on Jun. 15, 2021, now Pat. No. 11,432,013, which is a continuation of application No. PCT/KR2020/005402, filed on Apr. 23, 2020.

(51) Int. Cl.

| | |
|---|---|
| ***H04N 19/159*** | (2014.01) |
| ***H04N 19/176*** | (2014.01) |
| ***H04N 19/61*** | (2014.01) |
| ***H04N 19/70*** | (2014.01) |

(52) U.S. Cl.

CPC .......... *H04N 19/176* (2014.11); *H04N 19/61* (2014.11); *H04N 19/70* (2014.11)

(58) Field of Classification Search

CPC ...... H04N 19/12; H04N 19/11; H04N 19/119; H04N 19/132; H04N 19/136; H04N 19/186

See application file for complete search history.

(56) References Cited

U.S. PATENT DOCUMENTS

| | | | | |
|---|---|---|---|---|
| 2020/0177901 | A1* | 6/2020 | Choi | H04N 19/176 |
| 2021/0211729 | A1* | 7/2021 | Koo | H04N 19/18 |
| 2021/0235119 | A1* | 7/2021 | Kim | H04N 19/157 |
| 2021/0377525 | A1* | 12/2021 | Lim | H04N 19/119 |
| 2024/0292014 | A1 | 8/2024 | Choi et al. | |

FOREIGN PATENT DOCUMENTS

| | | | |
|---|---|---|---|
| KR | 10-2018-0085526 | A | 7/2018 |
| KR | 10-2019-0027815 | A | 3/2019 |
| WO | 2019/009584 | A1 | 1/2019 |

OTHER PUBLICATIONS

Bross et al., "Versatile Video Coding (Draft 4)", Joint Video Experts Team (JVET) of ITU-T SG 16 WP 3 and ISO/IEC JTC 1/SC 29/WG 11, 2019, 254 total pages.

Notice of Allowance for U.S. Appl. No. 17/348,260 from the USPTO dated Apr. 14, 2022.

Corrected Notice of Allowability for U.S. Appl. No. 17/348,260 from the USPTO dated Jul. 11, 2022.

International Search Report of International application No. PCT/KR2020/005402. Aug. 14, 2020.

Written Opinion of International application No. PCT/KR2020/005402. Aug. 14, 2020.

U.S. Appl. No. 17/868,724, filed Jul. 19, 2022.

U.S. Appl. No. 17/348,260, filed Jun. 16, 2021.

* cited by examiner

| Transform Type | Basis function $T_i(j)$, $i, j=0, 1, \ldots, N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ where $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$, where $\omega_0 = \begin{cases} \sqrt{\frac{2}{N}} & i = 0 \\ 1 & i \neq 0 \end{cases}, \omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

| Transform Type | Basis function $T_i(j)$, $i, j=0, 1, \ldots, N-1$ |
|---|---|
| DCT-IV | $T_i(j) = \sqrt{\frac{2}{N}} \cdot \cos\left(\frac{\pi \cdot (2i+1) \cdot (2j+1)}{4N}\right)$ |
| DST-IV | $T_i(j) = \sqrt{\frac{2}{N}} \cdot \sin\left(\frac{\pi \cdot (2i+1) \cdot (2j+1)}{4N}\right)$ |

(b)

(a)

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |
| Intra Mode | 18 | 19 | 20 | 21 | 22 | 23 | 24 | 25 | 26 | 27 | 28 | 29 | 30 | 31 | 32 | 33 | 34 | |
| V | 0 | 0 | 0 | 0 | 0 | 1 | 0 | 1 | 0 | 1 | 0 | 1 | 0 | 1 | 0 | 1 | 0 | |
| H | 2 | 2 | 2 | 2 | 2 | 1 | 0 | 1 | 0 | 1 | 0 | 1 | 0 | 1 | 0 | 1 | 0 | |
| Intra Mode | 35 | 36 | 37 | 38 | 39 | 40 | 41 | 42 | 43 | 44 | 45 | 46 | 47 | 48 | 49 | 50 | 51 | 52 |
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |
| Intra Mode | 53 | 54 | 55 | 56 | 57 | 58 | 59 | 60 | 61 | 62 | 63 | 64 | 65 | 66 | | | | |
| V | 2 | 2 | 1 | 0 | 1 | 0 | 1 | 0 | 1 | 0 | 1 | 0 | 1 | 0 | | | | |
| H | 0 | 0 | 1 | 0 | 1 | 0 | 1 | 0 | 1 | 0 | 1 | 0 | 1 | 0 | | | | |

(b)

| Transform Set | Transform Candidates |
|---|---|
| 0 | DST-VII, DCT-VIII |
| 1 | DST-VII, DST-I |
| 2 | DST-VII, DCT-V |

(c)

| Transform Set | Transform Candidates |
|---|---|
| 0 | DCT-VIII, DST-VII |

| tu_mts_idx[x0][y0] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

(b)

| Index | Transform kernel |
|---|---|
| 0 | DCT-II |
| 1 | DST-VII |
| 2 | DCT-VIII |

*FIG. 14*

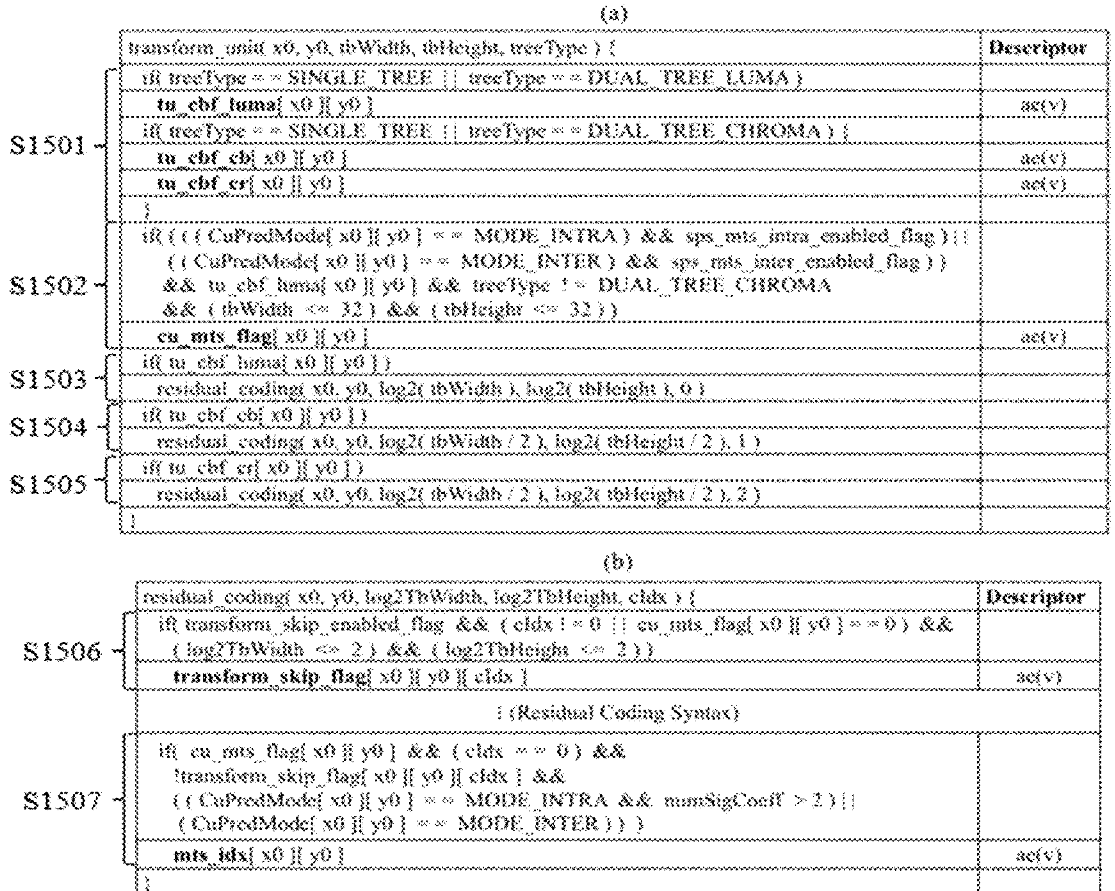

(a)

| transform_unit( x0, y0, tbWidth, tbHeight, treeType ) { | Descriptor |
|---|---|
| if( treeType = = SINGLE_TREE \|\| treeType = = DUAL_TREE_LUMA ) | |
| **tu_cbf_luma**[ x0 ][ y0 ] | ae(v) |
| if( treeType = = SINGLE_TREE \|\| treeType = = DUAL_TREE_CHROMA ) { | |
| **tu_cbf_cb**[ x0 ][ y0 ] | ae(v) |
| **tu_cbf_cr**[ x0 ][ y0 ] | ae(v) |
| } | |
| if( ( ( CuPredMode[ x0 ][ y0 ] = = MODE_INTRA ) && sps_mts_intra_enabled_flag ) \|\| ( ( CuPredMode[ x0 ][ y0 ] = = MODE_INTER ) && sps_mts_inter_enabled_flag ) ) && tu_cbf_luma[ x0 ][ y0 ] && treeType != DUAL_TREE_CHROMA && ( tbWidth <= 32 ) && ( tbHeight <= 32 ) ) | |
| **cu_mts_flag**[ x0 ][ y0 ] | ae(v) |
| if( tu_cbf_luma[ x0 ][ y0 ] ) | |
| residual_coding( x0, y0, log2( tbWidth ), log2( tbHeight ), 0 ) | |
| if( tu_cbf_cb[ x0 ][ y0 ] ) | |
| residual_coding( x0, y0, log2( tbWidth / 2 ), log2( tbHeight / 2 ), 1 ) | |
| if( tu_cbf_cr[ x0 ][ y0 ] ) | |
| residual_coding( x0, y0, log2( tbWidth / 2 ), log2( tbHeight / 2 ), 2 ) | |
| } | |

(b)

| residual_coding( x0, y0, log2TbWidth, log2TbHeight, cIdx ) { | Descriptor |
|---|---|
| if( transform_skip_enabled_flag && ( cIdx ! = 0 \|\| cu_mts_flag[ x0 ][ y0 ] = = 0 ) && ( log2TbWidth <= 2 ) && ( log2TbHeight <= 2 ) ) | |
| **transform_skip_flag**[ x0 ][ y0 ][ cIdx ] | ae(v) |
| : (Residual Coding Syntax) | |
| if( cu_mts_flag[ x0 ][ y0 ] && ( cIdx = = 0 ) && !transform_skip_flag[ x0 ][ y0 ][ cIdx ] && ( ( CuPredMode[ x0 ][ y0 ] = = MODE_INTRA && numSigCoeff > 2 ) \|\| ( CuPredMode[ x0 ][ y0 ] = = MODE_INTER ) ) ) | |
| **mts_idx**[ x0 ][ y0 ] | ae(v) |
| } | |

*FIG. 15*

| cu_mts_flag | mts_idx | Intra | | Inter | |
|---|---|---|---|---|---|
| | | Horizontal | Vertical | Horizontal | Vertical |
| 0 | -1 | DST7 if width < height, else DCT2 | DST7 if height < width, else DCT2 | DCT2 | |
| 1 | 0 | DST7 | DST7 | DST7 | DST7 |
| | 1 | DCT8 | DST7 | DCT8 | DST7 |
| | 2 | DST7 | DCT8 | DST7 | DCT8 |
| | 3 | DCT8 | DCT8 | DCT8 | DCT8 |

*FIG. 16*

| mts_idx[ xTbY ][ yTbY ][ cIdx ] | Binarization | trTypeHor | trTypeVer |
|---|---|---|---|
| −1 | - | 0 | 0 |
| 0 | 00 | 1 | 1 |
| 1 | 01 | 2 | 1 |
| 2 | 10 | 1 | 2 |
| 3 | 11 | 2 | 2 |

| transform_unit( x0, y0, tbWidth, tbHeight, treeType ) { | Descriptor |
|---|---|
| if( treeType = = SINGLE_TREE \|\| treeType = = DUAL_TREE_LUMA ) | |
| **tu_cbf_luma**[ x0 ][ y0 ] | ae(v) |
| if( treeType = = SINGLE_TREE \|\| treeType = = DUAL_TREE_CHROMA ) { | |
| **tu_cbf_cb**[ x0 ][ y0 ] | ae(v) |
| **tu_cbf_cr**[ x0 ][ y0 ] | ae(v) |
| } | |
| ⋮ | |
| if( MaxMtsIdx > 0 && tu_cbf_luma[ x0 ][ y0 ] && treeType != DUAL_TREE_CHROMA && ( tbWidth <= 32 ) && ( tbHeight <= 32 ) ) | |
| **tu_mts_idx**[ x0 ][ y0 ] | ae(v) |
| if( tu_cbf_luma[ x0 ][ y0 ] ) | |
| residual_coding( x0, y0, log2( tbWidth ), log2( tbHeight ), 0 ) | |
| if( tu_cbf_cb[ x0 ][ y0 ] ) | |
| residual_coding( x0, y0, log2( tbWidth / 2 ), log2( tbHeight / 2 ), 1 ) | |
| if( tu_cbf_cr[ x0 ][ y0 ] ) | |
| residual_coding( x0, y0, log2( tbWidth / 2 ), log2( tbHeight / 2 ), 2 ) | |
| } | |

S1801

(b)

| residual_coding( x0, y0, log2TbWidth, log2TbHeight, cIdx ) { | Descriptor |
|---|---|
| ⋮ (Residual Coding Syntax) | |
| } | |

*FIG. 18*

(a) Specification of MaxMtsIdx.

| MaxMtsIdx | CuPredMode[ x0 ][ y0 ] = = MODE_INTER && sps_mts_inter_enabled_flag | CuPredMode[ x0 ][ y0 ] = = MODE_INTRA && sps_mts_intra_enabled_flag | transform_skip_enabled_flag && ( log2TbWidth <= MaxTsSize && log2TbHeight <= MaxTsSize ) |
|---|---|---|---|
| 0 | 0 | 0 | 0 |
| 1 | 0 | 0 | 1 |
| 4 | 0 | 1 | 0 |
| 4 | 1 | 0 | 0 |
| 5 | 0 | 1 | 1 |
| 5 | 1 | 0 | 1 |

(b) Specification of TrHorType and TrVerType depending on tu_mts_idx[ x0 ][ y0 ]

| tu_mts_idx[ x0 ][ y0 ] | | | TrHorType | TrVerType | IsTrafoSkip |
|---|---|---|---|---|---|
| MaxMtsIdx = = 1 | MaxMtsIdx = = 4 | MaxMtsIdx = = 5 | | | |
| 0 (0) | - | 0 (0) | −1 | −1 | 1 |
| 1 (1) | 0 (0) | 1 (10) | 0 | 0 | 0 |
| - | 1 (10) | 2 (110) | 1 | 1 | 0 |
| - | 2 (110) | 3 (1110) | 2 | 1 | 0 |
| - | 3 (1110) | 4 (11110) | 1 | 2 | 0 |
| - | 4 (1111) | 5 (11111) | 2 | 2 | 0 |

*FIG. 19*

Specification of trTypeHor and trTypeVer depending on predModeIntra

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | 1 | 1 |
| INTRA_DC INTRA_ANGULAR33, INTRA_ANGULAR35 | 0 | 0 |
| INTRA_ANGULAR2, INTRA_ANGULAR4,…,INTRA_ANGULAR28, INTRA_ANGULAR30, INTRA_ANGULAR39, INTRA_ANGULAR41,…,INTRA_ANGULAR63, INTRA_ANGULAR65 | 1 | 0 |
| INTRA_ANGULAR3, INTRA_ANGULAR5,…, INTRA_ANGULAR27, INTRA_ANGULAR29, INTRA_ANGULAR38, INTRA_ANGULAR40,…,INTRA_ANGULAR64, INTRA_ANGULAR66 | 0 | 1 |

| transform_unit( x0, y0, tbWidth, tbHeight, treeType, subTuIndex ) { | **Descriptor** |
|---|---|
| … | |
| S2301: if( tu_cbf_luma[ x0 ][ y0 ] && treeType != DUAL_TREE_CHROMA && ( tbWidth <= 32 ) && ( tbHeight <= 32 ) && ( IntraSubPartitionsSplitType[ x0 ][ y0 ] = = ISP_NO_SPLIT ) && ( !cu_sbt_flag ) ) { | |
| S2302: if( transform_skip_enabled_flag && tbWidth <= MaxTsSize && tbHeight <= MaxTsSize ) | |
| S2303: **transform_skip_flag**[ x0 ][ y0 ] | ae(v) |
| S2304: if( ( CuPredMode[ x0 ][ y0 ] != MODE_INTRA && sps_explicit_mts_inter_enabled_flag ) \|\| ( CuPredMode[ x0 ][ y0 ] = = MODE_INTRA && sps_explicit_mts_intra_enabled_flag )) && ( tbWidth <= 32 ) && ( tbHeight <= 32 ) && ( !transform_skip_flag[ x0 ][ y0 ] ) ) | |
| S2305: **tu_mts_idx**[ x0 ][ y0 ] | ae(v) |
| } | |
| … | |
| } | |

(b)

Specification of trTypeHor and trTypeVer depending on tu_mts_idx[ x ][ y ]

| **tu_mts_idx[ x0 ][ y0 ]** | **0 (0)** | **1 (10)** | **2 (110)** | **3 (1110)** | **4 (1111)** |
|---|---|---|---|---|---|
| trTypeHor | 0 | 1 | 2 | 1 | 2 |
| trTypeVer | 0 | 1 | 1 | 2 | 2 |

| seq_parameter_set_rbsp( ) { | Descriptor |
|---|---|
| ... | |
| **sps_mts_enabled_flag** (S2401) | u(1) |
| if( sps_mts_enabled_flag ) { (S2402) | |
| **sps_explicit_mts_intra_enabled_flag** | u(1) |
| **sps_explicit_mts_inter_enabled_flag** | u(1) |
| if( sps_explicit_mts_intra_enabled_flag \|\| sps_explicit_mts_inter_enabled_flag ) (S2403) | |
| **sps_log2_max_explicit_mts_size_minus2** | ue(v) |
| } | |
| ... | |
| } | |

(b)

| transform_unit( x0, y0, tbWidth, tbHeight, treeType, subTuIndex ) { | Descriptor |
|---|---|
| ... | |
| if( tu_cbf_luma[ x0 ][ y0 ] && treeType != DUAL_TREE_CHROMA && ( tbWidth <= 32 ) && ( tbHeight <= 32 ) && ( IntraSubPartitionsSplitType[ x0 ][ y0 ] = = ISP_NO_SPLIT ) && ( !cu_sbt_flag ) ) { | |
| if( transform_skip_enabled_flag && tbWidth <= MaxTsSize && tbHeight <= MaxTsSize ) | |
| **transform_skip_flag**[ x0 ][ y0 ] | ae(v) |
| if( ( CuPredMode[ x0 ][ y0 ] != MODE_INTRA && sps_explicit_mts_inter_enabled_flag ) \|\| ( CuPredMode[ x0 ][ y0 ] = = MODE_INTRA && sps_explicit_mts_intra_enabled_flag )) && ( tbWidth <= MaxMtsSize ) && ( tbHeight <= MaxMtsSize ) && ( !transform_skip_flag[ x0 ][ y0 ] ) ) | |
| **tu_mts_idx**[ x0 ][ y0 ] | ae(v) |
| } | |
| ... | |
| } | |

*FIG. 24*

| transform_unit( x0, y0, tbWidth, tbHeight, treeType, subTuIndex ) { | Descriptor |
|---|---|
| ... | |
| if( tu_cbf_luma[ x0 ][ y0 ] && treeType != DUAL_TREE_CHROMA && ( tbWidth <= 32 ) && ( tbHeight <= 32 ) && ( IntraSubPartitionsSplitType[ x0 ][ y0 ] = = ISP_NO_SPLIT ) && ( !cu_sbt_flag ) ) { | |
| if( transform_skip_enabled_flag && tbWidth <= MaxTsSize && tbHeight <= MaxTsSize ) | |
| **transform_skip_flag**[ x0 ][ y0 ] | ae(v) |
| if( (( CuPredMode[ x0 ][ y0 ] = = MODE_INTER && sps_explicit_mts_inter_enabled_flag ) \|\| ( CuPredMode[ x0 ][ y0 ] = = MODE_INTRA && sps_explicit_mts_intra_enabled_flag )) && ( tbWidth <= 32 ) && ( tbHeight <= 32 ) && ( !transform_skip_flag[ x0 ][ y0 ] ) ) (S2501) | |
| **tu_mts_idx**[ x0 ][ y0 ] | ae(v) |
| } | |
| ... | |
| } | |

*FIG. 25*

| transform_tree( x0, y0, tbWidth, tbHeight , treeType, chType ) { | Descriptor |
|---|---|
| InferTuCbfLuma = 1 | |
| if( IntraSubPartitionsSplitType = = ISP_NO_SPLIT && !cu_sbt_flag ) { | |
| if( tbWidth > MaxTbSizeY \|\| tbHeight > MaxTbSizeY ) { | |
| verSplitFirst = ( tbWidth > MaxTbSizeY && tbWidth > tbHeight ) ? 1 : 0 | |
| trafoWidth = verSplitFirst ? (tbWidth / 2) : tbWidth | |
| trafoHeight = !verSplitFirst ? (tbHeight / 2) : tbHeight | |
| transform_tree( x0, y0, trafoWidth, trafoHeight, chType ) | |
| if( verSplitFirst ) | |
| transform_tree( x0 + trafoWidth, y0, trafoWidth, trafoHeight, treeType, chType ) | |
| else | |
| transform_tree( x0, y0 + trafoHeight, trafoWidth, trafoHeight, treeType, chType ) | |
| } else { | |
| transform_unit( x0, y0, tbWidth, tbHeight, treeType, 0, chType ) | |
| } | |
| } else if( cu_sbt_flag ) { | |
| if( !cu_sbt_horizontal_flag ) { | |
| trafoWidth = tbWidth * SbtNumFourthsTb0 / 4 | |
| transform_unit( x0, y0, trafoWidth, tbHeight, treeType , 0, 0 ) | |
| transform_unit( x0 + trafoWidth, y0, tbWidth − trafoWidth, tbHeight, treeType, 1, 0 ) | |
| } else { | |
| trafoHeight = tbHeight * SbtNumFourthsTb0 / 4 | |
| transform_unit( x0, y0, tbWidth, trafoHeight, treeType , 0, 0 ) | |
| transform_unit( x0, y0 + trafoHeight, tbWidth, tbHeight − trafoHeight, treeType, 1, 0 ) | |
| } | |
| } else if( IntraSubPartitionsSplitType = = ISP_HOR_SPLIT ) { | |
| trafoHeight = tbHeight / NumIntraSubPartitions | |
| for( partIdx = 0; partIdx < NumIntraSubPartitions; partIdx++ ) | |
| transform_unit( x0, y0 + trafoHeight * partIdx, tbWidth, trafoHeight, treeType, partIdx, 0 ) | |
| } else if( IntraSubPartitionsSplitType = = ISP_VER_SPLIT ) { | |
| trafoWidth = tbWidth / NumIntraSubPartitions | |
| for( partIdx = 0; partIdx < NumIntraSubPartitions; partIdx++ ) | |
| transform_unit( x0 + trafoWidth * partIdx, y0, trafoWidth, tbHeight, treeType, partIdx, 0 ) | |
| } | |
| } | |

S2601 (labels the row: if( IntraSubPartitionsSplitType = = ISP_NO_SPLIT && !cu_sbt_flag ) {)

*FIG. 26*

| transform_unit( x0, y0, tbWidth, tbHeight, treeType, subTuIndex, chType ) { | Descriptor |
|---|---|
| ... | |
| S2701: if( tu_cbf_luma[ x0 ][ y0 ] && treeType != DUAL_TREE_CHROMA && ( tbWidth <= 32 ) && ( tbHeight <= 32 ) && ( IntraSubPartitionsSplit[ x0 ][ y0 ] = = ISP_NO_SPLIT ) && ( !cu_sbt_flag ) ) { | |
| S2702: if( sps_transform_skip_enabled_flag && !BdpcmFlag[ x0 ][ y0 ] && tbWidth <= MaxTsSize && tbHeight <= MaxTsSize ) | |
| S2703: **transform_skip_flag**[ x0 ][ y0 ] | ae(v) |
| S2704: if( ( ( CuPredMode[ chType ][ x0 ][ y0 ] = = MODE_INTER && sps_explicit_mts_inter_enabled_flag ) \|\| ( CuPredMode[ chType ][ x0 ][ y0 ] = = MODE_INTRA && sps_explicit_mts_intra_enabled_flag ) ) && ( !transform_skip_flag[ x0 ][ y0 ] ) ) | |
| S2705: **tu_mts_idx**[ x0 ][ y0 ] | ae(v) |
| } | |
| ... | |
| } | |

*FIG. 27*

| | transform_unit( x0, y0, tbWidth, tbHeight, treeType, subTuIndex, chType ) { | Descriptor |
|---|---|---|
| | ... | |
| S2801 | if( tu_cbf_luma[ x0 ][ y0 ] && treeType != DUAL_TREE_CHROMA && ( IntraSubPartitionsSplit[ x0 ][ y0 ] = = ISP_NO_SPLIT ) && ( !cu_sbt_flag ) ) { | |
| S2802 | if( sps_transform_skip_enabled_flag && !BdpcmFlag[ x0 ][ y0 ] && tbWidth <= MaxTsSize && tbHeight <= MaxTsSize ) | |
| S2803 | **transform_skip_flag**[ x0 ][ y0 ] | ae(v) |
| S2804 | if( ( ( CuPredMode[ chType ][ x0 ][ y0 ] = = MODE_INTER && sps_explicit_mts_inter_enabled_flag ) \|\| ( CuPredMode[ chType ][ x0 ][ y0 ] = = MODE_INTRA && sps_explicit_mts_intra_enabled_flag ) ) && ( !transform_skip_flag[ x0 ][ y0 ] ) && ( CbWidth[ chType ][ x0 ][ y0 ] <= 32 ) && ( CbHeight[ chType ][ x0 ][ y0 ] <= 32 ) ) | |
| S2805 | **tu_mts_idx**[ x0 ][ y0 ] | ae(v) |
| | } | |
| | ... | |
| | } | |

*FIG. 28*

| | transform_unit( x0, y0, tbWidth, tbHeight, treeType, subTuIndex, chType, trafoDepth ) { | Descriptor |
|---|---|---|
| | ... | |
| S2901 | if( tu_cbf_luma[ x0 ][ y0 ] && treeType != DUAL_TREE_CHROMA && ( tbWidth <= 32 ) && ( tbHeight <= 32 ) && ( IntraSubPartitionsSplit[ x0 ][ y0 ] = = ISP_NO_SPLIT ) && ( !cu_sbt_flag ) ) { | |
| S2902 | if( sps_transform_skip_enabled_flag && !BdpcmFlag[ x0 ][ y0 ] && tbWidth <= MaxTsSize && tbHeight <= MaxTsSize ) | |
| S2903 | **transform_skip_flag**[ x0 ][ y0 ] | ae(v) |
| S2904 | if( ( ( CuPredMode[ chType ][ x0 ][ y0 ] = = MODE_INTER && sps_explicit_mts_inter_enabled_flag ) \|\| ( CuPredMode[ chType ][ x0 ][ y0 ] = = MODE_INTRA && sps_explicit_mts_intra_enabled_flag ) ) && ( !transform_skip_flag[ x0 ][ y0 ] ) && ( trafoDepth = = 0 ) ) | |
| S2905 | **tu_mts_idx**[ x0 ][ y0 ] | ae(v) |
| | } | |
| | ... | |
| | } | |

*FIG. 29*

VIDEO SIGNAL PROCESSING METHOD AND APPARATUS USING MULTIPLE TRANSFORM KERNEL

CROSS-REFERENCE TO RELATED APPLICATIONS

This present application is a continuation of U.S. application Ser. No. 17/868,724 filed Jul. 19, 2022, which is a continuation of U.S. application Ser. No. 17/348,260, which was filed on Jun. 15, 2021, now U.S. Pat. No. 11,432,013 issued on Aug. 30, 2022, and which a continuation of PCT International Application No. PCT/KR2020/005402, which was filed on Apr. 23, 2020, and which claims priority to Korean Patent Application No. 10-2019-0047006 filed with the Korean Intellectual Property Office on Apr. 23, 2019, and Korean Patent Application No. 10-2019-0116474 filed with the Korean Intellectual Property Office on Sep. 21, 2019. The disclosures of the above patent applications are incorporated herein by reference in their entirety.

SUMMARY

1. Field

The present disclosure relates to a method and an apparatus for processing a video signal and, more particularly, to a video signal processing method and apparatus for encoding and decoding a video signal.

2. Description of Related Art

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

An aspect of the present disclosure is to increase coding efficiency of a video signal. Further, another aspect of the present disclosure is to increase signaling efficiency related to a motion information set of a current block.

In particular, an object of the present invention is to provide a method for efficiently determining a transform kernel for an intra block copy (IBC) mode. In addition, an object of the present invention is to provide a method for efficiently determining a transform kernel for an implicitly split transform unit on the basis of a luma maximum transform size.

SUMMARY

In order to solve the problems described above, the present invention provides the following video signal processing apparatus and video signal processing method.

According to an embodiment of the present invention, a method for processing a video signal further comprising: checking a prediction mode applied to a current coding unit; checking whether a plurality of preset conditions are satisfied on the basis of at least one of a prediction mode of the current coding unit or a size of the current coding unit; parsing when the plurality of preset conditions are satisfied, a first syntax element indicating a transform kernel applied to a transform unit included in the current coding unit; determining a transform kernel applied to horizontal and vertical directions of a current transform unit on the basis of the first syntax element; and generating a residual signal of the current transform unit by performing an inverse transform on the current transform unit using the determined transform kernel.

As an embodiment, when the plurality of preset conditions are not satisfied, the first syntax element may be inferred as 0.

As an embodiment, when the first syntax element is 0, the transform kernel applied to the horizontal and vertical directions of the current transform unit may be determined as a discrete cosine transform type-2 (DCT-2)-based transform kernel.

As an embodiment, a method for processing a video signal further comprising: obtaining, in a case of an intra mode, a second syntax element indicating whether or not a multiple transform selection (MTS) mode is able to be used in a current sequence, the MTS mode representing a mode in which transform is performed using a transform kernel selected from among a plurality of kernels; and obtaining, in a case of an inter mode, a third syntax element indicating whether or not the MTS mode is able to be used in the current sequence may be further included.

As an embodiment, the plurality of preset conditions may include whether or not the prediction mode of the current coding unit is the intra mode and the second syntax element is true, or the prediction mode of the current coding unit is the inter mode and the third syntax element is true.

As an embodiment, when the prediction mode of the current coding unit is an intra block copy mode, the plurality of preset conditions may be determined as being not satisfied regardless of the second syntax element and the third syntax element.

As an embodiment, the plurality of preset conditions may include whether or not a width and height of the current coding unit are less than or equal to 32.

As an embodiment, a method for processing a video signal further comprising: receiving information related to a luma maximum transform size of a current sequence may be further included, and the current coding unit, when at least one of the width and height of the current coding unit is greater than the luma maximum transform size, may be split into a plurality of transform units.

As an embodiment, the luma maximum transform size may be 32 or 64.

As an embodiment, when the current coding unit includes the plurality of transform units split on the basis of the luma maximum transform size, the plurality of preset conditions may be determined as being not satisfied.

According to an embodiment of the present invention, a video signal processing apparatus includes a processor, the processor is configured to check a prediction mode applied to a current coding unit, check whether a plurality of preset conditions are satisfied on the basis of at least one of a prediction mode of the current coding unit or a size of the current coding unit, parse, when the plurality of preset conditions are satisfied, a first syntax element indicating a transform kernel applied to a transform unit included in the current coding unit, determine a transform kernel applied to horizontal and vertical directions of a current transform unit on the basis of the first syntax element, and generate a residual signal of the current transform unit by performing an inverse transform on the current transform unit using the determined transform kernel.

As an embodiment, when the plurality of preset conditions are not satisfied, the first syntax element may be inferred as 0.

As an embodiment, when the first syntax element is 0, the transform kernel applied to the horizontal and vertical directions of the current transform unit may be determined as a discrete cosine transform type-2 (DCT-2)-based transform kernel.

As an embodiment, the processor may be configured to obtain, in a case of an intra mode, a second syntax element indicating whether or not a multiple transform selection (MTS) mode is able to be used in a current sequence, the MTS mode representing a mode in which transform is performed using a transform kernel selected from among a plurality of kernels, and obtain, in a case of an inter mode, a third syntax element indicating whether or not the MTS mode is able to be used in the current sequence.

As an embodiment, the plurality of preset conditions may include whether or not the prediction mode of the current coding unit is the intra mode and the second syntax element is true, or the prediction mode of the current coding unit is the inter mode and the third syntax element is true.

As an embodiment, when the prediction mode of the current coding unit is an intra block copy mode, the plurality of preset conditions may be determined as being not satisfied regardless of the second syntax element and the third syntax element.

As an embodiment, the plurality of preset conditions may include whether or not a width and height of the current coding unit are less than or equal to 32.

As an embodiment, the processor may be configured to receive information related to a luma maximum transform size of a current sequence, and the current coding unit, when at least one of the width and height of the current coding unit is greater than the luma maximum transform size, may be split into a plurality of transform units.

As an embodiment, the luma maximum transform size may be 32 or 64.

As an embodiment, when the current coding unit includes the plurality of transform units split on the basis of the luma maximum transform size, the plurality of preset conditions may be determined as being not satisfied.

According to an embodiment of the present invention, a method for processing a video signal comprising: checking a prediction mode applied to a current coding unit; checking whether a plurality of preset conditions are satisfied on the basis of at least one of a prediction mode of the current coding unit or a size of the current coding unit; encoding when the plurality of preset conditions are satisfied, a first syntax element indicating a transform kernel applied to a transform unit included in the current coding unit; determining a transform kernel applied to horizontal and vertical directions of a current transform unit on the basis of the first syntax element; and generating a transform block of the current transform unit by performing a transform on a residual signal of the current transform unit using the determined transform kernel.

According to an embodiment of the present invention, a non-transitory computer-readable medium that stores a computer-executable component configured to be executed on one or more processors of a computing device, the computer-executable component being configured to check a prediction mode applied to a current coding unit, check whether a plurality of preset conditions are satisfied on the basis of at least one of a prediction mode of the current coding unit or a size of the current coding unit, parse, when the plurality of preset conditions are satisfied, a first syntax element indicating a transform kernel applied to a transform unit included in the current coding unit, determine a transform kernel applied to horizontal and vertical directions of a current transform unit on the basis of the first syntax element, and generate a residual signal of the current transform unit by performing an inverse transform on the current transform unit using the determined transform kernel.

According to an embodiment of the present invention, coding efficiency of a video signal can be improved. In addition, according to an embodiment of the present invention, a transform kernel suitable for the current transform block can be selected.

According to an embodiment of the present invention, by efficiently determining a transform kernel for an intra block copy (IBC) mode, it is possible to increase compression efficiency and save signaling bits for determining a transform kernel. In addition, according to an embodiment of the present invention, by efficiently determining a transform kernel for a transform unit implicitly split on the basis of the luma maximum transform size, it is possible to increase compression efficiency and save signaling bits for determining a transform kernel.

BRIEF DESCRIPTION OF DRAWINGS

FIG. 10 is a diagram representing a basis function corresponding to each transform type.

FIG. 13 is a diagram representing a method of configuring a transform candidate set according to a prediction mode of a current block.

FIG. 14 represents a horizontal transform kernel and a vertical transform kernel determined according to a set index.

FIG. 15 is a diagram representing a method of obtaining transform-related information according to an embodiment of the present invention.

FIG. 16 is a diagram for describing a method of selecting a transform kernel on the basis of a shape of a block according to an embodiment of the present invention.

FIG. 17 is a diagram illustrating a method of signaling and determining a transform kernel according to an embodiment of the present invention.

FIG. 18 represents a syntax structure for obtaining information related to a multiple transform selection and transform skip according to an embodiment of the present invention, and FIG. 19 is a diagram illustrating information related to a multiple transform selection and transform skip according to an embodiment of the present invention.

FIG. 22 is a diagram illustrating a method of selecting, if the intra sub-partitions mode according to an embodiment of the present invention is applied, a transform kernel applied to a split transform unit.

FIG. 23 shows an example of a transform unit syntax structure and an example of a method of determining a transform type according to an embodiment to which the present invention is applied.

FIG. 24 is a diagram illustrating a structure of a high level syntax and a transform unit syntax according to an embodiment to which the present invention is applied.

FIG. 25 is a diagram illustrating a method of selecting, if IBC prediction is applied, a transform method, as an embodiment to which the present invention is applied.

FIG. 26 is a diagram showing an example of a transform tree syntax structure according to an embodiment of the present invention.

FIG. 27 is a diagram illustrating a transform unit syntax structure according to an embodiment of the present invention.

FIG. 28 is a diagram illustrating a transform unit syntax structure according to an embodiment of the present invention.

FIG. 29 is a diagram illustrating a transform unit syntax structure according to an embodiment of the present invention.

DETAILED DESCRIPTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and, in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
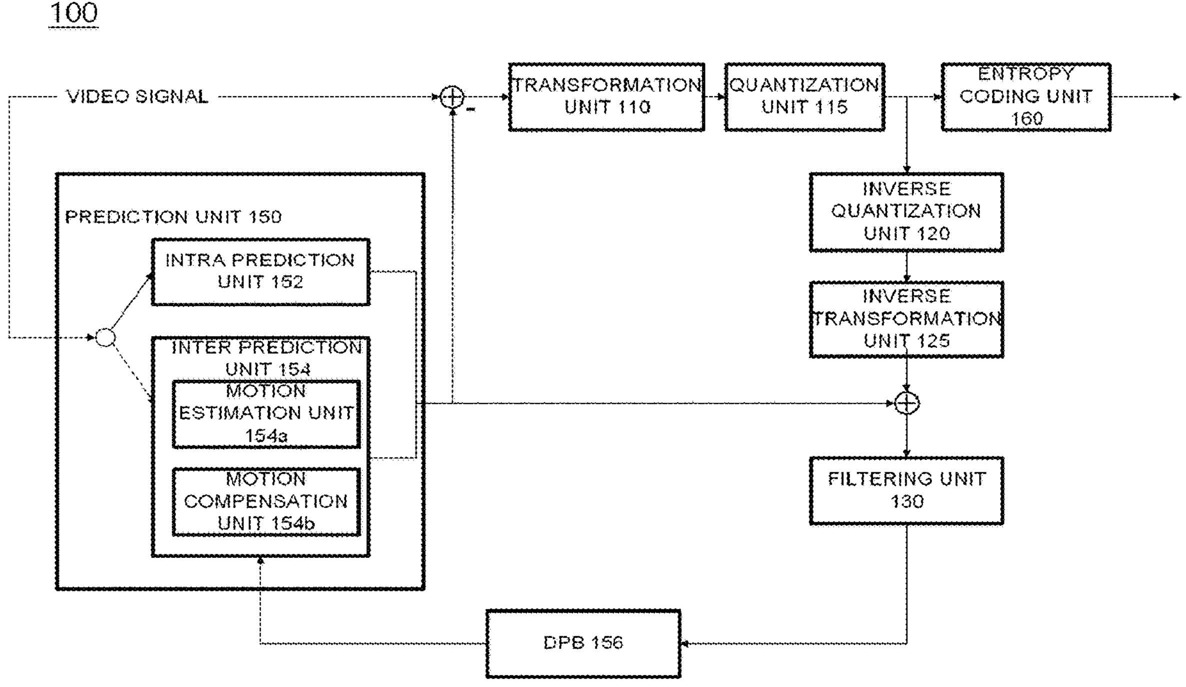
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform may be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that may be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to improve coding efficiency, a picture signal is not coded as it is, but a method of predicting a picture via the prediction unit 150 by using a region that has been already coded, and adding, to the predicted picture, a residual value between an original picture and the predicted picture, thereby obtaining a reconstructed picture, is used. The intra prediction unit 152 performs intra prediction within a current picture, and the inter prediction unit 154 predicts the current picture by using a reference picture stored in the decoding picture buffer 156. The intra prediction unit 152 performs intra prediction from reconstructed regions in the current picture, and transfers intra coding information to the entropy coding unit 160. The inter prediction unit 154 may include a motion estimation unit 154*a* and a motion compensation unit 154*b*. The motion estimation unit 154*a* obtains a motion vector value of the current region by referring to a specific reconstructed region. The motion estimation unit 154*a* transfers location information (reference frame, motion vector, etc.) of the reference region to the entropy coding unit 160 so as to enable the location information to be included in a bitstream. The motion compensation unit 154*b* performs inter motion compensation by using the motion vector value transferred from the motion estimation unit 154*a*.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intra encoding information may include at least one of an intra prediction mode, a most probable mode (MPM) flag, and an MPM index. The intra encoding information may include information on a reference sample. The inter prediction unit 154 may include the motion estimation unit 154*a* and the motion compensation unit 154*b*. The motion estimation unit 154*a* obtains a motion vector value of the current region by referring to a specific region of the reconstructed reference picture. The motion estimation unit 154*a* transfers a motion information set (reference picture index, motion vector information, etc.) for the reference region to the entropy coding unit 160. The motion compensation unit 154*b* performs motion compensation by using the motion vector value transferred from the motion estimation unit 154*a*. The inter prediction unit 154 transfers inter encoding information including motion information on the reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes information indicating a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding. For example, the entropy coding unit 160 may binarize information indicating a quantized transform coefficient. The entropy coding unit 160 may generate a bitstream by arithmetic-coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
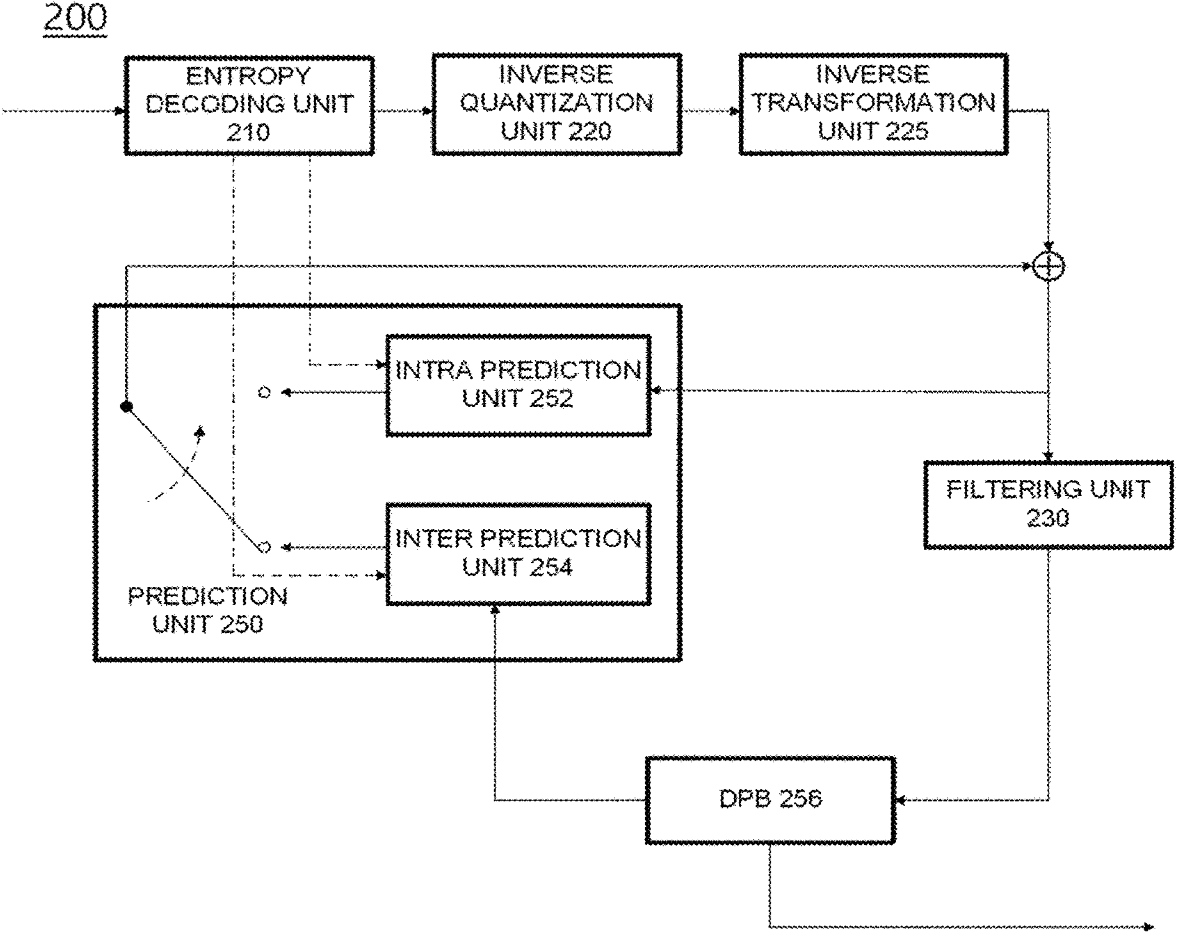
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 reconstructs a residual value by using the inverse-quantized transform coefficient. The video signal processing device 200 reconstructs an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that may perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof may be used as a predictor of the current block. For motion prediction with sub-pel unit pixel accuracy, for example, an 8-tap interpolation filter for a luma signal and a 4-tap interpolation filter for a chroma signal may be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not shown). The intra BC prediction unit may reconstruct the current region by referring to a specific region including reconstructed samples in the current picture. The intra BC prediction unit obtains intra BC encoding information for the current region from the entropy decoding unit 210. The intra BC prediction unit obtains a block vector value of the current region indicating the specific region in the current picture. The intra BC prediction unit may perform intra BC prediction by using the obtained block vector value. The intra BC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
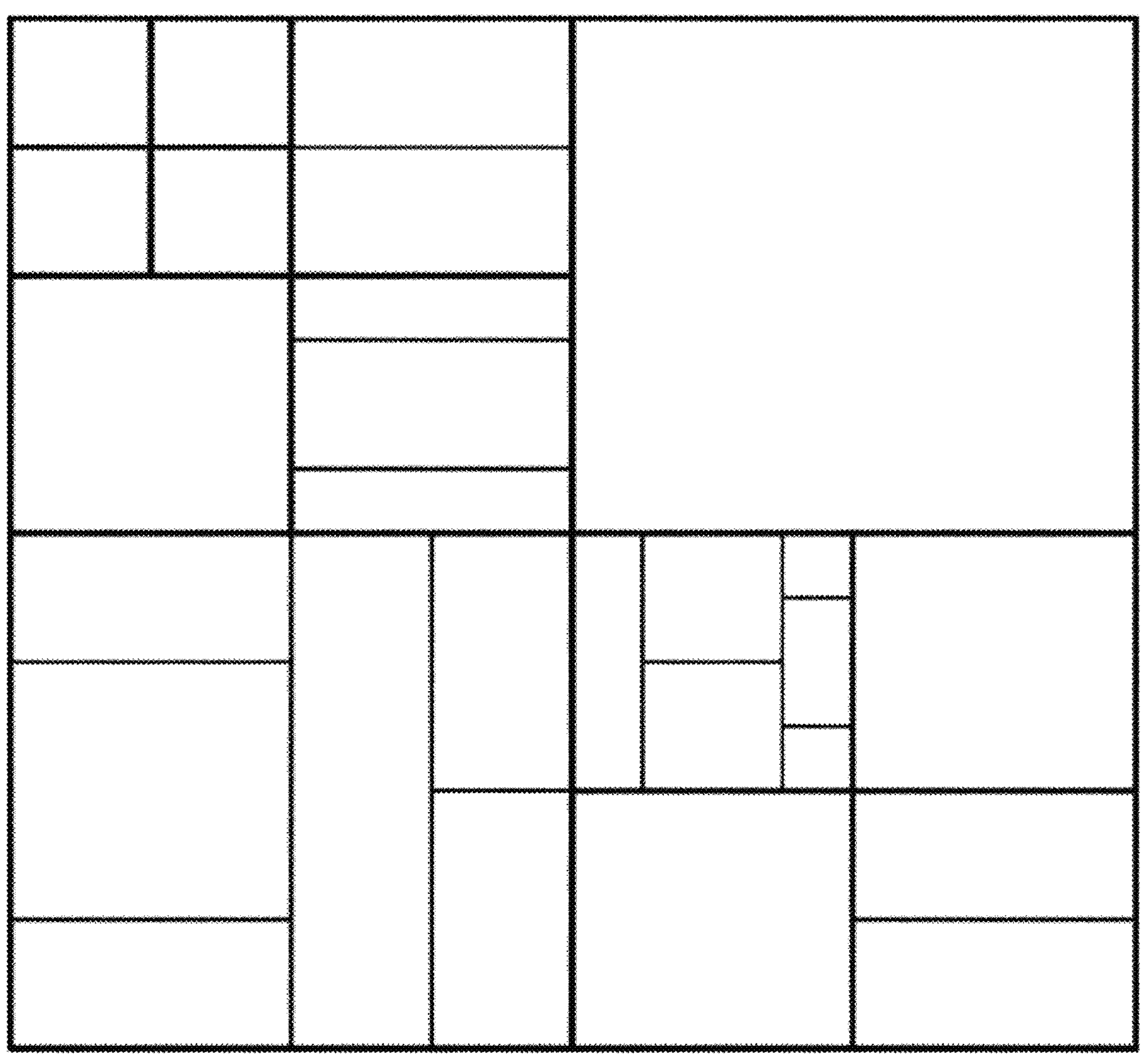
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit may be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split may be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal binary split. This multi-type tree split may be performed recursively.

The leaf node of the multi-type tree can be a coding unit. If splitting for the coding unit is not indicated or the coding unit is not greater than the maximum transform length, the coding unit is used as a unit of prediction and transform without further splitting. Meanwhile, in the quad tree and multi-type tree described above, at least one of the following parameters can be defined in advance or can be transmitted through RBSP of a high level set such as PPS, SPS, VPS, and the like. 1) CTU size: root node size of quad tree, 2) Minimum QT size MinQtSize: Minimum QT leaf node size allowed, 3) Maximum BT size MaxBtSize: Mmaximum BT root node size allowed, 4) Maximum TT size MaxTtSize: Maximum TT root node size allowed, 5) Maximum MTT depth MaxMttDepth: Maximum allowable depth of MTT split from leaf node of QT, 6) Minimum BT size MinBtSize: Minimum BT leaf node size allowed, 7) Minimum TT size MinTtSize: Minimum TT leaf node size allowed.

Figure 4:
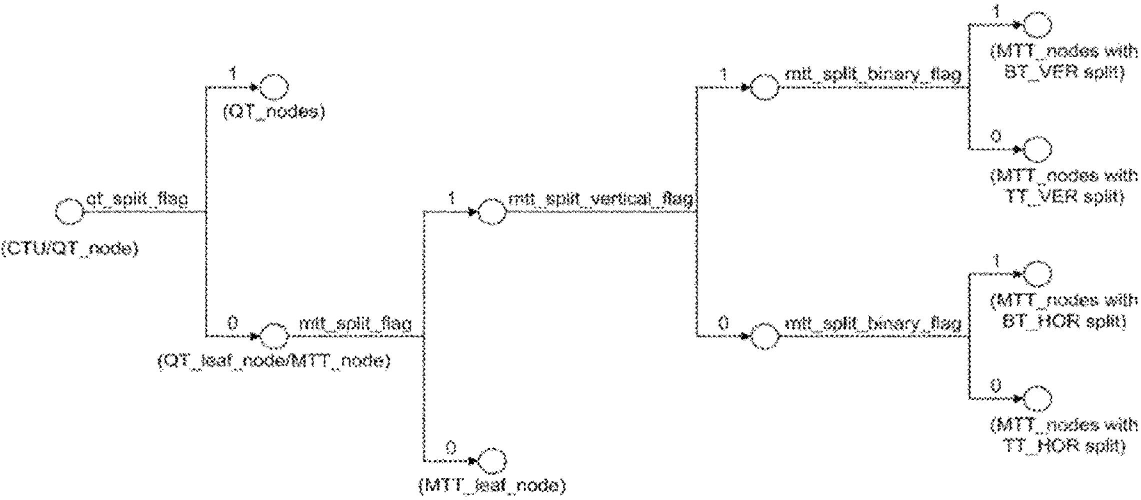
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and may be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT leaf node' of the multi-type tree. When the multi-type tree node 'MTT node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
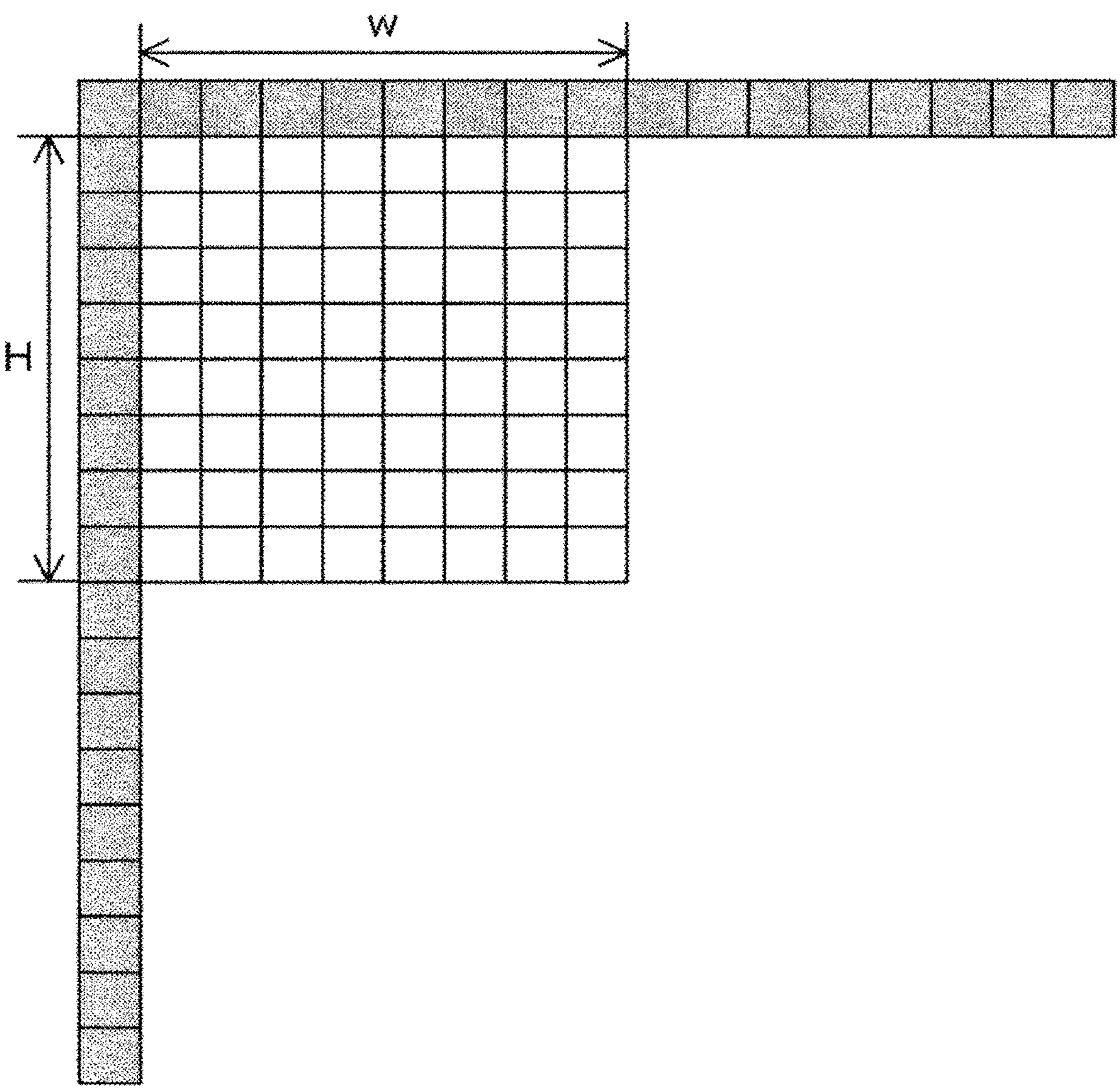
FIGS. 5 and 6 illustrate an intra-prediction method in more detail according to an embodiment of the present disclosure.
Figure 6:
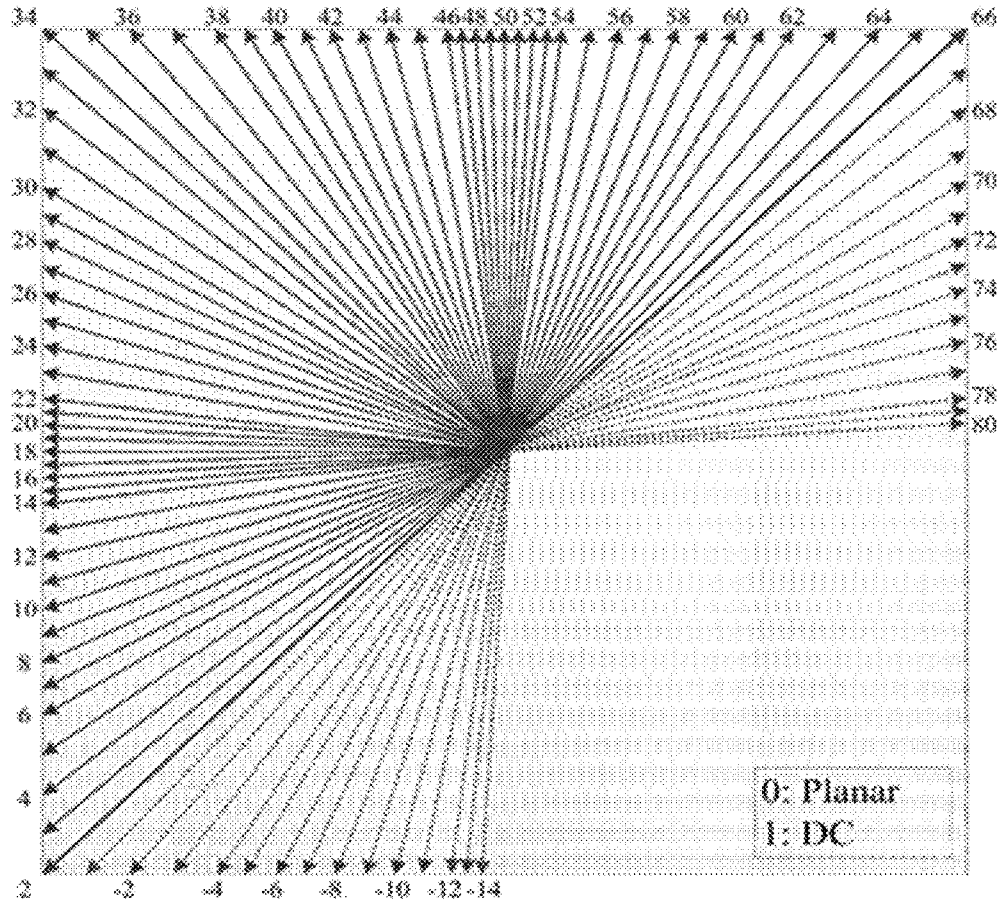

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2 W+2H+1 neighboring samples located on the left and/or upper side of the current block.

When at least some samples to be used as reference samples have not yet been reconstructed, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, the preset angle range may be set differently depending on a shape of the current block. For example, if the current block is a rectangular block, a wide angle mode indicating an angle exceeding 45 degrees or less than −135 degrees in a clockwise direction may be additionally used. When the current block is a horizontal block, an angle mode may indicate an angle within an angle range (i.e., a second angle range) between (45+offset1) degrees and (−135+offset1) degrees in a clockwise direction. In this case, angle modes 67 to 76 outside the first angle range may be additionally used. In addition, if the current block is a vertical block, the angle mode may indicate an angle within an angle range (i.e., a third angle range) between (45-offset2) degrees and (−135-offset2) degrees in a clockwise direction. In this case, angle modes −10 to −1 outside the first angle range may be additionally used. According to an embodiment of the present invention, values of offset1 and offset2 may be determined differently depending on a ratio between the width and height of the rectangular block. In addition, offset1 and offset2 may be positive numbers.

According to a further embodiment of the present invention, a plurality of angle modes configuring the intra prediction mode set may include a basic angle mode and an extended angle mode. In this case, the extended angle mode may be determined on the basis of the basic angle mode.

According to an embodiment, the basic angle mode is a mode corresponding to an angle used in intra prediction of the existing high efficiency video coding (HEVC) standard, and the extended angle mode may be a mode corresponding to an angle newly added in intra prediction of the next generation video codec standard. More specifically, the basic angle mode may be an angle mode corresponding to any one of the intra prediction modes {2, 4, 6, . . . , 66}, and the extended angle mode may be an angle mode corresponding to any one of the intra prediction modes {3, 5, 7, . . . , 65}. That is, the extended angle mode may be an angle mode between basic angle modes within the first angle range. Accordingly, the angle indicated by the extended angle mode may be determined on the basis of the angle indicated by the basic angle mode.

According to another embodiment, the basic angle mode may be a mode corresponding to an angle within a preset first angle range, and the extended angle mode may be a wide angle mode outside the first angle range. That is, the basic angle mode may be an angle mode corresponding to any one of the intra prediction modes {2, 3, 4, . . . , 66}, and the extended angle mode may be an angle mode corresponding to any one of the intra prediction modes {−10, −9, . . . , −1} and {67, 68, . . . , 76}. The angle indicated by the extended angle mode may be determined as an angle on a side opposite to the angle indicated by the corresponding basic angle mode. Accordingly, the angle indicated by the extended angle mode may be determined on the basis of the angle indicated by the basic angle mode. Meanwhile, the number of extended angle modes is not limited thereto, and additional extended angles may be defined according to the size and/or shape of the current block. For example, the extended angle mode may be defined as an angle mode corresponding to any one of the intra prediction modes {−14, −13, . . . , −1} and {67, 68, . . . , 80}. Meanwhile, the total number of intra prediction modes included in the intra prediction mode set may vary depending on the configuration of the basic angle mode and extended angle mode described above.

In the embodiments described above, the spacing between the extended angle modes may be set on the basis of the spacing between the corresponding basic angle modes. For example, the spacing between the extended angle modes {3, 5, 7, . . . , 65} may be determined on the basis of the spacing between the corresponding basic angle modes {2, 4, 6, . . . , 66}. In addition, the spacing between the extended angle modes {−10, −9, . . . , −1} may be determined on the basis of the spacing between corresponding basic angle modes {56, 57, . . . , 65} on the opposite side, and the spacing between the extended angle modes {67, 68, . . . , 76} may be determined on the basis of the spacing between the corresponding basic angle modes {3, 4, . . . , 12} on the opposite side. The angular spacing between the extended angle modes may be set to be the same as the angular spacing between the corresponding basic angle modes. In addition, the number of extended angle modes in the intra prediction mode set may be set to be less than or equal to the number of basic angle modes.

According to an embodiment of the present invention, the extended angle mode may be signaled on the basis of the basic angle mode. For example, the wide angle mode (i.e., the extended angle mode) may replace at least one angle mode (i.e., the basic angle mode) within the first angle range. The basic angle mode to be replaced may be a corresponding angle mode on a side opposite to the wide angle mode. That is, the basic angle mode to be replaced is an angle mode that corresponds to an angle in an opposite direction to the angle indicated by the wide angle mode or that corresponds to an angle that differs by a preset offset index from the angle in the opposite direction. According to an embodiment of the present invention, the preset offset index is 1. The intra prediction mode index corresponding to the basic angle mode to be replaced may be remapped to the wide angle mode to signal the corresponding wide angle mode. For example, the wide angle modes {−10, −9, . . . , −1} may be signaled by the intra prediction mode indices {57, 58, . . . , 66}, respectively, and the wide angle modes {67, 68, . . . , 76} may be signaled by the intra prediction mode indices {2, 3, . . . , 11}, respectively. In this way, the intra prediction mode index signals the extended angle mode, and thus the same set of intra prediction mode indices may be used for signaling of the intra prediction mode even if the configuration of the angle modes used for intra prediction of each block are different from each other. Accordingly, signaling overhead due to a change in the intra prediction mode configuration may be minimized.

Meanwhile, whether or not to use the extended angle mode may be determined on the basis of at least one of the shape and size of the current block. According to an embodiment, if the size of the current block is greater than a preset size, the extended angle mode may be used for intra prediction of the current block, otherwise, only the basic angle mode may be used for intra prediction of the current block. According to another embodiment, if the current block is a block other than a square, the extended angle mode may be used for intra prediction of the current block, and if the current block is a square block, only the basic angle mode may be used for intra prediction of the current block.

In the following, an inter prediction method according to an embodiment of the present invention will be described with reference to FIG. 7. In the present disclosure, the inter prediction method may include a general inter prediction method optimized for translation motion and an affine model-based inter prediction method. In addition, the motion vector may include at least one of a general motion vector for motion compensation according to the general inter prediction method and a control point motion vector for affine motion compensation.

Figure 7:
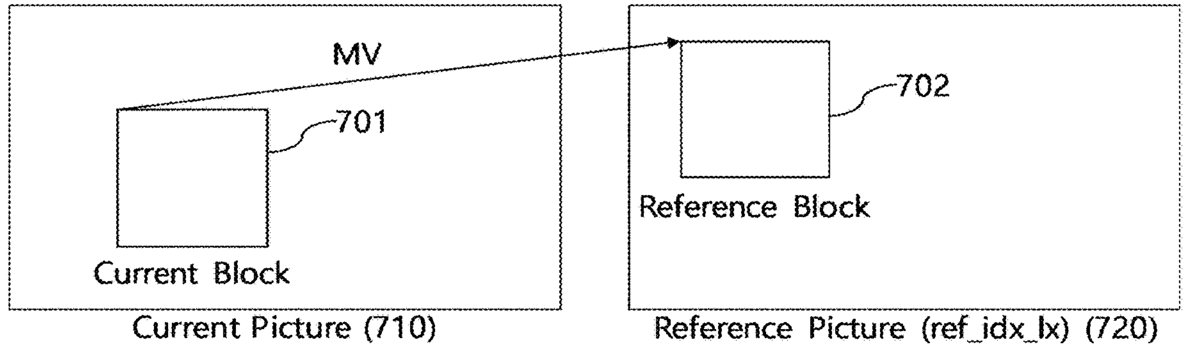
FIG. 7 shows an inter prediction method according to an embodiment of the present invention.

FIG. 7 shows an inter prediction method according to an embodiment of the present invention. As described above, the decoder may predict the current block by referring to reconstructed samples of another decoded picture. Referring to FIG. 7, the decoder obtains a reference block 702 in a reference picture 720 on the basis of the motion information set of the current block 701. In this case, the motion information set may include a reference picture index and a motion vector. The reference picture index indicates the reference picture 720 including a reference block for inter prediction of the current block in the reference picture list. According to an embodiment, the reference picture list may include at least one of the L0 picture list and L1 picture list described above. The motion vector represents an offset between a coordinate value of the current block 701 in the current picture 710 and a coordinate value of the reference block 702 in the reference picture 720. The decoder obtains a predictor of the current block 701 on the basis of sample values of the reference block 702, and reconstructs the current block 701 using the predictor.

Specifically, the encoder may obtain the reference block described above by searching for a block similar to the current block from pictures of which the reconstruction order is earlier. For example, the encoder may search for a reference block for which the sum of the difference between the current block and the sample value is minimum within a preset search region. In this case, in order to measure the similarity between the current block and the samples of the reference block, at least one of sum of absolute difference (SAD) or sum of Hadamard transformed difference (SATD) may be used. Here, SAD may be a value obtained by summing the absolute values of respective differences between sample values included in the two blocks. In addition, SATD may be a value obtained by adding all absolute values of Hadamard transform coefficients obtained by performing Hadamard transform on the difference between sample values included in two blocks.

Meanwhile, the current block may be predicted using one or more reference regions. As described above, the current block may be inter-predicted through a bi-prediction method using two or more reference regions. According to an embodiment, the decoder may obtain two reference blocks on the basis of two motion information sets of the current block. In addition, the decoder may obtain a first predictor and a second predictor of the current block on the basis of the respective sample values of the obtained two reference blocks. In addition, the decoder may reconstruct the current block using the first predictor and the second predictor. For example, the decoder may reconstruct the current block on the basis of the mean for each sample of the first predictor and the second predictor.

As described above, one or more motion information sets may be signaled for motion compensation of the current block. In this case, similarity between motion information sets for motion compensation of each of the plurality of blocks may be used. For example, the motion information set used for prediction of the current block may be induced from the motion information set used for prediction of any one of the previously reconstructed other samples. Through this, the encoder and decoder may reduce signaling overhead.

For example, a plurality of candidate blocks may exist that are likely to have been predicted on the basis of the same or similar motion information set as the motion information set of the current block. The decoder may generate a merge candidate list on the basis of the corresponding plurality of candidate blocks. Here, the merge candidate list may include candidates corresponding to samples that are likely to have been predicted on the basis of a motion information set related to the motion information set of the current block, among samples reconstructed earlier than the current block. The encoder and decoder may configure a merge candidate list of the current block according to a predefined rule. In this case, the merge candidate lists respectively configured by the encoder and the decoder may be the same. For example, the encoder and decoder may construct a merge candidate list of the current block on the basis of a position of the current block in the current picture. A method of configuring the merge candidate list of the current block by the encoder and the decoder will be described later with reference to FIG. 9. In the present disclosure, a position of a specific block indicates a relative position of a top-left sample of the specific block within a picture including the specific block.

Meanwhile, in order to improve coding efficiency, a method of quantizing a transform coefficient value obtained by transforming a residual signal and coding the quantized transform coefficient may be used instead of coding the above-described residual as it is. As described above, the transform unit may obtain a transform coefficient value by transforming a residual signal. In this case, the residual signal of a specific block may be distributed over an entire area of the current block. Accordingly, it is possible to improve coding efficiency by concentrating energy in the low frequency region through frequency domain conversion of a residual signal. Hereinafter, a method of transforming or inversely transforming a residual signal will be described in detail.

Figure 8:
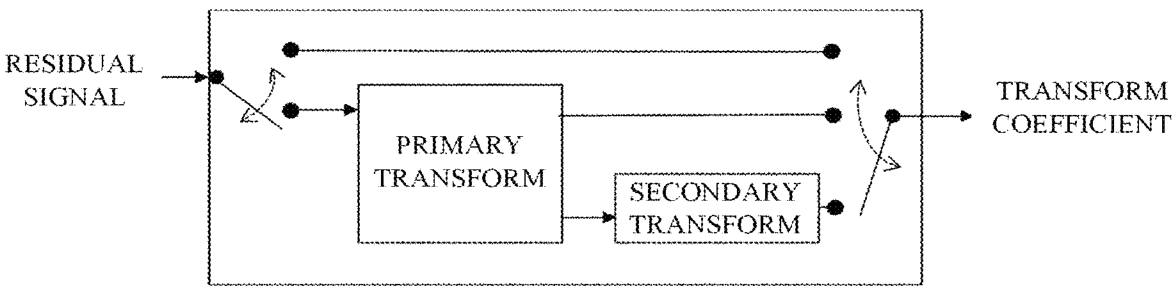
FIG. 8 is a diagram specifically illustrating a method for transforming a residual signal by an encoder.

FIG. 8 is a diagram specifically illustrating a method for transforming a residual signal by an encoder. As described above, a residual signal in a spatial domain may be transformed to a frequency domain. An encoder may obtain a transform coefficient by transforming the obtained residual signal. First, the encoder may obtain at least one residual block including a residual signal for a current block. The residual block may be either the current block or one of blocks divided from the current block. In the present disclosure, the residual block may be referred to as a residual array or a residual matrix which include residual samples of the current block. In the present disclosure, the residual block may represent a transform unit or a block having the same size as that of the transform block.

Next, the encoder may transform the residual block by using a transform kernel. The transform kernel used for transformation of the residual block may be a transform kernel having separable characteristics of vertical transform and horizontal transform. In this case, the transform for the residual block may be performed separately into vertical transform and horizontal transform. For example, the encoder may perform vertical transformation by applying a transform kernel in the vertical direction of the residual block. The encoder may perform horizontal transform by applying the transform kernel in the horizontal direction of the residual block. In the present disclosure, the transform kernel may be used as a term to refer to a parameter set used for transform of the residual signal, such as transform matrix, transform array, transform function, and transform. According to an embodiment, the transform kernel may be any one of a plurality of available kernels. A transform kernel based on different transform types may be used for each of the vertical transform and the horizontal transform.

The encoder may transfer the transform block transformed from the residual block to a quantization unit and quantize the transform block. The transform block may include a plurality of transform coefficients. Specifically, the transform block may include the plurality of transform coefficients arranged in two dimensions. As in the case of the residual block, the size of the transform block may be the same as the size of either the current block or the block divided from the current block. The transform coefficients transferred to the quantization unit may be expressed as quantized values.

The encoder may perform additional transform before the transform coefficients are quantized. As illustrated in FIG. 8, the above-described transform method may be referred to as a primary transform, and an additional transform may be referred to as a secondary transform. The secondary transform may be selective for each residual block. According to an embodiment, the encoder may improve coding efficiency by performing secondary transform for a region where it is difficult to concentrate energy in a low-frequency region only by primary transform. For example, secondary transform may be added to a block in which residual values appear larger in a direction other than the horizontal or vertical direction of the residual block. The residual values of an intra-predicted block may have a higher probability of transformation in a direction other than the horizontal or vertical direction compared to the residual values of an inter-predicted block. Accordingly, the encoder may additionally perform secondary transform on the residual signal of the intra-predicted block. The encoder may omit secondary transform for the residual signal of the inter-predicted block.

As another example, whether or not to perform the secondary transform may be determined depending on the size of the current block or the residual block. In addition, transform kernels having different sizes may be used depending on the size of the current block or the residual block. For example, 8×8 secondary transform may be applied to a block whose length of a shorter side of the width and height is greater than or equal to a first preset length. In addition, 4×4 secondary transform may be applied to a block whose length of the shorter side of the width and height is greater than or equal to a second preset length and less than the first preset length. In this case, the first preset length may be a value greater than the second preset length, but the present disclosure is not limited thereto. In addition, unlike primary transform, secondary transform may not be performed separately into vertical transform and horizontal transform. This secondary transform may be referred to as a low frequency non-separable transform (LFNST).

In the case of a video signal in a specific region, energy in a high frequency band may not be reduced even if frequency transformation is performed due to a sudden change in brightness. Accordingly, compression performance due to quantization may be deteriorated. When transform is performed on a region in which a residual value rarely exists, an encoding time and a decoding time may be unnecessarily increased. Accordingly, transform on the residual signal of the specific region may be omitted. Whether to perform transform on the residual signal of the specific region may be determined by a syntax element related to transform of the specific region. For example, the syntax element may include transform skip information. The transform skip information may be a transform skip flag. If the transform skip information on the residual block indicates a transform skip, transform on the residual block is not performed. In this case, the encoder may immediately quantize the residual signal on which transform of a corresponding region has not been performed. The operations of the encoder described with reference to FIG. 8 may be performed via the transform unit of FIG. 1.

The above-described transform-related syntax elements may be information parsed from a video signal bitstream. The decoder may entropy-decode the video signal bitstream so as to obtain transform-related syntax elements. The encoder may entropy-code the transform-related syntax elements so as to generate a video signal bitstream.

Figure 9:
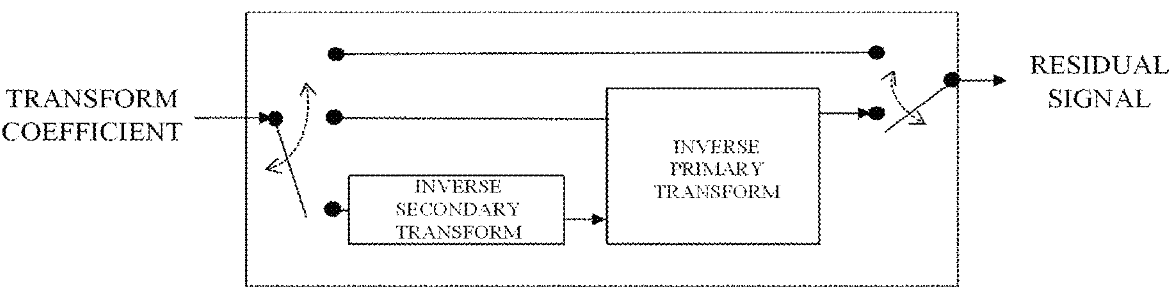
FIG. 9 is a diagram specifically illustrating a method for obtaining a residual signal by inverse transforming a transform coefficient by an encoder and a decoder.

FIG. 9 is a diagram specifically illustrating a method for obtaining a residual signal by inverse transforming a transformation coefficient by an encoder and a decoder. For the convenience of description, it will be described that an inverse transform operation is performed via an inverse transform unit of each of an encoder and a decoder. The inverse transform unit may obtain a residual signal by inverse transforming an inverse quantized transform coefficient. First, the inverse transform unit may detect whether inverse transform for a specific region is performed, from a transform-related syntax element of the region. According to an embodiment, when a transform-related syntax element for a specific transform block indicates a transform skip, transform on the transform block may be omitted. In this case, both the primary inverse transform and the secondary inverse transform described above regarding the transform block may be omitted. The inverse quantized transform coefficient may be used as a residual signal. For example, the decoder may reconstruct a current block by using the inverse quantized transform coefficient as a residual signal.

According to another embodiment, the transform-related syntax element for the specific transform block may not indicate a transform skip. In this case, the inverse transform unit may determine whether to perform secondary inverse transform for secondary transform. For example, when the transform block is a transform block of an intra-predicted block, secondary inverse transform may be performed on the transform block. A secondary transform kernel used for the transform block may be determined based on an intra prediction mode corresponding to the transform block. As another example, whether to perform secondary inverse transform may be determined based on the size of the transform block. Secondary inverse transform may be performed after inverse quantization and before primary inverse transform.

The inverse transform unit may perform primary inverse transform on the inverse quantized transform coefficient or a secondary inverse transformed transform coefficient. In the case of primary inverse transform, vertical transform and horizontal transform may be performed separately as in the case of primary transform. For example, the inverse transform unit may obtain a residual block by performing vertical inverse transform and horizontal inverse transform on the transform block. The inverse transform unit may inverse transform the transform block on the basis of the transform kernel used for transforming the transform block. For example, the encoder may explicitly or implicitly signal information indicating the transform kernel applied to the current transform block from among a plurality of available transform kernels. The decoder may select a transform kernel to be used for inverse transform of the transform block from among the plurality of available transform kernels by using information indicating the signaled transform kernel. The inverse transform unit may reconstruct the current block by using the residual signal obtained via inverse transform on the transform coefficient.

Meanwhile, a distribution of the residual signals of a picture may be different for each region. For example, a distribution of values for the residual signal in a specific region may vary depending on a prediction method. If transform is performed on a plurality of different transform regions using the same transform kernel, coding efficiency may vary for each transform region depending on distributions and characteristics of values in the transform regions. Accordingly, if a transform kernel used for transform of specific transform block is adaptively selected from among a plurality of transform kernels that may be used, coding efficiency may be further improved. That is, the encoder and decoder may additionally be configured to use a transform kernel other than the basic transform kernel in transforming a video signal. A method of adaptively selecting the transform kernel may be referred to as adaptive multiple core transform (AMT) or multiple transform selection (MTS). The method of adaptively selecting the transform kernel will be described later with reference to related drawings. In the present disclosure, for convenience of description, transform and inverse transform are collectively referred to as transform. In addition, the transform kernel and the inverse transform kernel are collectively referred to as a transform kernel.

In the following, a plurality of transform kernels that may be used for transform of a video signal will be described with reference to FIG. 10. According to an embodiment of the present invention, the transform kernel may be a kernel derived on the basis of a specific basis function. The plurality of different transform kernels may be respectively obtained based on different basis functions. The plurality of transform kernels may be obtained on the basis of basis functions respectively corresponding to different transform types.

FIG. 10 is a diagram representing a basis function corresponding to each transform type. According to an embodiment, a transform kernel may be used for transform of a video residual signal may include at least one of a discrete cosine transform type-II (DCT-II)-based transform kernel, a discrete cosine transform type-V (DCT-V)-based transform kernel, a discrete cosine transform type-VIII (DCT-VIII)-based transform kernel, a discrete sine transform type-I (DST-I)-based transform kernel, and a discrete sine transform type-II (DST-VII)-based transform kernel.

Referring to FIG. 10, the basis functions respectively corresponding to the transform types DCT-II, DCT-V, DCT-VIII, DST-I, and DST-VII described above may be expressed as a function of cosine or sine. For example, the basis functions respectively corresponding to DCT-II, DCT-V, and DCT-VIII may be a cosine type function, and the basis functions respectively corresponding to DST-I and DST-VII may be a sine type function. In addition, a basis function corresponding to a specific transform type may be represented in the form of a basis function for each frequency bin. For example, a basis function $T_i(j)$ may be a basis function corresponding to an i-th frequency bin. That is, as the value represented by i is smaller, the basis function corresponding to a lower frequency is represented. In addition, as the value indicated by i is larger, the basis function corresponding to a higher frequency is represented. In FIG. 10, j may represent an integer between 0 and N−1.

The basis function $T_i(j)$ may be expressed as a two-dimensional matrix representing a j-th element of an i-th row. In this case, the transform using transform kernels on the basis of the transform type of FIG. 9 has separable characteristics in performing transform. That is, the transform for each of a horizontal direction and a vertical direction may be performed separately for the residual signal. For example, the transform using a transform matrix T for a residual block X may be represented as a matrix operation TXT'. In this case, T' means a transpose matrix of the transform matrix T.

Values of the transform matrix calculated by the basis function shown in FIG. 10 may be in a decimal form rather than an integer form. It may be difficult to implement values in the form of decimal values in hardware in a video encoding device and decoding device. Accordingly, a transform kernel approximated by an integer from an original transform kernel including values in the form of decimals may be used for encoding and decoding of a video signal. An approximated transform kernel including values in the form of integer values may be generated through scaling and rounding of the original transform kernel. The integer value included in the approximated transform kernel may be a value within a range that may be expressed by a preset number of bits. The preset number of bits may be an 8-bit or 10-bit. Depending on the approximation, an orthonormal property of DCT and DST may not be maintained. However, the encoding efficiency loss due to the approximation is not large, it may be advantageous in terms of hardware implementation to approximate the transform kernel in an integer form.

Figure 11:
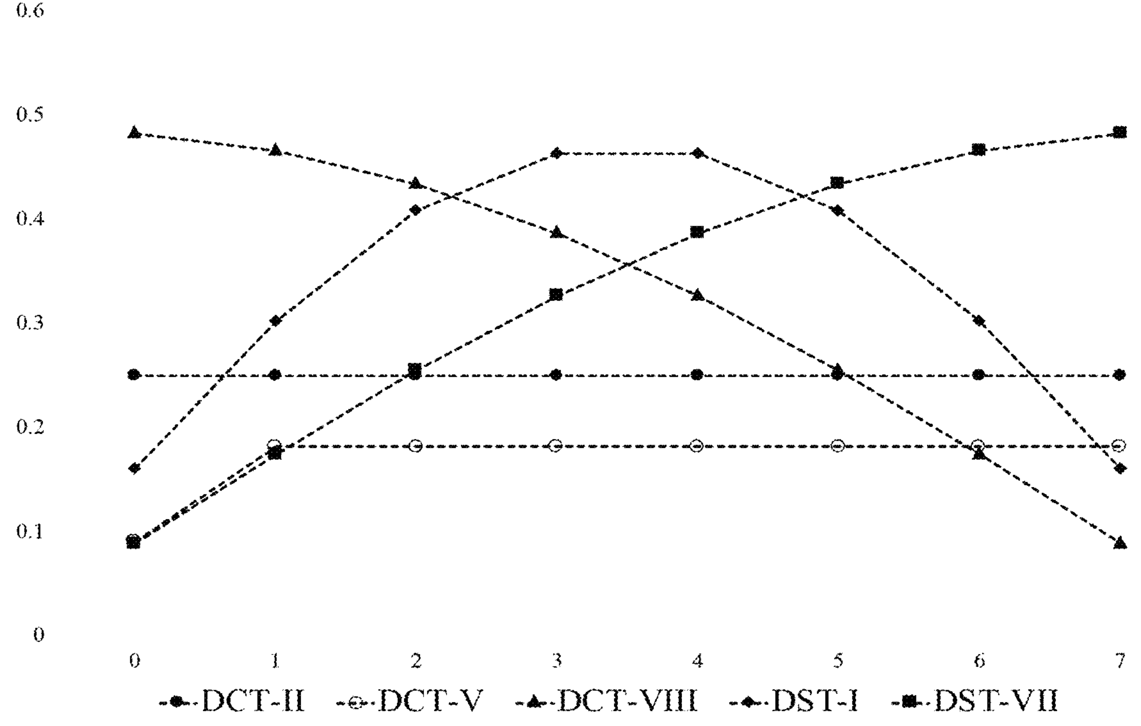
FIG. 11 is a diagram representing a size of a signal for each index of each of transform types DCT-II, DCT-V, DCT-VIII, DST-I, and DST-VII.

FIG. 11 is a diagram representing a magnitude of a signal for each index of each of transform types DCT-II, DCT-V, DCT-VIII, DST-I, and DST-VII. FIG. 11 shows a form of a basis function corresponding to the lowest frequency bin among basis functions for each frequency bin. FIG. 11 represents a basis function corresponding to a 0-th frequency bin among basis functions for each frequency bin. In FIG. 11, the horizontal axis represents an index j (j=0, 1, . . . , N−1) in the basis function, and the vertical axis represents a magnitude value of a signal. N represents the number of samples in a specific region targeted for transform.

As shown in FIG. 11, in DST-VII, the magnitude of the signal tends to increase as the index j increases. Accordingly, DST-VII, like a residual block of an intra-predicted block, may be efficient for transform of a residual block in which the magnitude of the residual signal increases as the distance in the horizontal and vertical directions increases, with the top-left of the residual block as a reference.

On the other hand, in DCT-VIII, the magnitude of the signal tends to decrease as the index j increases. That is, DCT-VIII satisfies duality characteristics along with DST-VII. Accordingly, DCT-VIII may be efficient for transform of a residual block in which the magnitude of the residual signal decreases as the distance in the horizontal and vertical directions increases with the top-left of the residual block as a reference.

In DST-I, as the index j in the basis function increases, the magnitude of the signal increases, and then the magnitude of the signal decreases starting from a specific index. Therefore, it may be efficient for transform of a residual block having a large size of the residual signal at the center portion of the residual block.

The 0-th basis function of DCT-II represents DC. Accordingly, it may be efficient for a residual block having a uniform signal magnitude distribution in the residual block.

DCT-Vis similar to DCT-II, but the magnitude of the signal for a case where the index j is 0 is less than the magnitude of the signal for a case where the index j is not 0. That is, if the index j is 1, it has a signal model in which the straight line is bent.

Meanwhile, as described above, when a transform kernel having the separable characteristics is used, transform may be performed for each of the horizontal direction and the vertical direction of the residual block. Specifically, the transform for the residual block may be performed through two times of 2D matrix multiplication operation. The matrix multiplication operation may be accompanied by an amount of calculation greater than or equal to a preset level. Accordingly, when the residual block is transformed using a DCT-II-based transform kernel, the amount of calculation may be reduced by using a combination structure of a butterfly structure or a half butterfly structure and a half matrix multiplier. However, DST-VII and DCT-VIII have relatively high implementation complexity, and thus implementation may be difficult in terms of the amount of calculation. In addition, the elements of the transform kernel (matrix elements of the transform kernel) should be stored in a memory for operation, a memory capacity for storing the kernel matrix should also be considered in implementation. Accordingly, a transform type having similar characteristics to each of DST-VII and DCT-VIII and relatively low implementation complexity may be used.

According to an embodiment, discrete sine transform type IV (DST-IV) and discrete cosine transform type-IV (DCT-IV) may replace DST-VII and DCT-VIII, respectively.

Figure 12:
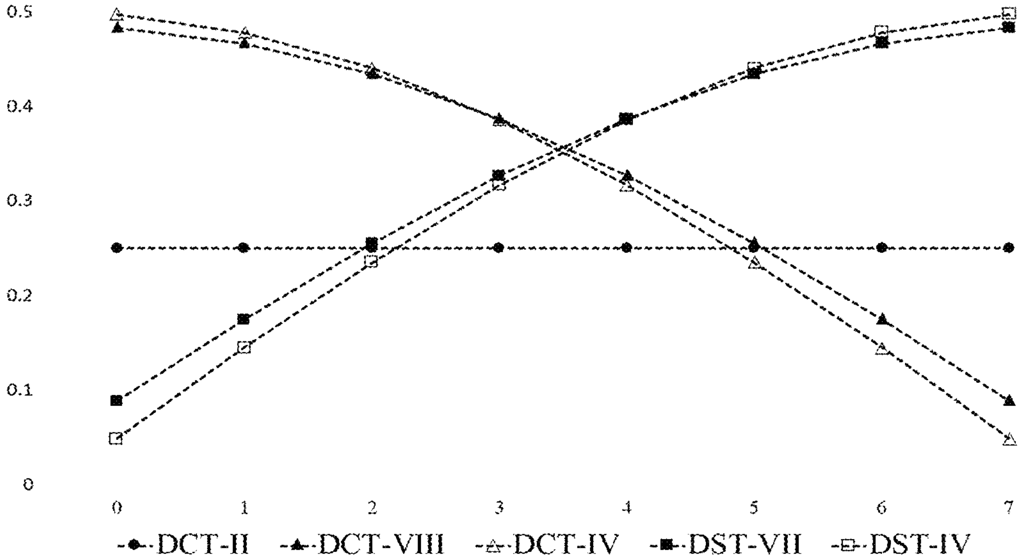
FIG. 12 is a diagram representing a size of a signal for each index for each of transform types DST-IV, DCT-IV, DST-VII, and DCT-VIII.

FIG. 12 is a diagram representing the magnitude of a signal for each index for each of the transform types DST-IV, DCT-IV, DST-VII, and DCT-VIII. FIG. 12(*a*) represents a basis function corresponding to DST-IV and a basis function corresponding to DCT-IV. DST-IV and DCT-IV for the number N of samples may be derived from DCT-II for the number 2N of samples. That is, a DCT-II partial butterfly structure for the number 2N of samples includes DCT-IV for the number N of samples. In addition, DST-IV for the number N of samples may be implemented by arranging a sign inversion operation and the corresponding basis function in reverse order from DCT-IV for the number N of samples.

As shown in FIG. 12(*b*), DST-IV represents a signal model similar to DST-VII. Accordingly, DST-IV, like a residual block of an intra-predicted block, may be efficient for transform of a residual block in which the magnitude of the residual signal increases as the distance in the horizontal and vertical directions increases, with the top-left of the residual block as a reference. In addition, DCT-IV represents a signal model similar to DCT-VIII. Accordingly, DCT-IV may be efficient for transform of a residual block in which the magnitude of the residual signal is large at a specific boundary, and the magnitude of the residual signal decreases as it goes from the corresponding boundary to another boundary.

If only a transform kernel based on any one of the transform types described above is used for transform of a video signal, it is difficult to perform adaptive transform according to a pattern of the residual signal, which varies depending on the characteristics of the original signal itself and the prediction mode. Accordingly, the encoder and decoder according to an embodiment of the present invention may improve coding efficiency by using a transform kernel selected for each region from among a plurality of usable transform kernels in transforming a residual signal.

In the existing high efficiency video coding (HEVC) standard, among the plurality of transform types described above, the residual signal was transformed using the DCT-II-based transform kernel and the residual signal was transformed using the DST-VII-based transform kernel limitedly for an intra-predicted block having a 4×4 size. As described above, DCT-II may be suitable for transform of the residual signal of the inter-predicted block, but may not be suitable for transform of the residual signal of the intra-predicted block. That is, depending on how the current block is predicted, the pattern of the residual may vary within the residual block.

Accordingly, at least one selected from among a plurality of usable transform kernels may be used for transform of a specific transform block. According to an embodiment, the encoder and decoder may select a transform kernel for at least one transform region of the current block on the basis of how the current block is predicted. Such a method may be referred to as a multiple core transform (AMT) described above. If a transform kernel determined according to a prediction method for a specific region is used for transform of a corresponding region, coding efficiency may be improved compared to a case in which transform is performed using the DCT-II-based transform kernel for all regions.

FIG. 13 is a diagram representing a method of configuring a transform candidate set according to a prediction mode of a current block. According to an embodiment of the present invention, the encoder and the decoder may select a transform kernel used for at least one transform region of the current block on the basis of the transform candidate set corresponding to the current block. The transform candidate set may include a plurality of candidate transform kernels. In addition, the transform candidate set may include different candidate transform kernels according to the prediction mode of the current block.

According to an embodiment, the current block may be a block predicted on the basis of any one of a plurality of intra prediction modes. In this case, the pattern of the residual signal of the current block may vary depending on the intra prediction mode used for prediction of the current block. As described above, the intra prediction mode information may indicate an intra prediction direction. Accordingly, the pattern of the residual signal of the current block may vary depending on the prediction direction indicated by the intra prediction mode information of the current block. The encoder and the decoder may improve coding efficiency by using a plurality of transform candidate sets that are different depending on the prediction direction.

Accordingly, the encoder and decoder may determine a transform kernel to be used for the transform region of the current block from the transform candidate set corresponding to the intra prediction mode of the current block. For example, the transform kernel to be used for the transform region may be signaled through a candidate index indicating any one of the plurality of candidate transform kernels included in the transform candidate set. If the transform candidate set corresponding to the intra prediction mode of the current block is configured with two candidate transform kernels, the candidate index indicating the transform kernel used for the transform region may be expressed with 1-bit.

In addition, different transform candidate sets may be used for the vertical and horizontal directions of the transform region, respectively. Due to the characteristics of the intra prediction method predicted on the basis of the directionality, a vertical direction pattern and a horizontal direction pattern of the residual signal of a predicted region may be different from each other. Accordingly, a vertical transform kernel and a horizontal transform kernel for a block predicted using a specific intra prediction mode may be obtained from individual transform candidate sets. In the present disclosure, a transform kernel used for vertical transform of the specific transform region may be referred to as a vertical transform kernel. In addition, a transform kernel used for horizontal transform of the specific transform region may be referred to as a horizontal transform kernel. FIG. 13(*a*) represents sets of transform candidates, each set corresponding to each of 67 intra prediction mode indexes. In FIG. 13(*a*), V (vertical) represents a transform candidate set for the vertical transform kernel. In addition, H (horizontal) represents a transform candidate set for the horizontal transform kernel.

FIG. 13(*b*) represents a candidate transform kernel defined according to a transform candidate set. According to an embodiment, a first transform candidate set (e.g., Transform Set 0 in FIG. 13(*b*)) may include a DST-VII-based candidate transform kernel and a DCT-VIII-based candidate transform kernel. In addition, a second transform candidate set (e.g., Transform Set 1 of FIG. 13(*b*)) may include a DST-VII-based candidate transform kernel and a DST-I-based candidate transform kernel. A third transform candidate set (e.g., Transform Set 2 in FIG. 13(*b*)) may include a DST-VII-based candidate transform kernel and a DCT-V-based candidate transform kernel. FIG. 13 illustrates that the transform candidate set includes two candidate transform kernels, but the present disclosure is not limited thereto.

According to another embodiment, the current block may be an inter-predicted block. In this case, the transform kernel used for the transform region of the current block may be obtained from a preset transform candidate set. For example, the preset transform candidate set may be any one of the plurality of transform candidate sets described above. FIG. 13(*c*) represents a transform candidate set corresponding to the current block if the current block is an inter prediction block. For example, the preset transform candidate set corresponding to the inter prediction block may include the DCT-VIII-based candidate transform kernel and the DST-VII-based candidate transform kernel. That is, the transform kernel used for the transform region of the inter prediction block may be any one of the DCT-VIII-based candidate transform kernel and the DST-VII-based candidate transform kernel.

According to an additional embodiment, the embodiments described above may be limitedly applied only to a transform block of a luma component. In this case, a preset basic transform kernel may be used for a transform block of a chroma component. For example, the basic transform kernel may be the DCT-II-based transform kernel.

According to an additional embodiment, the encoder may not signal the candidate index depending on the number of non-zero transform coefficients in the transform region. In this case, the decoder may determine the transform kernel by comparing the number of non-zero transform coefficients in the transform region with a preset number. For example, if the number of non-zero transform coefficients is one or two, the candidate index may not be signaled. In this case, the inverse transformation unit may perform transform using a transform kernel preset for the corresponding region. The preset transform kernel may be the DST-VII-based transform kernel.

According to an additional embodiment, MTS may be applied only to the luma component, and DCT-II transform may be used for the chroma component, like HEVC. As an embodiment, on/off may be indicated with a 1-bit flag so that MTS may be controlled in units of coding units, and if this flag indicates off, DCT-II, which is a basic kernel, may be used, like the chroma component. On the other hand, if this flag indicates on, a transform candidate index used in the preset transform set may be signaled according to the prediction mode and the inverse transform may be performed by applying a transform kernel corresponding to the index in the decoder. Different transforms may be applied to the horizontal and vertical directions, a transform index to be used may be indicated with a total of 2-bit of which each 1-bit for each of the vertical and horizontal directions. Alternatively, the transform index may be indicated using a truncated unary binarization method. For example, if two DST-VII and DCT-VIII-based kernels may be used, four combinations of transform kernels applicable to the current block may be defined, and may be signaled as follows.

{Horizontal: DST-VII, Vertical: DST-VII}, 0

{Horizontal: DCT-VIII, Vertical: DST-VII}, 10

{Horizontal: DST-VII, Vertical: DCT-VIII}, 110

{Horizontal: DCT-VIII, Vertical: DCT-VIII}, 111

According to an embodiment of the present invention, there is a high probability that the combination {horizontal: DST-VII, vertical: DST-VII} is statistically selected in the MTS, if the transform kernel is signaled using the truncated unary binarization method described above rather than signaling the transform kernel using a fixed length of 2-bit, an improvement in encoding efficiency may be expected.

FIG. 14 represents a horizontal transform kernel and a vertical transform kernel determined according to a set index. According to an embodiment of the present invention, information indicating a transform kernel for a residual signal of a specific region among a plurality of usable transform kernels may be signaled. In this case, information indicating any one of the plurality of usable transform kernels may be signaled regardless of the prediction mode corresponding to the corresponding region. For example, the encoder may signal transform kernel information indicating the transform kernel for the residual signal in the specific region. The decoder may obtain a transform kernel for the corresponding region by using the signaled transform kernel information. In this case, the transform kernel information may include at least one of information representing the horizontal transform kernel of the corresponding region or information representing the vertical transform kernel of the corresponding region. This method may be referred to as the multiple transform selection (MTS) described above.

The transform kernel may be indicated by any one of kernel indexes respectively representing the plurality of usable transform kernels. According to an embodiment, the transform kernel corresponding to the kernel index '0' may be the DCT-II-based transform kernel, the transform kernel corresponding to the kernel index '1' may be the DST-VII-based transform kernel, and the transform kernel corresponding to the kernel index '2' may be the DCT-VIII-based transform kernel.

According to an embodiment, the transform kernel information may be a set index representing the transform kernel set. The transform kernel set may represent a combination of a transform kernel to be used as the vertical transform kernel and a transform kernel to be used as the horizontal transform kernel. In addition, the set index may indicate a combination of a kernel index indicating the horizontal transform kernel and a kernel index indicating the vertical transform kernel. Referring to FIG. 14(*a*), if the transform kernel information of a specific region indicates a set index indicating a first transform kernel set (e.g., if tu_mts_idx[x0][y0] in FIG. 14(*a*) is 0), the vertical transform kernel of the corresponding region may be the transform kernel corresponding to the kernel index '0'. In addition, the horizontal transform kernel of the corresponding region may be the transform kernel corresponding to the kernel index '0'.

In addition, FIG. 14(*b*) represents the transform kernels corresponding to the kernel indexes. Referring to FIG. 14(*b*), a transform kernel corresponding to a first kernel index "0" may represent the DCT-II-based transform kernel. A transform kernel corresponding to a second kernel index "1" may represent the DST-VII-based transform kernel. In addition, a transform kernel corresponding to a third kernel index '2' may represent the DCT-VIII-based transform kernel.

According to an additional embodiment, the embodiments described above may be limitedly applied only to a luma block. In this case, a preset basic transform kernel may be used for the chroma component. For example, the basic transform kernel may be the DCT-II-based transform kernel. In addition, the set index described above may be signaled in units of transform blocks.

In addition, information indicating whether or not to signal the set index may be signaled through a header of a high level including the current block. Here, the high level may represent a slice/tile, a picture, or a sequence including the current block. In addition, information indicating whether or not to signal the set index may be signaled through individual flags for each prediction method. For example, in determining a transform kernel of a block, a flag indicating whether or not a set index is used may be independently set for each of the intra-predicted block and the inter-predicted block.

According to an embodiment, if information representing whether or not the set index of the high level including a transform block is signaled represents that the set index is not explicitly signaled, the transform kernel may be determined in a different manner for the corresponding transform block. For example, a transform kernel to be applied to inverse transform of the current transform block may be determined on the basis of information induced from information other than the set index. Specifically, the decoder may induce information indicating a transform kernel for the current transform block from information signaled in relation to the current transform block. That is, information representing the vertical transform kernel and information indicating the horizontal transform kernel to be used for the transform block may be implicitly signaled. According to another embodiment, if information indicating whether or not the set index of the high level including the transform block is signaled indicates that the set index is explicitly signaled, the decoder may obtain a transform kernel for a transform block on the basis of the signaled set index.

According to an additional embodiment, the encoder may determine whether or not the set index is signaled according to the number of non-zero transform coefficients in the transform region. In this case, the decoder may determine a transform kernel by comparing the number of non-zero transform coefficients in the transform region with a preset number. For example, if the number of non-zero transform coefficients is two or less, the set index may not be signaled. In this case, the inverse transformation unit may perform transform on the corresponding region using a transform kernel preset. The preset transform kernel may be the DST-VII-based transform kernel.

FIG. 15 is a diagram representing a method of obtaining transform-related information according to an embodiment of the present invention. Transform of the current block and inverse transform of the transform coefficient of the residual signal may be performed for each transform block (or transform unit). The current block may be configured with at least one transform block. That is, the transform block may be the current block itself or may be a block split from the current block. If the transform block is the current block itself, the size of the transform block may be the same as the size of the current block. According to an embodiment, the current block may be split into a plurality of transform blocks on the basis of the size of the current block. For example, if the size of the current block is greater than the maximum transform size, the current block may be split into the plurality of transform blocks. If the size of the current block is less than or equal to the maximum transform size, the transform block may be the current block itself. As an embodiment, the size of the transform block may be the same as the size of the coding block. That is, the transform block may be split into the same tree structure as the coding block. However, if the size of the coding block is greater than the maximum transform size, the coding block may be split into a plurality of transform blocks having the maximum transform size.

In an embodiment, the maximum transform size may be a value representing a length of one side. For example, the maximum transform size may be 64-length (or point). In this case, if the size (width×height) of the current block is (128×32), the current block may be split into two transform blocks each having a (64×32) size. If the maximum transform size is 32 and the size of the current block is 32×32, the transform block is not split from the current block and may have the same size as the current block.

If both the width and height of the current block are less than or equal to the maximum transform size, the current block is not split into a plurality of transform blocks. Accordingly, the top-left coordinate of the current block and the top-left coordinate of the corresponding transform block are the same. On the other hand, if at least one of the width and height of the current block is greater than the maximum transform size, the current block may be split into a plurality of transform blocks. Accordingly, the top-left coordinate of the current block and the top-left coordinate of the corresponding transform blocks may be different.

FIG. 15(*a*) represents a transform unit syntax. The transform unit syntax represents a process related to transform and inverse transform. The transform unit syntax receives, as factors, (x0, y0), which is the top-left coordinate of the transform block, tbWidth and tbHeight representing the size in the horizontal and vertical directions of the transform block, and treeType representing a tree type.

According to an embodiment, the transform-related information may include coded block flag (cbf) information tu_cbf_luma, tu_cbf_cb, and tu_cdf_cr indicating whether the transform block includes at least one non-zero transform coefficient. The cbf information may be obtained separately according to a component of the transform unit. For example, the transform-related information may include at least one of cbf information tu_cbf_luma[x0][y0] for the luma component and cbf information tu_cbf_cb[x0][y0] and tu_cbf_cr[x0][y0] for two respective chroma components.

According to an embodiment, if cbf information of the transform block represents that the transform block includes at least one non-zero transform coefficient, inverse quantization and inverse transform may be performed on the corresponding transform block. In this case, the decoder may perform inverse quantization on the quantized transform coefficient using residual coding-related information. In addition, the decoder may obtain a residual signal corresponding to the transform block by performing inverse quantization on the inverse quantized transform coefficient. In contrast, if the cbf information of the corresponding transform block represents that the transform block does not include at least one non-zero coefficient, the decoder may not perform inverse quantization and inverse transform on the corresponding transform block. In this case, the decoder may obtain the residual signal without performing inverse quantization and inverse transform processes for the transform block. As an example, if cbf information of a transform block does not exist, the cbf information may be regarded as that the transform block does not include at least one non-zero coefficient. The encoder may perform entropy coding on cbf information through the entropy coding unit described above. In addition, the decoder may obtain cbf information from a bitstream through the entropy decoding unit described above.

A tree structure for the luma component and a tree structure for the chroma component may be encoded in the same or different ways. Accordingly, cbf information may be obtained on the basis of information (treeType) representing the tree type of the transform block (S1501). According to an embodiment, if the treeType of the transform block represents SINGLE_TREE, the tree structure of the transform block for the luma component of the current block and the tree structure of the transform block for the chroma component of the current block may be the same. In this case, cbf information for the luma component and cbf information for each of the chroma components may be obtained. According to another embodiment, if the treeType of the transform block represents DUAL_TREE_LUMA or DUAL_TREE_CHROMA, the luma component and the chroma component of the current block may be split into transform blocks having different structures, respectively. If the treeType of the transform block represents DUAL_TREE_LUMA, it means that the transform block currently being processed is a luma component block. Accordingly, cbf information on the luma component may be obtained. In addition, if the treeType information of the transform block represents DUAL_TREE_CHROMA, it means that the transform block currently being processed is a chroma component block. Accordingly, cbf information on the chroma component may be obtained.

In FIG. 15(*a*), tu_cbf_luma[x0][y0] is an element indicating whether the luma component transform block includes at least one non-zero coefficient, and if tu_cbf_luma [x0][y0] is 1, it expresses that a non-zero coefficient exists in a corresponding transform block whose position of the top-left luma component sample of the block is (x0, y0) with the position of the top-left luma component sample of the picture as a reference. As an example, if tu_cbf_luma[x0] [y0] does not exist, it may be inferred as 0. If tu_cbf_luma [x0][y0] is 0, it represents that all coefficients in the corresponding luma transform block are 0, and thus the decoder may reconstruct the corresponding residual signal for the luma component without having been subjected to additional parsing, inverse quantization, and inverse transform. If tu_cbf_luma[x0][y0] is 1, it means that one or more non-zero transform coefficients exist in the corresponding luma transform block, and thus the parsing and inverse quantization processes of a syntax element related to the transform coefficient are required in a residual_coding syntax structure, and a residual signal may be reconstructed by applying inverse transform to the inverse quantized coefficient. The tu_cbf_luma[x0][y0] may be encoded/decoded using a regular coding engine of CABAC that considers context.

The tu_cbf_cb[x0][y0] is an element indicating whether the chroma component Cb transform block includes one or more non-zero coefficients, and if tu_cbf_cb[x0][y0] is 1, it expresses that a non-zero coefficient exists in a corresponding transform block whose top-left position is (x0, y0). As an example, if tu_cbf_cb[x0][y0] does not exist, it may be inferred as 0. If tu_cbf_cb[x0][y0] is 0, it represents that all coefficients in the corresponding Cb transform block are 0, and thus the decoder may reconstruct the residual signal for a Cb signal without having been subjected to additional parsing, inverse quantization, and inverse transform. If tu_cbf_cb[x0][y0] is 1, it means that one or more non-zero transform coefficients exist in the corresponding Cb transform block, and thus the parsing and inverse quantization processes of the syntax element related to the transform coefficient are required in the residual_coding syntax structure, and a residual signal may be reconstructed by applying inverse transform to the inverse quantized coefficient. The tu_cbf_cb[x0][y0] may be encoded/decoded using the regular coding engine of CABAC that considers context.

The tu_cbf_cr[x0][y0] is an element indicating whether the chroma component Cr transform block includes one or more non-zero coefficients, and if tu_cbf_cr[x0][y0] is 1, it expresses that a non-zero coefficient exists in a corresponding transform block whose top-left position is (x0, y0). As an example, if tu_cbf_cr[x0][y0] does not exist, it may be inferred as 0. If tu_cbf_cr[x0][y0] is 0, it represents that all coefficients in the corresponding Cr transform block are 0, and thus the decoder may reconstruct the residual signal for a Cr signal without having been subjected to additional parsing, inverse quantization, and inverse transform. If tu_cbf_cr[x0][y0] is 1, it means that one or more non-zero transform coefficients exist in the corresponding Cr transform block, and thus the parsing and inverse quantization processes of the syntax element related to the transform coefficient are required in the residual_coding syntax structure, and a residual signal may be reconstructed by applying inverse transform to the inverse quantized coefficient. The tu_cbf_cr[x0][y0] may be encoded/decoded using the regular coding engine of CABAC that considers context.

Next, the encoder and decoder may check a condition for parsing MTS information cu_mts_flag representing whether the MTS method is used for the current transform block (S1502). In the following, the condition for parsing cu_mts_flag will be described. First, whether or not cu_mts_flag is parsed may be determined on the basis of high level MTS information sps_mts_intra_enabled_flag and sps_mts_inter_enabled_flag signaled through the high level header of the current transform block. The high level MTS information may be information representing whether a transform kernel other than the basic transform kernel may be used. According to an embodiment, if sps_mts_intra_enabled_flag is 0, it may represent that cu_mts_flag corresponding to an intra-predicted block belonging to a corresponding SPS does not exist. In this case, cu_mts_flag is not parsed. In contrast, if sps_mts_intra_enabled_flag is 1, it may represent that cu_mts_flag corresponding to the intra-predicted block belonging to the corresponding SPS exists. In this case, cu_mts_flag may be signaled and parsed.

Similarly, if sps_mts_inter_enabled_flag is 0, it may represent that cu_mts_flag corresponding to the inter-predicted block belonging to the corresponding SPS does not exist. In this case, cu_mts_flag is not parsed. In contrast, if sps_mts_inter_enabled_flag is 1, it may represent that cu_mts_flag corresponding to the inter-predicted block belonging to the corresponding SPS exists. In this case, cu_mts_flag may be signaled and parsed. The high level MTS information may be signaled through a high level syntax such as a header of a sequence, picture, or slice/tile.

In addition, CuPredMode[x0][y0] is a variable representing a prediction mode of a transform block whose position of the top-left luma component sample is (x0, y0) with the luma component top-left coordinate of the picture as a reference. If CuPredMode[x0][y0] is MODE INTRA, it represents that intra prediction is applied to the corresponding block. In addition, CuPredMode[x0][y0] is MODE_INTER, it represents that inter prediction is applied to the corresponding block. That is, in S1502, (CuPredMode[x0][y0]==MODE_INTRA) && sps_mts_intra_enabled_flag) checks, if intra prediction is applied to the current transform block, whether MTS may be applied. In addition, in S1502, (CuPredMode[x0][y0]==MODE_INTER) && sps_mts_inter_enabled_flag) checks, if inter prediction is applied to the current transform block, whether MTS may be applied.

In addition, whether or not to parse cu_mts_flag may be determined on the basis of tu_cbf_luma[x0][y0]. This is because if tu_cbf_luma[x0][y0] represents that all coefficients of the luma component of the corresponding transform block are 0, it is not necessary to perform inverse transform. According to an additional embodiment, only a DCT-II-based transform kernel may be used for transform for a chroma component. In addition, whether or not to parse cu_mts_flag may be determined on the basis of whether the height tbHeight and width tbWidth of the transform block are less than or equal to a preset length. The conditions described above are summarized as follows.

Condition i) sps_mts_intra_enabled_flag==1 and CuPredMode[x0][y0]==MODE INTRA or sps_mts_inter_enabled_flag==1 and CuPredMode[x0][y0]==MODE_INTER, Condition ii) tu_cbf_luma[x0][y0]==1, Condition iii) treeType!=DUAL_TREE_CHROMA, Condition iv) tbWidth<=32, and tbHeight<=32.

If all four the conditions described above are satisfied, the decoder may parse cu_mts_flag. In addition, the encoder may perform entropy coding on cu_mts_flag and signal cu_mts_flag. If cu_mts_flag[x0][y0] is 1, it may mean that the MTS method is applied to the current transform block. In contrast, if cu_mts_flag[x0][y0] is 0, it may represent that the MTS method is not applied to the current transform block. In this case, inverse transform may be performed using a basic kernel such as a DCT-II-based transform kernel. If cu_mts_flag[x0][y0] does not exist, cu_mts_flag[x0][y0] may be inferred as '0'.

According to an embodiment of the present invention, a transform kernel used for transform of a transform block may be signaled stepwisely through the high level header of the current block and a header of the transform block. First, information representing whether a transform kernel other than the basic transform kernel may be used in a sequence, picture, or slice/tile including the current block may be signaled through the high level header. In addition, the information may be individually signaled for intra prediction and inter prediction. According to and a specific embodiment, sps_mts_intra_enabled_flag sps_mts_inter_enabled_flag may be signaled through the header of the sequence, picture, or slice/tile. The sps_mts_intra_enabled_flag may be information representing whether the transform kernel other than the basic transform kernel may be used for transform of an intra predicted block. In addition, sps_mts_inter_enabled_flag may be information representing whether the transform kernel other than the basic transform kernel may be used for transform of the inter-predicted block. The basic transform kernel may be a DCT-II based transform kernel.

That is, if sps_mts_intra_enabled_flag represents that use of a transform kernel other than the basic transform kernel is not allowed and the current block is an intra-predicted block, information related to the transform kernel of the transform block obtained from the current block may not be additionally parsed. In this case, the corresponding transform block may be transformed on the basis of the basic transform kernel. In addition, if sps_mts_inter_enabled_flag represents that use of the transform kernel other than the default transform kernel is not allowed and the current block is an inner-predicted block, information related to the transform kernel of the transform block obtained from the current block may not be additionally parsed. In this case, the corresponding transform block may be transformed on the basis of the basic transform kernel.

On the other hand, if the information signaled through the high level header represents that the transform kernel other than the basic transform kernel may be used, additional information related to the transform kernel of the corresponding transform block may be signaled through the header of the transform block. For example, in transforming a transform block, information representing whether the transform kernel other than the basic transform kernel is used may be signaled through a header of the corresponding transform block.

According to an embodiment of the present invention, use of the transform kernel other than the basic transform kernel for the transform block may be limited according to the size of the corresponding transform block. For example, if the size of the transform block is greater than a preset size, use of the transform kernel other than the basic transform kernel may be limited in transforming the corresponding transform block. According to an embodiment, if at least one of the height or width of a transform block is longer than a preset length, use of the transform kernel other than a basic transform kernel may not be allowed in transforming the corresponding transform block. For example, the preset length may be 32. Referring to FIG. 15(*a*), if a transform block has a width of 32 or less and a height of 32 or less, cu_mts_flag[x0][y0] signaled through the header of the transform block described above may be parsed.

As shown in FIG. 15(*a*), if the cbf information described above represents that the transform block includes at least one non-zero transform coefficient, a process of obtaining a quantized transform coefficient for the corresponding transform block may be performed (S1503 to S1505). In S1503, if tu_cbf_luma[x0][y0]==1, residual coding may be performed on the luma component of the transform block. That is, a residual coding syntax structure residual_coding( ) process of receiving a specific input factor may be performed. Specifically, residual_coding( ) may receive, as input factors, the coordinates (x0, y0) of the top-left sample of a transform block, a value log 2(tbWidth) obtained by taking a logarithm of base 2 to a width of the transform block, and a value log 2(tbHeight) obtained by taking a logarithm of base 2 to a height of the transform block. In addition, residual_coding( ) may receive a color index cdIdx as an input factor. If a value of cdIdx is '0', it means the luma component luma, if the value of cdIdx is '1', it means the first chroma component Cb, and if the value of cdId is '2', it represents the second chroma component Cr.

In S1504, if tu_cbf_cb[x0][y0]==1, residual coding for the first chroma component may be performed. Specifically, residual_coding( ) may receive the coordinates (x0, y0) of the top-left sample of the transform block as an input factor. If a color format YCbCr is 4:2:0, the size of the transform block for the chroma component may be half the size of the luma component block. Accordingly, residual_coding( ) may receive, as input factors, a value log 2(tbWidth/2) obtained by taking a logarithm of base 2 to the width tbWidth/2 of the chroma component block and a value log 2 (tbHeight/2) obtained by taking a logarithm of base 2 to the height tbHeight/2 of the chroma component block. Meanwhile, if the color format YCbCr is 4:4:4, the size of the chroma component block of the transform block may be the same as the size of the luma component block. In this case, residual_coding( ) similar to residual coding for the luma component, may receive, as input factors, the value log 2 (tbWidth) obtained by taking a logarithm of base 2 to the width of the transform block, and the value log 2 (tbHeight) obtained by taking a logarithm of base 2 to the height of the transform block.

In S1505, if tu_cbf_cr[x0][y0]==1, residual coding for the second chroma component may be performed. Specifically, residual_coding( ) may receive the coordinates (x0, y0) of the top-left sample of the transform block as an input factor. If the color format YCbCr is 4:2:0, the size of the transform block for the chroma component may be half the size of the luma component block. Accordingly, residual_coding( ) may receive, as input factors, the value log 2 (tbWidth/2) obtained by taking a logarithm of base 2 to the width tbWidth/2 of the chroma component block and the value log 2 (tbHeight/2) obtained by taking a logarithm of base 2 to the height tbHeight/2 of the chroma component block. Meanwhile, if the color format YCbCr is 4:4:4, the size of the chroma component block of the transform block may be the same as the size of the luma component block. In this case, residual_coding( ), similar to residual coding for the luma component, may receive, as input factors, the value log 2 (tbWidth) obtained by taking a logarithm of base 2 to the width of the transform block, and the value log 2 (tbHeight) obtained by taking a logarithm of base 2 to the height of the transform block.

The decoder may perform inverse quantization and inverse transform for a corresponding transform block on the basis of the transform-related information described above. The decoder may perform inverse quantization and inverse transform to obtain a residual signal corresponding to a transform block. Specifically, the decoder may obtain a residual signal from the quantized transform coefficient of the transform block through the residual coding syntax residual_coding( ) of FIG. 15(*b*).

The residual_coding( ) of FIG. 15(*b*) receives, as factors, the top-left coordinate of a transform block obtained from the current block, a value obtained by taking a logarithm of base 2 to a width of the transform block, a value obtained by taking a logarithm of base 2 to a height of the transform block, and a color index cIdx, with the basis of the top-left coordinate of the picture including the current block as a reference. In addition, the residual coding syntax structure may include syntax elements related to the quantized transform coefficient existed in the transform block, and the decoder may obtain a quantized transform coefficient block by parsing syntax elements related to the quantized transform coefficient included in the residual syntax structure. The inverse transformation unit of the decoder reconstructs a residual signal corresponding to the transform block by performing inverse quantization and inverse transform on the quantized transform coefficient block.

According to an embodiment, the decoder may determine whether or not to parse a transform skip flag transform_skip_flag of the current transform block (S1506). Conditions for parsing transform_skip_flag are as follows.

Condition i) If transform_skip_enabled_flag, which is a 1-bit flag included in the high level syntax, is 1 (on): The transform_skip_enabled_flag may be included in any one of a sequence parameter set (SPS), a picture parameter set (PPS), and a slice header, and if transform_skip_enabled_flag is 1, it represents that transform_skip_flag exists in the residual coding syntax, and if transform_skip_enabled_flag is 0, it represents that transform_skip_flag does not exist in the residual coding syntax.

Condition ii) If the luma component transform block is not (cIdx!=0) or MTS is not applied (cu_mts_flag[x0][y0]==0): Transform skip may be applied to both the luma component and the chroma component. If MTS is applied to the luma component transform block (cIdx==0 && cu_mts_flag[x0][y0]==1), it is obvious to perform the transform, and thus it is not necessary to encode/decode trnasform_skip_flag[x0][y0][cIdx].

Condition iii) If the width of the transform block is less than or equal to 4 (log 2TbWidth<=2) and the height is less than equal to 4 (log 2TbHeight<=2).

Whether or not to parse transform_skip_flag[x0][y0][cIdx] may be determined according to the conditions described above. If transform_skip_flag[x0][y0][cIdx] is 1, the decoder may not perform the transform. If transform_skip_flag[x0][y0][cIdx] is 0, the decoder may determine whether or nto to transform the current transform block by referring to other syntax elements. Through the residual_coding( ) portion omitted in FIG. 15(*b*), the decoder may perform a process of parsing and reconstructing the quantized transform coefficient.

Next, the decoder may determine whether or not to parse a set index mts_idx (S1507). Conditions for parsing mts_idx are as follows.

i) If cu_mts_flag[x0][y0]==1 and luma component transform block (cIdx==0)

ii) If transform_skip_flag[x0][y0]==0: transform_skip_flag[x0][y0]==1, it indicates that the transform skip is applied, and thus it is not necessary to determine which transform kernel is used.

iii) If the current transform block is at least a part of an intra-predicted block (CuPredMode[x0][y0]==MODE_INTRA) and there are 3 or more non-zero coefficients in the corresponding block (numSigCoeff>2), or if the current transform block is at least a part of an inter-predicted block ((CuPredMode[x0][y0]==MODE_INTER) (where, numSigCoeff variable represents the number of non-zero coefficients that exist in the transform block).

Regarding the condition iii), if the number of non-zero coefficients that exist in the transform block is 2 or less (1 or 2), the transform using a preset transform kernel may be performed without signaling/parsing of mts_idx[x0][y0] for the current transform block. In this case, the preset transform kernel may be a DST-VII-based transform kernel, and a DST-IV-based transform kernel may be used instead of the DST-VII-based transform kernel.

According to an embodiment of the present invention, the energy distribution of the residual signal is correlated with a shape of the block, and thus if the transform kernel is adaptively applied in consideration of the shape of the block, the residual signal may be encoded more efficiently.

FIG. 16 is a diagram for describing a method of selecting a transform kernel on the basis of a shape of a block according to an embodiment of the present invention. According to an embodiment of the present invention, if the MTS flag (e.g., cu_mts_flag) indicating that MTS is applied to the current block is 0, the encoder/decoder may select a transform kernel (or transform type) for the intra block according to the shape of the block (or the width/height of the block). If the MTS flag is 0, an MTS index (e.g., mts_idx) indicating a specific transform kernel applied to the current block is not signaled and may be inferred as −1. In embodiments to be described later, if the MTS flag is 0, the encoder/decoder may select a transform kernel used for the intra-predicted block according to the size or shape of the current block, and apply DCT-II to the horizontal and vertical directions for the inter-predicted block regardless of the shape of the block.

In the present invention, a case in which MTS is applied and a case in which MTS is not applied are described separately on the basis of the MTS flag, but the present invention is not limited to this expression. For example, whether or not to apply MTS may represent the same meaning as whether or not a transform kernel other than a specific predefined transform kernel (which may be referred to as a basic transform type, a default transform type, etc.) is used. If MTS is applied, a transform type (e.g., any one of a plurality of transform types or a combined transform type of two or more of the transform types) other than the basic transform type may be used for the transform, and if MTS is not applied, the basic transform type may be used for the transform. As an example, the basic transform type may be set (or defined) as DCT-II.

In an embodiment of the present invention, if the intra-predicted block is a quadrate block (i.e., a square block), the encoder/decoder may apply DCT-II to a transverse direction (or a horizontal direction) and a longitudinal direction (or a vertical direction). In addition, if the intra-predicted block is a rectangular block (i.e., a non-square block), the encoder/decoder may apply DCT-II for a long-length direction and DST-VII for a short-length direction. In this case, if the short-length is greater than the maximum transform size of DST-VII, the encoder/decoder may use DCT-II. For example, if the maximum transform size of DST-VII is 16-point (or 32-length), DCT-II is applied for the transverse direction of 64×16 blocks and DST-VII is applied for the longitudinal direction. In addition, for a 64×32 block, DCT-II may be applied to both the transverse and longitudinal directions.

In addition, in an embodiment of the present invention, if the intra-predicted block is a square block, the encoder/decoder may apply DCT-II to the transverse and longitudinal directions, and if the intra-predicted block is a rectangular block, the encoder/decoder may apply DCT-II to a long-length direction and use DCT-II or DST-VII for a short-length direction by signaling a 1-bit flag. However, if the length of the short side is greater than the maximum transform size of DST-VII, the encoder/decoder may use DCT-II without signaling of the 1-bit flag. For example, if the maximum transform size of DST-VII is 16-point, DCT-II may be applied to the horizontal direction of 64×16, DCT-II or DST-VII may be applied to the vertical direction by parsing the 1-bit flag, and DCT-II may be applied to both horizontal and vertical directions. DST-VII may be considered efficient due to the characteristics of intra prediction, but the case of using DCT-II rather than DST-VII may incur lower the rate-distortion cost, and thus, unlike the previous embodiment, in this embodiment, DCT-II may be additionally considered for the short-length direction with 1-bit signaling. That is, if the 1-bit flag is 0, it may represent that DCT-II is applied to the short-length direction, and if the 1-bit flag is 1, it may represent that DST-VII is applied to the short-length direction. In one embodiment, the 1-bit flag may be encoded/decoded using the regular coding engine of CABAC using context.

In addition, in an embodiment of the present invention, for the intra-predicted block, the encoder/decoder may apply, in the case of the square block, DCT-II to the transverse and longitudinal directions and may apply, in the case of the rectangular block, DCT-II to a long-length direction and DST-IV or DST-VII to a short-length direction. However, if the short-length is greater than the maximum transform size of DST-VII, DCT-II may be applied thereto. As described above, DST-VII has a high implementation complexity, and thus DST-IV having a similar low-frequency basis function pattern may be used instead. However, if DST-VII is replaced with DST-IV for all sizes, encoding efficiency may be degraded, and thus DST-IV may be used for a 4-point size, which is a small size, and DST-VII may be used for other sizes.

In addition, in an embodiment of the present invention, for the intra-predicted block, the encoder/decoder may apply, in the case of the square block, DCT-II to the transverse and longitudinal directions, and may apply, in the case of the rectangular block, DCT-II to a long-length direction and determine a transform kernel according to an intra prediction mode for a short-length direction. As an example, if the intra prediction mode is a DC mode or a planar mode that are non-directional modes, the encoder/decoder may apply DCT-II to a short-length direction.

If the intra prediction mode is a horizontal direction mode (i.e., an intra prediction mode greater than or equal to a horizontal diagonal mode and less than or equal to a center diagonal mode) for a horizontal rectangle having a transverse length longer than a longitudinal length of the block, the encoder/decoder may apply DCT-II to the short-length direction (longitudinal direction). If the intra prediction mode is a vertical direction mode (i.e., an intra prediction mode that is greater than the center diagonal mode and less than or equal to the vertical diagonal mode), the encoder/decoder may apply DST-VII to the short-length direction. If the intra prediction mode is a horizontal direction mode, for a vertical rectangle having a longitudinal length longer of a block than a transverse length thereof, the encoder/decoder may apply DST-VII to a shorter-length direction (transverse direction), and if the intra prediction mode is a vertical direction mode, the encoder/decoder may apply DST-VII.

According to an embodiment of the present invention, whether or not to apply shape adaptive transform (SAT) representing a method of adaptively determining a transform kernel based on the block shape of the embodiments described above may be signaled from the encoder to the decoder through a high level syntax. As an embodiment, whether or not to apply SAT may be signaled through a sequence parameter set (SPS), a picture parameter set (PPS), a slice header, and a tile header. In addition, a syntax element indicating whether or not to apply SAT may be a 1-bit flag. In the following, methods of indicating whether or not to apply SAT in a high level syntax will be described. In the present invention, for convenience of description, a method of adaptively determining a transform kernel on the basis of a size or shape of a block is referred to as SAT, but the present invention is not limited to this name. For example, the SAT may be referred to as implicit MTS.

In the following, with reference to Tables 1 to 8, a syntax signaling method related to whether or not to apply SAT will be described as an example. The embodiment will be described mainly on the case where a flag representing whether or not to apply SAT is included in the SPS, but the present invention is not limited thereto.

TABLE 1

```
sps_mts_enabled_flag
sps_sat_enabled_flag
```

Referring to Table 1, in an embodiment of the present invention, a syntax element representing whether or not to apply SAT may be signaled independently from a syntax element representing whether or not to apply MTS. That is, as an embodiment, sps_mts_enabled_flag indicating whether MTS may be applied to the current sequence may be signaled, and sps_sat_enabled_flag indicating whether SAT may be applied to the current sequence may be signaled regardless of a value of sps_mts_enabled_flag. That is, apart from sps_mts_enabled_flag, it may be determined whether SAT may be applied to the current sequence according to a value of sps_sat_enabled_flag.

TABLE 2

```
sps_mts_enabled_flag
if( !sps_mts_enabled_flag )
  sps_sat_enabled_flag
```

Referring to Table 2, in an embodiment of the present invention, a syntax element representing whether or not to apply SAT may be determined according to a syntax element representing whether or not to apply MTS. As an embodiment, sps_mts_enabled_flag indicating whether MTS may be applied to the current sequence may be signaled first, and whether or not to signal sps_sat_enabled_flag indicating whether SAT may be applied to the current sequence may be determined according to a value of sps_mts_enabled_flag. For example, if sps_mts_enabled_flag is 1, sps_sat_enabled_flag may not be signaled. In this case, sps_sat_enabled_flag may be set to (or inferred as) 0 without signaling, which may represent that SAT is not used for all blocks in the current sequence. If sps_mts_enabled_flag is 0, sps_sat_enabled_flag may be signaled, and the decoder may determine whether SAT may be used in the current sequence depending on a value of sps_sat_enabled_flag signaled.

TABLE 3

```
sps_mts_enabled_flag
if( !sps_mts_enabled_flag )
  sps_sat_enabled_flag
```

Referring to Table 3, in an embodiment of the present invention, a syntax element representing whether or not to apply SAT may be determined according to a syntax element representing whether or not to apply MTS. As an embodiment, sps_mts_enabled_flag indicating whether MTS may be applied to the current sequence may be signaled first, and whether or not to signal sps_sat_enabled_flag indicating whether SAT may be applied to the current sequence may be determined according to a value of sps_mts_enabled_flag. For example, if sps_mts_enabled_flag is 1, sps_sat_enabled_flag may not be signaled. In this case, sps_sat_enabled_flag may be set to 1 (or inferred) without signaling, which may represent that SAT may be used for all blocks in the current sequence. If sps_mts_enabled_flag is 0, sps_sat_enabled flag may be signaled, and the decoder may determine whether SAT may be used in the current sequence depending on a value of sps_sat_enabled_flag signaled.

TABLE 4

```
sps_mts_enabled_flag
if( !sps_mts_enabled_flag )
  sps_only_dct2_enabled_flag
```

Referring to Table 4, in an embodiment of the present invention, whether or not to apply SAT may be determined according to a flag (or syntax element) indicating that only the DCT-II transform kernel is used in the current sequence. As an embodiment, sps_mts_enabled_flag indicating whether MTS may be applied to the current sequence may be signaled first, and sps_only_dct2_enabled_flag, which is a flag indicating whether only the DCT-II transform kernel is used in the current sequence, may be signaled according to sps_mts_enabled_flag. For example, if sps_mts_enabled_flag is 0, sps_only_dct2_enabled_flag may be signaled. If sps_only_dct2_enabled_flag is 1, it may represent that all blocks in the current sequence may not use SAT, and if sps_only_dct2_enabled_flag is 0, it may represent that SAT may be used in the current sequence. If sps_mts_enabled_flag is 1, sps_only_dct2_enabled_flag may be set to (or inferred as) 0 without signaling, and if sps_only_dct2_enabled_flag is set to (or inferred as) 0, it may represent that SAT may be used in the current sequence.

TABLE 5

```
sps_only_dct2_enabled_flag
if( !sps_only_dct2_enabled_flag )
  sps_mts_enabled_flag
```

Referring to Table 5, in an embodiment of the present invention, whether or not to apply SAT may be determined according to a flag (or syntax element) indicating that only the DCT-II transform kernel is used in the current sequence. As an embodiment, sps_only_dct2_enabled_flag, which is a flag indicating whether only the DCT-II transform kernel is used in the current sequence, may be signaled first. In addition, whether or not to signal sps_mts_enabled_flag, which is a flag indicating whether MTS may be used in the current sequence, may be determined according to sps_only_dct2_enabled_flag. For example, if sps_only_dct2_enabled_flag is 1, sps_mts_enabled_flag may be set to 0 (or inferred) without signaling, and sps_sat_enabled_flag, which is a flag indicating whether SAT may be applied to the current sequence, may be set to 0 without signaling. If sps_only_dct2_enabled_flag is 0, sps_mts_enabled_flag may be signaled, and accordingly, sps_sat_enabled_flag is set to 1 without signaling, and thus the decoder may apply SAT to the current sequence.

TABLE 6

```
sps_only_dct2_enabled_flag
if( !sps_only_dct2_enabled_flag )
{
  sps_mts_enabled_flag
  sps_sat_enabled_flag
}
```

Referring to Table 6, in an embodiment of the present invention, whether or not to apply SAT may be determined according to a flag (or syntax element) indicating that only the DCT-II transform kernel is used in the current sequence. As an embodiment, sps_only_dct2_enabled_flag, which is a flag indicating whether only the DCT-II transform kernel is used in the current sequence, may be signaled first. In addition, whether or not to signal sps_mts_enabled_flag, which is a flag indicating whether MTS may be applied to the current sequence, may be determined according to sps_only_dct2_enabled_flag. For example, if sps_only_dct2_enabled_flag is 1, sps_mts_enabled_flag may be set to (or inferred as) 0 without signaling, and sps_sat_enabled_flag, which is a flag indicating whether SAT may be applied to the current sequence, may be set to (or inferred as) 0 without signaling. If sps_only_dct2_enabled_flag is 0, sps_mts_enabled_flag and sps_sat_enabled_flag may be signaled, and whether SAT may be used in the current sequence may be determined according to a value of signaled sps_sat_enabled_flag.

TABLE 7

```
sps_only_dct2_enabled_flag
if( !sps_only_dct2_enabled_flag )
{
  sps_mts_enabled_flag
  if( !sps_mts_enabled_flag )
    sps_sat_enabled_flag
}
```

Referring to Table 7, in an embodiment or the present invention, whether or not to apply SAT may be determined according to a flag (or syntax element) indicating that only the DCT-II transform kernel is used in the current sequence and a flag indicating whether MTS may be applied to the current sequence (or syntax element). As an embodiment, sps_only_dct2_enabled_flag, which is a flag indicating whether only the DCT-II transform kernel is used in the current sequence, may be signaled first. In addition, whether or not to signal sps_mts_enabled_flag, which is a flag indicating whether MTS may be applied to the current sequence, may be determined according to a value of sps_only_dct2_enabled_flag. For example, if sps_only_dct2_enabled_flag is 1, sps_mts_enabled_flag may be set to (or inferred as) 0 without signaling, and sps_sat_enabled_flag, which is a flag indicating whether SAT may be applied to the current sequence, may be set to (or inferred as) 0 without signaling.

In addition, if sps_only_dct2_enabled_flag is 0, sps_mts_enabled_flag may be signaled. In addition, if sps_mts_enabled_flag is 0, it may be determined whether or not SAT may be used in the current sequence according to the signaled sps_sat_enabled_flag value. On the other hand, if sps_mts_enabled_flag is 1, sps_sat_enabled_flag may be set to 0 without signaling, which may represent that SAT may not be applied to the current sequence.

According to an embodiment of the present invention, if sps_mts_enabled_flag, which is a flag indicating whether MTS may be applied to the current sequence, is 0, a syntax element indicating whether an explicit MTS may be used may be inferred as 0. If the syntax element indicating whether the explicit MTS may be used is 0, the MTS index is not signaled and may be inferred as 0. If sps_mts_enabled_flag is 1, the syntax element indicating whether the explicit MTS may be used may be signaled. If the syntax element indicating whether the explicit MTS may be used is 1, an MTS index may be signaled. If the syntax element indicating whether the explicit MTS may be used is 0, an implicit MTS may be used.

TABLE 8

```
sps_only_dct2_enabled_flag
if( !sps_only_dct2_enabled_flag )
{
  sps_mts_enabled_flag
  if( !sps_mts_enabled_flag )
    sps_sat_enabled_flag
}
```

Referring to Table 8, in an embodiment of the present invention, whether or not to apply SAT may be determined according to a flag (or syntax element) indicating that only the DCT-II transform kernel is used in the current sequence and a flag indicating whether MTS may be applied to the current sequence (or syntax element). As an embodiment, sps_only_dct2_enabled_flag, which is a flag indicating whether only the DCT-II transform kernel is used in the current sequence, may be signaled first. In addition, whether or not to signal sps_mts_enabled_flag, which is a flag indicating whether MTS may be applied to the current sequence, may be determined according to a value of sps_only_dct2_enabled_flag. For example, if sps_only_dct2_enabled_flag is 1, sps_mts_enabled_flag, which is a flag indicating whether MTS may be applied to the current sequence, may be set to (or inferred as) 0 without signaling, and sps_sat_enabled_flag, which is a flag indicating whether SAT may be applied to the current sequence, may be set to (or inferred as) 0 without signaling.

In addition, if sps_only_dct2_enabled_flag is 0, sps_mts_enabled_flag may be signaled. In addition, if sps_mts_enabled_flag is 0, it may be determined whether or not SAT may be used in the current sequence according to the signaled sps_sat_enabled_flag value. On the other hand, if sps_mts_enabled_flag is 1, sps_sat_enabled_flag may be set to 1 without signaling, which may represent that SAT may be applied to the current sequence.

According to an embodiment of the present invention, if sps_mts_enabled_flag, which is a flag indicating whether MTS may be applied to the current sequence, is 0, a syntax element indicating whether an explicit MTS may be used may be inferred as 0. If a syntax element indicating whether or not the explicit MTS may be used is 0, the MTS index is not signaled and may be inferred as 0. If sps_mts_enabled_flag is 1, the syntax element indicating whether or not the explicit MTS may be used may be signaled. If the syntax element indicating whether or not the explicit MTS may be used is 1, an MTS index may be signaled. If the syntax element indicating whether or not the explicit MTS may be used is 0, an implicit MTS may be used.

FIG. 17 is a diagram illustrating a method of signaling and determining a transform kernel according to an embodiment of the present invention. Referring to FIG. 17, mts_idx [xTbY][yTbY][cIdx] represents a syntax element (or variable) indicating a transform kernel applied to a transform block whose top-left coordinate of the luma component is (xTbY, yTbY) with the top-left coordinate of the luma component of the picture as a reference. The cIdx is a variable representing the color component, and may be set to 0 in the case of the luma component Y, 1 in the case of the chroma component Cb, and 2 in the case of the chroma component Cr.

According to an embodiment of the present invention, a transform kernel (or transform type) used in MTS may be configured with {DST-VII, DCT-VIII}. Combinations of transform kernels that may be applied to the horizontal and vertical directions of the transform block may be configured with a total of four combinations (e.g., {Horizontal: DST-VII, Vertical: DST-VII}, {Horizontal: DCT-VIII, Vertical: DST-VII}, {Horizontal: DST-VII, Vertical: DCT-VIII}, {Horizontal: DCT-VIII, Vertical: DCT-VIII}). On the other hand, if MTS is not used, one combination ({Horizontal: DCT-II, Vertical: DCT-II}) may be used. In FIG. 17, trTypeHor and trTypeVer are variables indicating the transform kernel (or transform type) applied to the horizontal direction and the vertical direction, respectively. As an example, 0 may represent DCT-II, 1 may represent DST-VII, and 2 may represent DCT-VIII. If tu_mts_flag does not exist, mts_idx may be set to (or inferred as) −1 without signaling. In this case, the DCT-II kernel may be applied to both the horizontal direction and the vertical direction.

In one embodiment, mts_idx may be signaled with a 2-bit of a fixed length. Referring to FIG. 17, if mts_idx is 0, it may be signaled as a bit string 00, and in this case, DST-VII may be applied to both the horizontal direction and the vertical direction. If mts_idx is 1, it may be signaled as a bit string 01, and in this case, DCT-VIII may be applied to the horizontal direction and DST-VII may be applied to the vertical direction. If mts_idx is 2, it may be signaled as a bit string 10, and in this case, DST-VII may be applied to the horizontal direction and DCT-VIII may be applied to the vertical direction. If mts_idx is 3, it may be signaled as a bit string 11, and in this case, DCT-VIII may be applied to both the horizontal direction and the vertical direction.

In the method of determining the transform kernel according to mts_idx described above, an embodiment in which the transform kernel set is configured with {DST-VII, DCT-VIII} has been described, but the present invention is not limited thereto, and the transform kernel applied to the horizontal direction and the vertical direction may be determined according to mts_idx as in the following i) to v) in a transform kernel set configured with a plurality of transform kernels.

i) If mts_idx is −1: Horizontal-DCT-II, Vertical-DCT-II ii) If mts_idx is 0: Horizontal-first candidate in transform set, Vertical-first candidate in transform set iii) If mts_idx is 1: Horizontal-second candidate in transform set, Vertical-first candidate in transform set iv) If mts_idx is 2: Horizontal-first candidate in transform set, Vertical-second candidate in transform set v) If mts_idx is 3: Horizontal-second candidate in transform set, Vertical-second candidate in transform set In the syntax structure related to transform of FIG. 15 previously described, a method of signaling MTS and transform skip (TS) using different syntax elements has been described, but, if MTS and TS are signaled using one syntax element, syntax parsing efficiency may be improved and the syntax structure may be expressed more concisely. Accordingly, a method of signaling MTS and TS using one syntax element will be described with reference to the following drawings.

FIG. 18 represents a syntax structure for obtaining information related to a multiple transform selection and transform skip according to an embodiment of the present invention, and FIG. 19 is a diagram illustrating the information related to the multiple transform selection and transform skip according to an embodiment of the present invention. According to an embodiment of the present invention, MTS and TS may be signaled using one syntax element. In describing the embodiment of FIG. 18, a description redundant with that of FIG. 15 previously described will be omitted. That is, syntax elements not mentioned in FIG. 18 may refer to contents described in FIG. 15.

Referring to FIG. 18, in S1801, the decoder may check (or determine) whether whether or not to parse a syntax element tu_mts_idx[x0][y0] indicating a transform kernel applied to the horizontal and vertical directions of the current residual signal. The syntax element may include information on whether or not to apply TS, whether or not to apply MTS, and information related to a transform kernel applied to the horizontal and vertical directions. As an embodiment, tu_mts_idx[x0][y0] may be parsed if the following the conditions i), ii), iii), and iv) are all true, and may be encoded/decoded using a regular coding engine of CABAC using context.

Condition i) If the variable MaxMtsIdx is greater than 0 (MaxMtsIdx>0)

Here, MaxMtsIdx represents a variable representing the maximum value of tu_mts_idx, and may be determined according to the method with reference to FIG. 15(*a*) previously described. In FIG. 19(*a*), MaxMtsIdx may be determined according to whether MTS may be used and whether MTS or TS may be used. The second column of FIG. 19(*a*) represents whether the current block is encoded with inter prediction and MTS may be used for the inter-predicted block. If the current block is encoded with inter prediction (i.e. CuPredMode[x0][y0]==MODE_INTER), and MTS is allowed for inter prediction in SPS (i.e., sps_mts_inter_enabled_flag==1), a value of the second column is 1, otherwise the value may be 0.

The third column of FIG. 19(*a*) represents whether the current block is encoded with intra prediction and MTS may be used for the intra-predicted block. If the current block is encoded with intra prediction (i.e., CuPredMode==MODE_INTRA), and MTS is allowed for inter prediction in SPS (i.e., sps_mts_intra_enabled_flag==1), a value of the third column is 1, otherwise the value may be 0. The fourth column of FIG. 19(*a*) represents whether TS may be applied to the current transform block. If it is indicated that TS may be used in the SPS (transform_skip_enabled_flag), and both the width and height of the current transform block are less than or equals to the maximum transform skip size (i.e., log 2TbWidth<=MaxTsSize && log 2TbHeight<=MaxTsSize), a value of the fourth column is 1, otherwise the value may be 0. In this case, if sps_transform_skip_enabled_flag is 1, a value obtained by subtracting 2 from a value, which is obtained by taking a logarithm of base 2 to the maximum transform skip size, may be signaled to determine the MaxTsSize expressing the maximum transform skip size, and the MaxTsSize may be a value between 2 and 5. The value of the variable MaxMtsIdx may be determined according to the values of the second, third, and fourth columns of FIG. 19(*a*) described above.

Condition ii) If the current luma component transform block includes a non-zero coefficient (tu_cbf_luma[x0][y0]==1)

Referring to the condition ii), if the current transform block does not include a non-zero coefficient, it is not necessary to apply MTS and TS. In this case, the decoder may reconstruct the residual signal without performing inverse quantization or inverse transform.

Condition iii) If a coding tree currently being processed is not a tree including only chroma components (treeType!=DUAL_TREE_CHROMA)

Referring to the condition iii), in the embodiment of FIG. 15 previously described, an example in which TS may be applied to both the luma component and the chroma component has been described, but TS may be applied only to the luma component. That is, if MTS and TS may be applied only to the luma component, it is not necessary to signal tu_mts_idx in the coding tree including only the chroma component, and thus, if the coding tree currently being processed includes the luma component, i.e., if treeType is SINGLE TREE or DUAL TREE LUMA, the decoder may parse tu_mts_idx.

Condition iv) If both the width and height of the transform block are less than 32 (tbWidth<=32 && tbHeight<=32)

In one embodiment, in a case where tu_mts_idx[x0][y0] does not exist, it may be set to 0 if MaxMtsSize is 4, and may be set to 1 if MaxMtsSize is 1 or 5. In FIG. 18, since the TS and MTS are signaled using one integrated syntax element, a 1-bit flag indicating whether the TS is used for the current block may not be parsed in the residual_coding syntax structure of FIG. 18(*b*).

Referring to FIG. 19(*b*), in an embodiment of the present invention, the encoder may signal MTS and TS to the decoder using one integrated syntax element. The decoder may determine the transform kernel on the basis of the syntax element. In FIG. 19(*b*), TrHorType and TrVerType represent variables indicating transform kernels applied to the horizontal and vertical directions, respectively. IsTrafoSkip represents a variable indicating whether the transform skip is applied to the current transform block. As an embodiment, values of TrHorType, TrVerType, and IsTrafoSkip described above may be determined depending on values of tu_mts_idx[x0][y0].

In one embodiment, if TrHorType (or TrVerType) is −1 and IsTrafoSkip is 1, it represents that the transform skip is applied to the corresponding direction. If TrHorType (or TrVerType) is 0 and IsTrafoSkip is 0, the DCT-II kernel may be applied to the corresponding direction. If TrHorType (or TrVerType) is 1 and IsTrafoSkip is 0, the DST-VII kernel may be applied to the corresponding direction. If TrHorType (or TrVerType) is 2 and IsTrafoSkip is 0, the DCT-VIII kernel may be applied to the corresponding direction. The maximum value of tu_mts_idx may be represented by a MaxMtsIdx variable, and the binarization method of tu_mts_idx may vary depending on a MaxMtsIdx value.

In one embodiment, if MaxMtsIdx is 1 (i.e., only TS is allowed), whether or not TS is applied may be indicated through 1-bit signaling. If tu_mts_idx is 0 (i.e., bit value 0), TS may be applied to the current luma component transform block, and if tu_mts_idx is 1 (i.e., bit value 1), DCT-II may be applied to both the horizontal and vertical directions of the current luma component transform block. If MaxMtsIdx is 4 (i.e., TS is not allowed and MTS is allowed), the first bit of the bit column may represent whether MTS is applied to the corresponding luma transform block, and the second, third, and fourth bits of the bit string may indicate a transform kernel applied if MTS is used. If tu_mts_idx is 0 (e.g., bit string 0), the DCT-II kernel may be applied to both the horizontal and vertical directions of the current transform block. If tu_mts_idx is 1 (e.g., bit string 10), the DST-VII kernel may be applied to both the horizontal and vertical directions of the current transform block. If tu_mts_idx is 2 (e.g., bit string 110), DCT-VIII may be applied to the horizontal direction and DST-VII may be applied to the vertical direction of the current transform block. If tu_mts_idx is 3 (e.g., bit string 1110), DST-VII may be applied to the horizontal direction and DCT-VIII may be applied to the vertical direction of the current transform block. If tu_mts_idx is 4 (e.g., bit string 1111), DCT-VIII may be applied to both the horizontal and vertical directions of the current transform block.

In one embodiment, if MaxMtsIdx is 5 (if both TS and MTS are allowed), the first bit of the bit string may represent whether TS is applied to the corresponding luma transform block. In this case, the second bit of the bit string may represent whether MTS is applied to the corresponding luma transform block, and the third, fourth, and fifth bits of the bit string may indicate the transform kernel applied if MTS is used. If tu_mts_idx is 0 (e.g., bit string 0), TS may be applied to the current transform block. If tu_tms_idx is 1 (e.g., bit string 10), DCT-II may be applied to both the horizontal and vertical directions of the current transform block. If tu_mts_idx is 2 (e.g., bit string 110), DST-VII may be applied to both the horizontal and vertical directions of the current transform block. If tu_mts_idx is 3 (e.g., bit string 1110), DCT-VIII may be applied to the horizontal direction and DST-VII may be applied to the vertical direction of the current transform block. If tu_mts_idx is 4 (e.g., bit string 11110), DST-VII may be applied to the horizontal direction and DCT-VIII may be applied to the vertical direction of the current transform block. If tu_mts_idx is 5 (e.g., bit string 11111), DCT-VIII may be applied to both the horizontal and vertical directions of the current transform block.

In the embodiment described above, if MTS is used, an example in which the transform kernel to be applied is signaled using a truncated unary binarization method using a 1-bit or a 3-bit has been described, but signaling may also be performed by using a fixed length of 2-bit. In addition, in the above embodiment, a case in which the transform kernel candidates configuring the transform kernel set are DST-VII and DCT-VIII has been described as an example, but the present invention is not limited thereto, and even in a transform kernel set configured with two arbitrary transform kernels, a transform kernel applied to the horizontal and vertical directions may be determined according to the value of the bit string indicating the transform kernel as shown in the following i) to v).

i) Bit string '0': Horizontal-DCT-II, Vertical-DCT-II ii) Bit string '10': Horizontal-first candidate in transform set, Vertical-first candidate in transform set iii) Bit string '110': Horizontal-second candidate in transform set, Vertical-first candidate in transform set iv) Bit string '1110': Horizontal-first candidate in transform set, Vertical-second candidate in transform set v) Bit string '1111': Horizontal-second candidate in transform set, Vertical-second candidate in transform set In the residual signal of the inter-predicted block a tendency that the residual signal concentratedly exists at a specific position of the block may occur. For example, a pattern in which the residual signal has a large energy at the boundary of the residual signal block and the residual signal has relatively small energy at the center portion and the opposite boundary of the block may occur. If transform is performed on the residual signal of the inter-predicted block using such a pattern, encoding efficiency for inter prediction may be improved. It will be described with reference to the following drawings.

Figure 20:
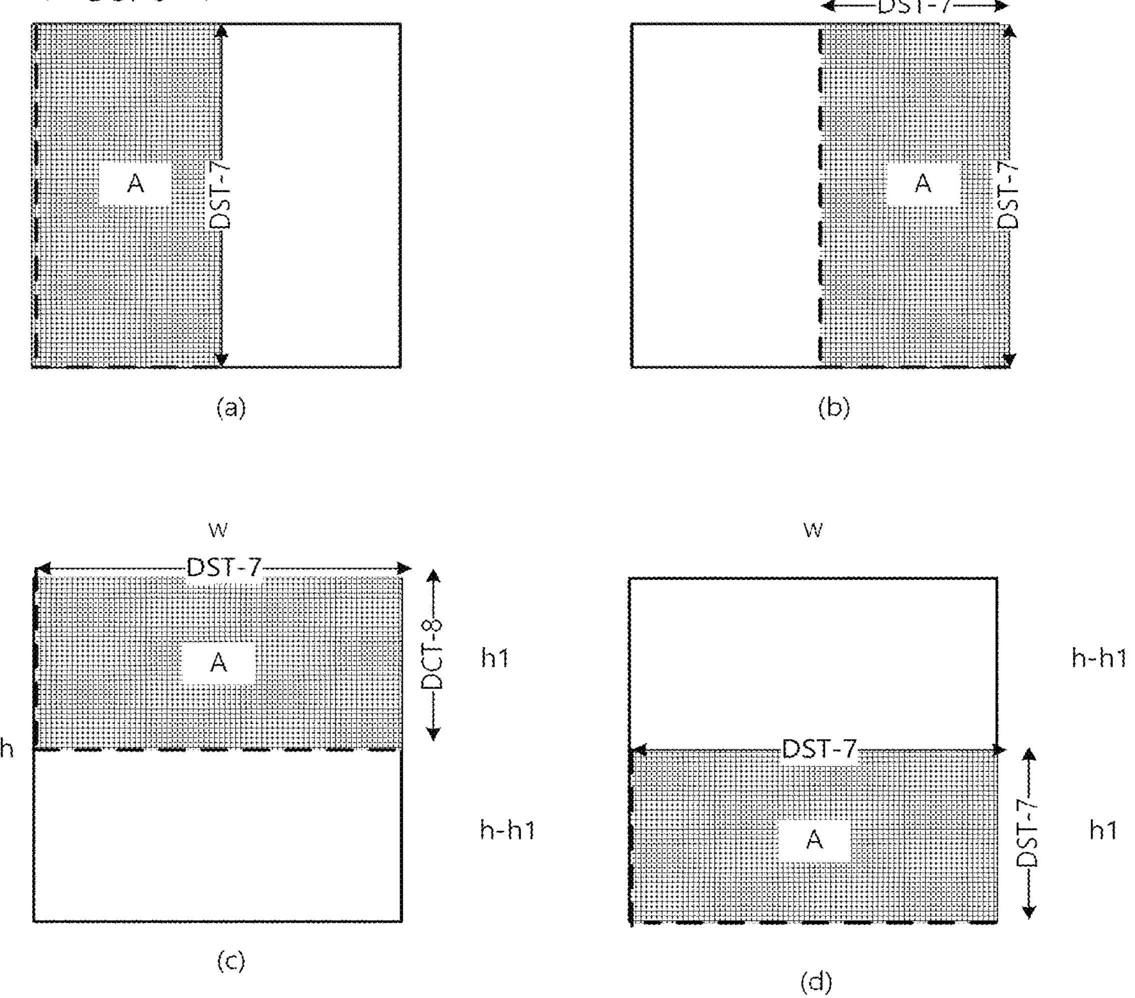
FIG. 20 is a diagram for describing a sub-block transform (SBT) method according to an embodiment of the present invention.

FIG. 20 is a diagram for describing a sub-block transform (SBT) method according to an embodiment of the present invention. If SBT is applied, the encoder/decoder may perform transcoding by splitting the current coding unit (or coding block) into a plurality of transform units (or transform blocks). As an embodiment, the encoder/decoder may perform transcoding by splitting the current coding unit into two transform units having a size of 1:1 or 1:3. In this case, transform is performed only on one transform unit assuming that the residual signal is concentrated in one of the two split transform units, and it may be assumed that there is no residual signal in the other transform unit. In FIGS. 20(*a*), (*b*), (*c*), and (*d*), the transform unit of a region (that is, the shaded region) indicated by A represents a region where transform is performed. Whether or not a non-zero coefficient exists in the corresponding region in the transform block after quantization may be determined through signaling of syntax elements (tu_cbf_luma, tu_cbf_cb, tu_cbf_cr) representing information of non-zero transform coefficient described in FIGS. 15 and 18. The remaining one region other than A region is a transform unit region for which it is assumed that there is no residual signal, and the transform and inverse quantization processes may be omitted, and tu_cbf_luma, tu_cbf_cb, and tu_cbf_cr may be all set to (or inferred as) 0 without signaling.

Referring to FIG. 20(*a*), if a size of a coding unit is W×H, the encoder/decoder may split the coding unit in a vertical direction to split the coding unit into two transform units each having a size of (W/2)×H. Alternatively, if a 1-bit flag indicating {¼, ¾} splitting is 1, the coding unit may be split into two transform units having sizes of (W/4)×H and (3W/4)×H. In both cases, the transform may be performed on the left transform unit, and DCT-VIII may be applied to the horizontal direction and DST-VII may be applied to the vertical direction. As an example, if the width or height of the corresponding transform unit is greater than the maximum size of the DST-VII/DCT-VIII kernel allowed in the SBT, DCT-II may be applied to the corresponding direction. As an example, the maximum size of the DST-VII/DCT-VIII kernel allowed in SBT may be 32-point (or length).

Referring to FIG. 20(*b*), if the size of the coding unit is W×H, the encoder/decoder may split the coding unit in a vertical direction to split the coding unit into two transform units each having a size of (W/2)×H. Alternatively, if a 1-bit flag indicating {¼, ¾} splitting is 1, the coding unit may be split into two transform units having sizes of (W/4)×H and (3W/4)×H. In both cases, the transform may be performed on the transform unit on the right side, and DST-VII may be applied to both the horizontal and vertical directions. As an example, if the width or height of the corresponding transform unit is greater than the maximum size of the DST-VII/DCT-VIII kernel allowed in the SBT, DCT-II may be applied to the corresponding direction. As an example, the maximum size of the DST-VII/DCT-VIII kernel allowed in SBT may be 32-point.

Referring to FIG. 20(*c*), if the size of the coding unit is W×H, the encoder/decoder may split the coding unit in a horizontal direction to split the coding unit into two transform units each having a size of W×(H/2). Alternatively, if a 1-bit flag indicating {¼, ¾} splitting is 1, the coding unit may be split into two transform units having sizes of W×(H/4) and W×(3H/4). In both cases, the transform may be performed on the upper transform unit, and DST-VII may be applied to the horizontal direction and DCT-VIII may be applied to the vertical direction. As an example, if the width or height of the corresponding transform unit is greater than the maximum size of the DST-VII/DCT-VIII kernel allowed in the SBT, DCT-II may be applied to the corresponding direction. As an example, the maximum size of the DST-VII/DCT-VIII kernel allowed in SBT may be 32-point.

Referring to FIG. 20(*d*), if the size of the coding unit is W×H, the encoder/decoder may split the coding unit in a horizontal direction to split the coding unit into two transform units each having a size of W×(H/2). Alternatively, if a 1-bit flag indicating {¼, ¾} splitting is 1, the coding unit may be split into two transform units having sizes of W×(H/4) and W×(3H/4). In both cases, transform may be performed on the lower transform unit, and DST-VII may be applied to the horizontal direction and DCT-VIII may be applied to both the horizontal direction and the vertical direction. As an example, if the width or height of the corresponding transform unit is greater than the maximum size of the DST-VII/DCT-VIII kernel allowed in the SBT, DCT-II may be applied to the corresponding direction. As an example, the maximum size of the DST-VII/DCT-VIII kernel allowed in SBT may be 32-point.

In one embodiment, the SBT may be applied to the inter-predicted block with cu_cbf, which is a syntax element indicating whether or not a syntax structure (e.g., transform tree syntax structure) related to transform exists, of 1 and whether or not to apply SBT may be signaled at the coding unit level. If SBT is applied at the coding unit level, a 1-bit flag indicating whether splitting is {¼, ¾} splitting or ½ splitting may be signaled. In addition, a 1-bit flag indicating whether splitting is horizontal splitting or vertical splitting may be signaled. In addition, a 1-bit flag indicating a transform unit in which transform is performed among the two split transform units may be additionally indicated.

If SBT is applied, the transform kernel is determined according to the position of the transform unit, and thus the MTS flag and/or the MTS index may not be signaled in the transform unit syntax structure of FIG. 15. As the transform kernel applied to transform units in which transform is performed in SBT, any one of DST-VII/DCT-VIII/DCT-II may be selected according to the position of the corresponding transform unit and/or the width and height of the corresponding transform unit, and whether or not to apply TS may be selected in the similar way. If TS may be used in the transform unit syntax structure of FIG. 18 previously described (that is, if the fourth the condition of FIG. 19(*a*) is true), MaxMtsIdx may be determined as 1, and whether TS is applied through 1-bit signaling may be indicated. If TS may not be used in the transform unit syntax structure of FIG. 18 (that is, if the fourth the condition in FIG. 19(*a*) is false), MaxMtsIdx may be determined as 0, and the MTS index syntax element may not be signaled.

As the size of the transform kernel increases, the energy compaction performance is significantly improved. Accordingly, there is a possibility that the encoding efficiency is higher in the case of performing transform by applying any one of DCT-II, DST-VII, and DCT-VIII rather than TS, as the size of the transform block increases, than in the case of performing transform by applying TS. Accordingly, in an embodiment, if the size of the transform block is greater than or equal to a predetermined specific size, the MTS index syntax element may not be signaled regardless of whether the TS may be used.

In one embodiment, whether or not SBT may be used may be signaled with a 1-bit flag by being included in any one of a sequence parameter set (SPS), a picture parameter set (PPS), a slice header, a tile group header, or a tile header, and in the present invention, the flag may be referred to as sps_sbt_enabled_flag. In the following, with reference to Tables 9 to 11, embodiments of a method of signaling a syntax related to SBT at the SPS level will be described as an example. In the embodiment of the present invention, the signaling method at the SPS level is mainly described, but the present invention is not limited thereto, and the signaling structure described below may be equally applied if signaling is performed at any one level among high level syntax.

TABLE 9

| sps_sbt_enabled_flag |
|---|

Referring to Table 9, in one embodiment of the present invention, the encoder/decoder may determine whether the SBT may be used in the current sequence by signaling sps_sbt_enabled_flag, which is a 1-bit flag representing whether SBT may be used in the current sequence.

TABLE 10

```
sps_dct2_only_enabled_flag
if( !sps_dct2_only_enabled_flag )
   sps_sbt_enabled_flag
```

Referring to Table 10, in an embodiment of the present invention, the encoder/decoder may determine whether SBT may be used depending on whether or not a kernel other than DCT-II may be used in the current sequence. In Table 10, sps_dct2_only_enabled_flag is a flag (or syntax element) representing that only the DCT-II transform kernel may be used in the current sequence. Whether or not to signal sps_sbt_enabled_flag may be determined depending on sps_dct2_only_enabled_flag. For example, if sps_dct2_only_enabled_flag is 0, the decoder may parse sps_sbt_enabeld_flag, which is a 1-bit flag indicating whether SBT may be used in the current sequence. The decoder may determine whether SBT may be used in the current sequence depending on the sps_sbt_enabeld_flag value. If sps_dct2_only_enabled_flag is 1, sps_sbt_enabled_flag is not signaled and is set to (or inferred as) 0, and SBT may not be used in the current sequence.

TABLE 11

```
sps_sbt_enabled_flag
if( sps_sbt_enabled_flag )
   sps_sbt_dct2_enabled_flag
```

Referring to Table 11, in an embodiment of the present invention, the encoder/decoder may determine whether a kernel other than DCT-II may be used in the current sequence depending on whether or not the SBT may be used in the current sequence. As an embodiment, sps_sbt_enabled_flag, which is a 1-bit flag indicating whether SBT may be used in the current sequence, may be signaled first. If sps_sbt_enabled_flag is 1, sps_sbt_dct2_enabled_flag, which is a 1-bit flag indicating that only DCT-II is allowed as a transform kernel used when SBT is applied, may be signaled. That is, if sps_sbt_dct2_enabled_flag is 1, when SBT is applied, the coding unit may be split into two transform units, and DCT-II may be applied to both the horizontal and vertical direction of the transform unit. If sps_sbt_enabled_flag is 0, sps_sbt_dct2_enabled_flag may be set to 0.

The encoder/decoder may reconstruct a block in units of transform units, and in the case of intra prediction, a prediction block for the current block may be generated by using reconstructed samples around the current block as a reference sample. In the case of intra prediction, a prediction error tends to increase as the distance from the reference sample increases. Accordingly, if the transform unit is split into small blocks for the current coding unit and sequentially reconstructed in units of split small blocks, the prediction error, that is, a residual signal, may be reduced and encoding efficiency may be improved. An intra sub-partitions (ISP) encoding mode is a method of performing prediction and reconstruction by splitting the current coding unit into multiple splitting units, if intra prediction is selected for the current coding unit.

Figure 21:
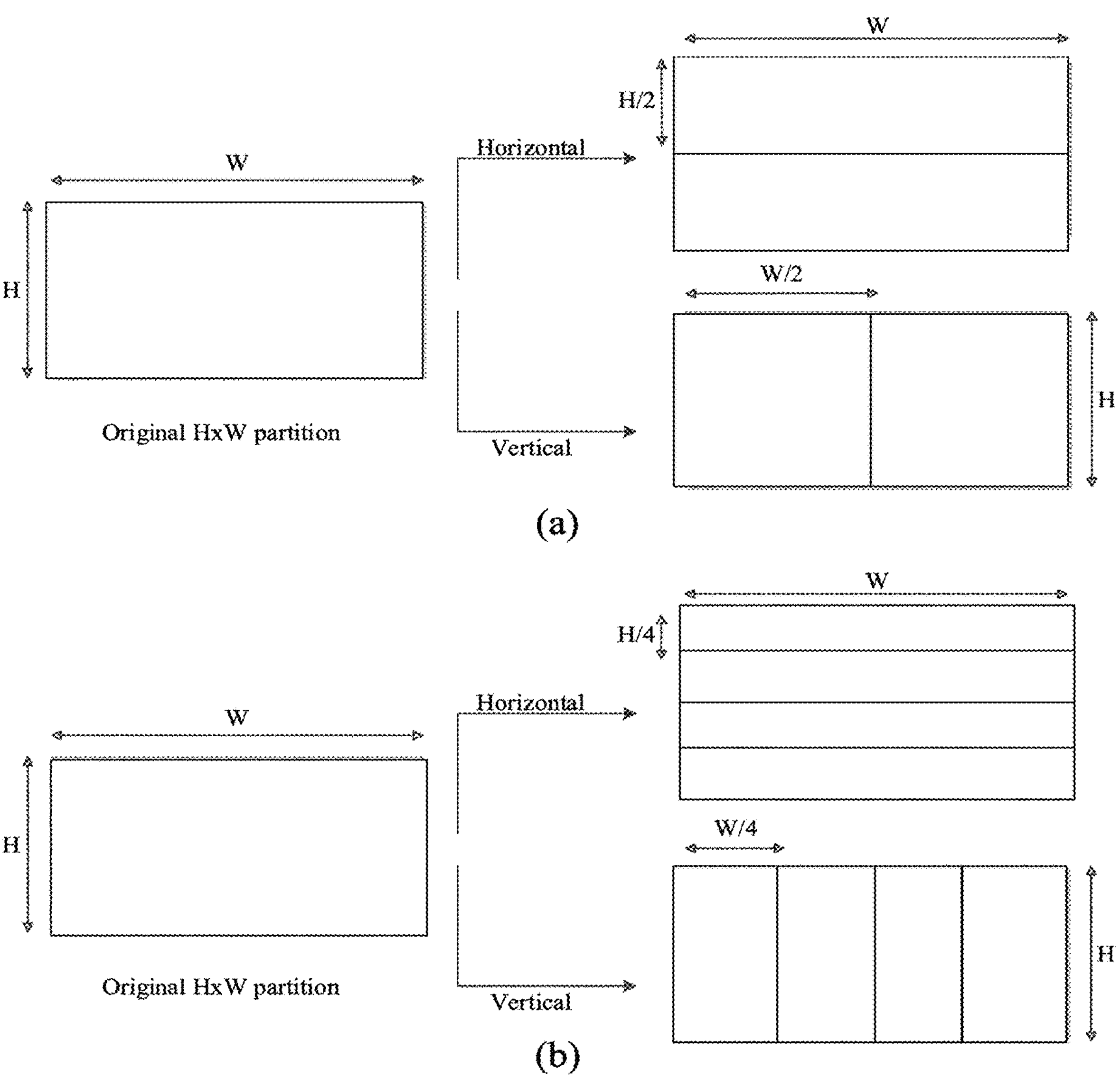
FIG. 21 is a diagram illustrating a method of splitting a block in an intra sub-partitions encoding mode according to an embodiment of the present invention.

FIG. 21 is a diagram illustrating a method of splitting a block in an intra sub-partitions encoding mode according to an embodiment of the present invention. According to an embodiment of the present invention, the current coding block may be split in a horizontal or vertical direction. As an embodiment, the number of transform units split depending on the size of the coding unit may vary. For example, if the size of the coding unit is 4×4, ISP encoding mode may not be applied. A coding unit having a size of 4×8 or 8×4 may be split into two transform units. The remaining coding units of different sizes may be split into four transform units. The size of the coding unit to which ISP encoding mode may be applied may be determined as a case (a condition A) where the width or height of a coding unit is less than or equal to the maximum transform block size of luma component and a case (a condition B) where a product of the width and height of a coding unit is greater than a square of the minimum transform block size of luma component. In this case, the maximum transform block size of luma component may be 64, and the minimum transform block size of luma component may be 4. The size of the coding unit that satisfies the condition A may be classified into conditions i), ii), and iii) as follows.

Condition i) If the width of the coding unit is less than or equal to the maximum transform block size of luma component, and the height of the coding unit is greater than the maximum transform block size of luma component.

Condition ii) If the width of the coding unit is greater than the maximum transform block size of luma component, and the height of the coding unit is less than or equal to the maximum transform block size of luma component.

Condition iii) If both the width and height of the coding unit are less than or equal to the maximum transform block size of luma component Among the above conditions i), ii), and iii), in the case of the condition i), the coding unit may be split into multiple transform units without separate signaling, where the width of the transform unit is the same as the width of the coding unit, and the height of the transform unit is the same as the maximum transform block size of luma component. In the case of the condition ii), the coding unit may be split into multiple transform units without separate signaling, where the width of the transform unit is equal to the maximum transform block size of luma component, and the height of the transform unit is equal to the height of the coding unit. That is, in the case of the conditions i) and ii), transform block splitting may be performed using the size of the coding unit and the maximum transform block size of luma component without signaling, and thus the ISP encoding mode requiring signaling may not be used. Accordingly, the condition A may be determined as a case where both the width and height of the coding unit are less than or equal to the maximum transform block size of luma component.

FIG. 21(*a*) shows a method of splitting a transform unit that may be applied to a 4×8 or 8×4 coding unit. As an embodiment, if horizontal splitting is indicated for a coding unit of W×H size, the coding unit may be split into two transform units of W×(H/2) size, and if vertical splitting is indicated, the coding unit may be split into two transform units of (W/2)×H size. Whether splitting is horizontal splitting or vertical splitting may be indicated by a 1-bit flag. FIG. 21(*b*) shows a method of splitting a transform unit that may be applied to a coding unit whose size is not 4×8 and 8×4. As an embodiment, if horizontal splitting is indicated for a coding unit of W×H size, the coding unit may be split into four transform units of W×(H/4) size, and if vertical splitting is indicated, the coding unit may be split into four transform units of (W/4)×H size. Whether splitting is horizontal splitting or vertical splitting may be indicated by a 1-bit flag.

FIG. 22 is a diagram illustrating a method of selecting a transform kernel applied to a split transform unit, if the intra sub-partitions (ISP) mode according to an embodiment of the present invention is applied. According to an embodiment of the present invention, if ISP is applied, a transform kernel applied to each transform unit may be determined depending on a size of a transform block and the intra prediction mode. In FIG. 22, predModeIntra is a variable representing the intra prediction mode used for the current coding unit, and trTypeHor and trTypeVer are variables representing the transform kernels applied to the horizontal and vertical directions, respectively. Referring to FIG. 22, description is made on the assumption that sixty-seven intra prediction modes are used, but the present invention is not limited thereto, and the same may be applied even if the wide-angle mode previously described in FIG. 6 is additionally used, in addition to the sixty-seven intra prediction modes.

According to an embodiment of the present invention, the intra prediction mode may be configured with two non-directional prediction modes (INTRA_PLANAR, INTRA_DC) and sixty-five directional prediction modes (INTRA_ANGULAR2, INTRA_ANGULAR3, . . . , INTRA_ANGULAR66), and values of the trTypeHor and trTypeVer variables may be determined depending on each prediction mode. Here, trTypeHor and trTypeVer represent transform kernels (or transform types) applied to the horizontal and vertical directions, respectively. If the value of trTypeHor or trTypeVer is 0, it represents that the DCT-II transform kernel is applied to the corresponding direction, and if the trTypeHor or trTypeVer value is 1, it represents that DST-VII transform kernel is applied to the corresponding direction.

In one embodiment, if the width of the transform block is less than the minimum transform block size of luma component or greater than the maximum size of DST-VII used in ISP, DCT-II may be applied to the horizontal direction. In addition, if the height of the transform block is less than the minimum transform block size of luma component or greater than the maximum size of DST-VII used in ISP, DCT-II may be applied to the vertical direction. As an example, the minimum transform block size of luma component may be defined as 4, and the maximum size of DST-VII may be defined as 16. The minimum transform block size may be referred to as a first threshold value, and the maximum size of DST-VII may be referred to as a second threshold value.

In addition, in an embodiment, the encoder/decoder may apply DST-VII to both the horizontal direction and the vertical direction for the non-directional prediction mode. In addition, the encoder/decoder may apply DST-VII to the horizontal direction and DCT-II to the vertical direction for the horizontal directional mode (INTRA_ANGULAR2, INTRA_ANGULAR3, . . . , INTRA_ANGULAR32, INTRA_ANGULAR33). The encoder/decoder may apply DCT-II to the horizontal direction and DST-VII to the vertical direction for the vertical directional mode (INTRA_ANGULAR34, INTRA_ANGULAR35, . . . , INTRA_ANGULAR65, INTRA_ANGULAR66).

In one embodiment, if the current coding unit is coded with intra prediction, a 1-bit flag indicating whether to apply ISP at the coding unit level may be signaled. If ISP is applied to the current coding unit, a 1-bit flag indicating whether splitting is horizontal splitting or vertical splitting may be signaled. If ISP is applied to the current block, the transform kernel applied to each split transform unit may be determined without signaling depending on the intra prediction mode and the size of the transform unit, and thus the MTS flag and/or the MTS index may not be signaled in the transform unit syntax structure of FIG. 15. In addition, TS is not used in ISP encoding mode, and thus a transform skip flag may not be signaled. In addition, the MTS index may not be signaled in the transform unit syntax structure of FIG. 18.

As described in FIG. 22, if ISP is applied to the current block, a transform kernel applied to each transform block may be determined without signaling based on the intra prediction mode. Meanwhile, this may increase the complexity of hardware decoder implementation. In an existing hardware decoder pipeline structure, decoding of the intra prediction mode and reconstruction of the transform coefficient may be concurrently progressed, but if ISP mode is applied, the reconstruction of the transform coefficient may be progressed only after the decoding of the intra prediction mode is completed, and thus a delay may be caused by that amount. Accordingly, in the following, methods of determining the transform kernel applied to each transform block without being based on the intra prediction mode in ISP encoding mode will be described.

In one embodiment of the present invention, the encoder/decoder may determine a transform kernel (or transform type) of a block to which ISP mode is applied by comparing the width or height of the transform block with a predefined specific threshold value. The DST-VII kernel well expresses the characteristics of the residual signal when intra prediction is used, and thus, if the width of the transform block is less than a specific threshold value, DST-VII may be applied to the horizontal direction, and if the width of the transform block is greater than the threshold value, DCT-II may be applied to the horizontal direction. Here, the specific threshold value may be defined as the same value as the previously described second threshold value (i.e., the maximum size of DST-VII used in ISP). If the height of the transform block is less than or equal to the threshold value, DST-VII may be applied to the vertical direction, and if the height of the transform block is greater than the threshold value, DCT-II may be applied to the vertical direction. In this case, the threshold value may be defined as an arbitrary value of 32 or less. As described above, as an embodiment, if the width of the transform block is less than the minimum transform block size (i.e., the first threshold value) of luma component or greater than the maximum size of DST-VII used in ISP, DCT-II may be applied to the horizontal direction. In addition, if the height of the transform block is less than the minimum transform block size of luma component or greater than the maximum size of DST-VII used in ISP, DCT-II may be applied to the vertical direction. As an example, the minimum transform block size of luma component may be defined as 4, and the maximum size of DST-VII may be defined as 16.

In addition, in an embodiment of the present invention, DST-VII may be applied to both the horizontal and vertical directions of a square block in which both the width and height of the transform block are less than or equal to the threshold value, and DCT-II may be applied to the horizontal direction and the vertical direction of a square block in which both the width and the height of the transform block are greater than the threshold value. In a rectangular block, if the short side is less than or equal to the threshold value, DST-VII may be applied to the corresponding direction, and if the short side is greater than the threshold value, DCT-II may be applied to the corresponding direction. For the long side of the rectangular block, DCT-II may be applied to the corresponding direction.

In addition, in an embodiment of the present invention, the transform kernel applied to each transform unit may be determined by utilizing signaling of an MTS-related syntax element described in FIGS. 15 and 18. For example, if the transform unit syntax structure of FIG. 18 is used, even if ISP is used in the current coding unit, the MTS index may signal. If the MTS index is signaled for each transform unit, the signaling overhead may increase. Therefore, in the processing order, the MTS index is signaled only in the first transform unit (i.e., tu_cbf_luma==1), in which a non-zero transform coefficient exists for the luma component transform block, in the processing order, and the signaled MTS index may be shared by all transform units. In this case, as an example, whether or not to apply TS may be signaled together.

In one embodiment, whether or not ISP encoding mode may be used may be signaled with a 1-bit flag by being included in any one of a sequence parameter set (SPS), a picture parameter set (PPS), a slice header, a tile group header, and a tile header, and in the present invention, the flag may be referred to as sps_isp_enabled_flag. In the following, with reference to Tables 12 to 14, embodiments of a method of signaling a syntax related to ISP encoding mode at the SPS level will be described as an example. In the embodiment of the present invention, the signaling method at the SPS level is mainly described, but the present invention is not limited thereto, and if signaling is performed at any one level among high level syntax, the signaling structure described below may be equally applied.

TABLE 12

```
sps_isp_enabled_flag
```

Referring to Table 12, in an embodiment of the present invention, the encoder/decoder may determine whether ISP encoding mode may be used in the current sequence by signaling sps_isp_enabled_flag, which is a 1-bit flag representing whether ISP encoding mode may be used in the current sequence.

TABLE 13

```
sps_dct2_only_enabled_flag
if( !sps_dct2_only_enabled_flag )
  sps_isp_enabled_flag
```

Referring to Table 13, in an embodiment of the present invention, the encoder/decoder may determine whether ISP encoding mode may be used depending on whether a kernel other than DCT-II may be used in the current sequence. In Table 13, sps_dct2_only_enabled_flag is a flag (or syntax element) representing that only the DCT-II transform kernel may be used in the current sequence. Whether or not to signal sps_isp_enabeld_flag, which is a flag (or syntax element) indicating whether ISP encoding mode may be used in the current sequence, may be determined depending on sps_dct2_only_enabled_flag. For example, if sps_dct2_only_enabled_flag is 0, the decoder may parse sps_isp_enabeld_flag, which is a 1-bit flag indicating whether ISP encoding mode may be used in the current sequence. The decoder may determine whether ISP encoding mode may be used in the current sequence depending on the sps_isp_enabeld_flag value. If sps_dct2_only_enabled_flag is 1, sps_isp_enabled_flag is not signaled and is set to (or inferred) 0, and ISP encoding mode may not be used in the current sequence.

TABLE 14

```
sps_isp_enabled_flag
if( sps_isp_enabled_flag )
  sps_isp_dct2_enabled_flag
```

Referring to Table 14, in an embodiment of the present invention, the encoder/decoder may determine whether a kernel other than DCT-II may be used in the current sequence depending on whether or not ISP encoding mode may be used in the current sequence. As an embodiment, sps_isp_enabled_flag, which is a 1-bit flag indicating whether SBT may be used in the current sequence, may be signaled first. If sps_isp_enabled_flag is 1, sps_isp_dct2_enabled_flag, which is a 1-bit flag indicating that only DCT-II is allowed, may be signaled to the transform kernel used when ISP encoding mode is applied. That is, in the case where sps_isp_dct2_enabled_flag is 1, when ISP encoding mode is applied, the coding unit may be split into a plurality of transform units, and DCT-II may be applied to both the horizontal and vertical directions of the transform unit. If sps_isp_enabled_flag is 0, sps_isp_dct2_enabled_flag may be set to 0.

FIG. 23 shows an example of a transform unit syntax structure and an example of a method of determining a transform type according to an embodiment to which the present invention is applied. According to an embodiment of the present invention, whether or not to apply MTS and/or a transform kernel (or transform type) may be determined depending on whether or not to skip the transform. If transform skip is applied to the current transform block, it is not necessary to indicate (or signal) the transform kernel applied to the current transform block. Therefore, signaling bits required for transform may be reduced and compression efficiency may be improved by signaling whether or not to apply a transform skip before the MTS-related syntax element and signaling an MTS-related syntax element depending on whether or not to apply the transform skip. In describing the embodiment of the present invention with reference to FIG. 23, the decoder is mainly described for convenience of description, but the method of determining transform skip and MTS according to the present embodiment may be applied substantially equally to the encoder.

FIG. 23(*a*) illustrates a method of signaling/parsing transform skip and MTS information according to an embodiment of the present invention. As an example, transform skip and MTS may be processed at the transform unit level as shown in FIG. 23(*a*). However, FIG. 23(*a*) is an example, and the present invention is not limited thereto, and a proposed method may be processed in substantially the same way at levels (e.g., coding unit level, prediction unit level) other than that of the transform unit. Referring to FIG. 23(*a*), the syntax structure of the transform unit represents a syntax structure related to a transform unit for which a transform process is performed. The transform unit syntax may receive x0, y0, tbWidth, tbHeight, treeType, and subTuIndex as inputs. (x0, y0) may represent the position of the top-left luma sample of the current transform block, and may be a relative position with the position of the top-left luma sample of the current picture as a reference. The variables tbWidth and tbHeight represent the width and height of the current transform block, respectively.

A coding tree structure for the luma component and a coding tree structure for the chroma component may be coded with the same structure or different structures. Accordingly, the treeType variable may indicate the type of coding tree currently being processed. If the treeType is SINGLE_TREE, it means that the luma component and the chroma component are coded with the same coding tree structure. In this case, the transform unit may include a luma transform block and a chroma transform block according to a color format. If the tree Type is DUAL TREE LUMA, when the luma component and the chroma component are coded with a coding tree structure having different structures, it may represent that the coding tree currently being processed is a coding tree of the luma component. In this case, the transform unit may include the luma transform block. If the treeType is DUAL_TREE_CHROMA, when the luma component and the chroma component are coded with a coding tree structure having different structures, it may represent that the coding tree currently being processed is a coding tree of the chroma component. In this case, the transform unit may include the chroma transform block according to the color format. The subTuIndex represents an index of transform unit currently being processed.

In the transform unit syntax structure (i.e., transform_unit( )), first, the encoder may indicate whether a current transform block has one or more non-zero transform coefficients by signaling a coded block flag CBF for a luma block, a Cb chroma block, and a Cr chroma block. Similarly, the decoder may determine (or induce) whether the current transform block has one or more non-zero transform coefficients by parsing the coded block flag CBF for the luma block, Cb block (or Cb chroma block), and Cr block (or Cr chroma block). For example, if tu_cbf_luma[x0][y0] is 1, it may represent that the current luma transform block includes one or more non-zero transform coefficients, and if tu_cbf_luma[x0][y0] is 0, it may represent that all transform coefficients of the current luma transform block are 0. If tu_cbf_cb[x0][y0] is 1, it may represent that the current Cb transform block includes one or more non-zero transform coefficients, and if tu_cbf_cb[x0][y0] is 0, it may represent that all transform coefficients of the current Cb transform block are 0. If tu_cbf_cr[x0][y0] is 1, it may represent that the current Cr transform block includes one or more non-zero transform coefficients, and if tu_cbf_cr[x0][y0] is 0, it may represent that all transform coefficients of the current Cr transform block are 0.

In step S2301 (i.e., the first the conditional statement), the decoder may check (or examine) a preset condition for determining whether or not to apply transform skip and/or MTS. As an example, if the following the conditions i), ii), iii), iv), and v) are all true, the decoder may perform parsing (S2303, S2305) on transform skip and MTS information (i.e., syntax element) according to the second the conditional statement of step S2302 and the third the conditional statement of step S2304, respectively, which will be described later.

Condition i) tu_cbf_luma[x0][y0]==1: The decoder may check whether the value of tu_cbf_luma[x0][y0] is 1. If the value of tu_cbf_luma[x0][y0] is 0, it represents that all transform coefficients of the current luma transform block are 0, and thus the decoder may reconstruct the residual signal to zero without performing inverse quantization and inverse transform. Accordingly, if the value of tu_cbf_luma [x0][y0] is 0, transform skip and MTS information may not be signaled and parsed.

Condition ii) treeType!=DUAL_TREE_CHROMA: The decoder may check whether the tree type is a tree type including a luma transform block. Both transform skip and MTS may be applied only to the luma transform block, and thus if the current transform unit (or transform block) does not include the luma transform block, transform skip and MTS information may not be signaled and parsed. That is, if the tree type is DUAL_TREE_CHROMA, the current transform unit does not include the luma transform block, and thus transform skip and MTS information may not be signaled and parsed.

Condition iii) (tbWidth<=32) && (tbHeight<=32): The decoder may check whether the width and height of the current transform block are less than or equal to 32. The maximum size of the transform block to which transform skip and MTS may be applied is 32×32, and thus if both the width and height of the transform block are 32 or less, signaling and parsing of transform skip and MTS information may be performed depending on additional the conditions.

Condition iv) IntraSubPartitionsSplitType[x0][y0]== ISP_NO_SPLIT: The decoder may check whether ISP is not applied to the current coding unit (or coding block). If ISP is applied to the current coding unit, transform and inverse transform may be performed according to a preset method. Accordingly, if ISP is applied to the current coding unit, transform skip and MTS information may not be signaled and parsed. IntraSubPartitionsSplitType represents a variable indicating a block splitting method by ISP. The IntraSubPartitionsSplitType may indicate the block splitting method by ISP according to ISP information signaled at the coding unit level. If IntraSubPartitionsSplitType is not ISP_NO_SPLIT, it may represent that ISP is applied to the current block. Accordingly, if IntraSubPartitionsSplitType is not ISP_NO_SPLIT, transform skip and MTS information may not be signaled and parsed.

Condition v) !cu_sbt_flag: The decoder may check whether sub-block transform (SBT) is not applied to the current coding unit. If SBT is applied to the current coding unit, transform and inverse transform may be performed according to a preset method. Accordingly, if SBT is applied to the current coding unit, transform skip and MTS information may not be signaled and parsed. The cu_sbt_flag represents a syntax element indicating whether SBT is applied to the current coding unit. The cu_sbt_flag may be signaled and parsed at the coding unit level. If cu_sbt_flag is 1, it may represent that SBT is applied to the current coding unit, and transform skip and MTS information may not be signaled and parsed.

If the conditions i) to v) described above are all true, in step S2302, the decoder may check (or examine) the following the conditions a) and b) for determining whether or not to apply the transform skip. As an example, if the following the conditions a) and b) are all true, transform skip-related information may be signaled and parsed before MTS-related information.

Condition a) transform_skip_enabled_flag==1: The decoder may check whether transform skip is available for (or applied to) the current block. The transform_skip_enabled_flag represents a flag (or syntax element) indicating whether transform skip is available. The flag indicating whether or not the transform skip is available may be signaled and parsed by being included in at least one of high level syntax such as a picture parameter set (PPS), a sequence parameter set (SPS), a video parameter set (VPS), a tile group header, and a slice header. If transform_skip_enabled_flag is 1, whether or not to apply transform skip may be indicated at the transform unit level. Additionally, if transform_skip_enabled_flag is 1, a maximum block size for which transform skip is possible may be signaled from the encoder to the decoder. If transform_skip_enabled_flag is 0, a syntax element indicating the transform skip may not exist (or may not be parsed) in the transform unit syntax structure.

Condition b) tbWidth<=MaxTsSize && tbHeight<=MaxTsSize: The decoder may check whether the width and height of the current transform block are less than or equal to the maximum transform skip size. If transform_skip_enabled_flag is 1, a maximum block size for which transform skip is possible may be indicated, and through this, a MaxTsSize variable representing the maximum transform size may be set. As an embodiment, the transform skip may be applied to a block in which both the width and the height of the transform block are less than or equal to MaxTsSize.

In step S2303, if the conditions i) to v) and the conditions a) and b) described above are all true, transform_skip_flag [x0][y0], which is a syntax element indicating whether the transform skip is applied to the current luma transform block, may be signaled and parsed. If transform_skip_flag [x0][y0] is 1, it may represent that the transform is not applied to the current luma transform block. If transform_skip_flag[x0][y0] is 0, it may represent that transform is applied to the current luma transform block. If transform_skip_flag[x0][y0] does not exist, transform_skip_flag [x0][y0] may be set to (or inferred as) 0.

If the conditions i) to v) described above are all true, when the following conditions x), y), and z) are all true (S2304), MTS-related information may be signaled and parsed based on the transform skip information (S2305).

Condition x) (CuPredMode[x0][y0]!=MODE INTRA && sps_explicit_mts_inter_enabled_flag)||(CuPredMode [x0][y0]==MODE INTRA && sps_explicit_mts_intra_enabled_flag): The decoder may check whether or not a preset condition is satisfied on the basis of the prediction mode of the current block and whether or not explicit MTS is available. A method of prediction (i.e., a prediction mode) may be determined at the coding unit level. The decoder may set the CuPredMode[x0][y0] variable on the basis of information received at the coding unit level. The prediction mode includes intra prediction and inter prediction. Additionally, the prediction mode may include intra block copy (IBC) prediction for generating a prediction block from a reconstructed region in the current picture. If CuPredMode [x0][y0] is MODE_INTRA, it may represent that the current block is coded with intra prediction, and if CuPredMode [x0][y0] is MODE_INTER, it may represent the current block is coded with inter prediction. In addition, if CuPredMode[x0][y0] is MODE_IBC, it may represent that the current block is coded with IBC prediction.

Meanwhile, the flag indicating whether or not MTS is available may be signaled and parsed by being included in at least one of high level syntax such as the picture parameter set (PPS), sequence parameter set (SPS), video parameter set (VPS), tile group header, and slice header. Specifically, whether or not MTS is available for the prediction method may be independently indicated. If sps_explicit_mts_inter_enabled_flag is 1, it represents that an MTS index (in this specification, it may be referred to as tu_mts_idx, mts_idx), which is a syntax element indicating a transform kernel for an inter predicted and/or IBC predicted coding unit, may exist in the transform unit syntax, and whether or not to apply MTS may be indicated depending on the MTS index at the transform unit level. If sps_explicit_mts_inter_enabled_flag is 0, it represents that the MTS index may not exist (i.e., not explicitly signaled) in the transform unit syntax for the inter predicted and/or IBC predicted coding unit, which means that MTS may not be applied to inter predicted and/or IBC predicted blocks. In other words, if sps_explicit_mts_inter_enabled_flag is 0, it represents that the MTS index is not signaled to the inter predicted and/or IBC predicted coding unit, and if the MTS index does not exist, its value may be inferred as 0. If sps_explicit_mts_intra_enabled flag is 1, it represents that the MTS index may exist in the transform unit syntax for the intra-predicted coding unit, and whether or not to apply MTS may be indicated depending on the MTS index at the transform unit level. If sps_explicit_mts_intra_enabled_flag is 0, it represents that the MTS index may not exist in the transform unit syntax for the intra-predicted coding unit, which represents that MTS may not be applied to the intra-predicted block. In other words, if sps_explicit_mts_intra_enabled_flag is 0, it represents that the MTS index is not signaled to the intra-predicted coding unit, and if the MTS index does not exist, its value may be inferred as 0.

In the present invention, whether or not to apply MTS may have the same meaning as whether a transform type (or a transform kernel) other than a predetermined specific transform type (which may be referred to as a basic transform type, a default transform type, etc.) is used. If MTS is applied, a transform type (e.g., a transform type which is any one of a plurality of transform types or in which two or more of the plurality of transform types are combined) other than the basic transform type may be used for transform. If MTS is not applied, only the basic transform type may be used for transform. In an embodiment, the basic transform type may be set (or defined) as a discrete cosine transform type-2 (DCT-2)-based transform type. Accordingly, the MTS index, which is a syntax element indicating a transform type applied to the current transform block, may include information on whether or not to apply MTS.

If the current block is coded with intra prediction, and MTS is available for intra prediction through high level syntax signaling (i.e., CuPredMode[x0][y0]==MODE_INTRA && sps_explicit_mts_intra_enabled_flag) or if the current block is coded with inter prediction or IBC prediction and MTS is available for inter/IBC prediction through high level syntax signaling (CuPredMode[x0][y0]!=MODE_INTRA && sps_explicit_mts_inter_enabled_flag), the condition x) may be true. That is, in the condition x), if the corresponding MTS enabled flag is on in the high level syntax depending on the prediction mode (that is, according to the CuPredMode[x0][y0] variable), MTS-related information may be signaled and parsed.

Condition y) tbWidth<=32 && tbHeight<=32: The decoder may check whether the width and height of the current transform block are less than or equal to 32. The maximum size of a transform block to which MTS may be applied may be defined as 32×32. If both the width and height of the transform block are 32 or less, MTS-related information may be signaled and parsed.

Condition z) !transform_skip_flag[x0][y0]: The decoder may check whether transform skip is not applied to the current transform block. If the transform skip is applied to the current transform block, transform is not applied, and thus MTS-related information may not be signaled and parsed.

If the conditions i) to v) and the conditions x), y), and z) are all true, in step S2305, an MTS index, which is a syntax element indicating a transform kernel (or transform type) applied to the horizontal and vertical directions of residual samples of the luma transform block, may be signaled and parsed. As an embodiment, if the MTS index does not exist, it may be set to (or inferred as) 0.

According to an embodiment of the present invention, the decoder may determine a transform kernel (or transform type) applied to the horizontal and vertical directions on the basis of the MTS index. Referring to FIG. 23(*b*), the decoder may determine a transform kernel (or transform kernel combination) applied to the horizontal and vertical directions of residual samples of the current transform block from among predefined transform kernel combinations shown in FIG. 23(*b*) depending on the MTS index value. In the table of FIG. 23(*b*), trTypeHor is a variable representing a transform kernel (or transform type) applied to the horizontal direction of residual samples for a transform block, and trTypeVer is a variable representing a transform kernel (or transform type) applied to the vertical direction of residual samples for the transform block.

If trTypeHor/trTypeVer is 0, it represents that the basic transform kernel is applied. In the present invention, the basic transform kernel may be referred to as a first transform type. The basic transform kernel may be DCT-II (or DCT-II-based transform kernel). If trTypeHor/trTypeVer is 1, it represents that the first transform kernel defined in the transform kernel set is applied. In this case, the transform kernel set may include a plurality of transform kernels in addition to the basic transform kernel (i.e., the first transform type). The first transform kernel defined in the transform kernel set may be referred to as a second transform type. The second transform type may be DST-VII (or DST-VII-based transform kernel). If trTypeHor/trTyepeVer is 2, it represents that the second transform kernel defined in the transform kernel set is applied. The second transform kernel defined in the transform kernel set may be referred to as a third transform type. The third transform type may be DCT-VIII (or DCT-VIII-based transform kernel).

In an embodiment of the present invention, the first bit of the MTS index may represent whether MTS is applied to the current transform block. If the first bit of the MTS index is 0 (that is, if tu_mts_idx[x][y] in FIG. 23(*b*) is 0 (that is, binarization ‘0’)), it may represent that MTS is not applied to the current transform block, and in this case, a basic kernel (or basic transform kernel) (i.e., the first transform type) may be applied to both the horizontal and the vertical directions. The basic transform kernel may be DCT-II (or DCT-II-based transform kernel). If the first bit of the MTS index is 1 (i.e., 1<=tu_mts_idx[x][y]<=4), the second or the maximum fourth bit may be utilized to indicate the combination of the transform kernel, which is applied to the current transform block, if MTS is applied.

For example, if the MTS index is 1 (i.e., binarization ‘10’), it may represent that the second transform type is applied to both the horizontal and the vertical directions. As described above, the second transform type may be DST-VII. If the MTS index is 2 (i.e., binarization ‘110’), it may represent that the third transform type is applied to the horizontal direction and the second transform type is applied to the vertical direction. As described above, the third transform type may be DCT-VIII. If the MTS index is 3 (i.e., binarization ‘1110’), it may represent that the second transform type is applied to the horizontal direction and the third transform type is applied to the vertical direction. If the MTS index is 4 (that is, binarization ‘1111’), it may represent that the third transform type is applied to both the horizontal direction and the vertical direction.

In the embodiment described above, an example in which the MTS index is signaled by integrating the flag and the index has been described, but the present invention is not limited thereto. As in the method previously described in FIG. 15, the MTS flag is signaled first, and the MTS index may be signaled when the corresponding flag is 1. That is, if the conditions i) to v), the conditions x), y), and z) are all true, the MTS flag may be signaled and parsed, and if the corresponding MTS flag is 1, the MTS index may be signaled and parsed. If the MTS flag and index do not exist, their values may be set to (or inferred as) 0, respectively. In addition, in an embodiment, the MTS index may be signaled using a fixed-length number of bits.

Meanwhile, MTS is a method of finding a combination of horizontal and vertical transform kernels optimized for the energy distribution of the residual signal based on the transform kernel defined in the transform kernel set. If the number of transform kernels defined in the transform kernel set is N, the encoder may find an optimal transform kernel combination (i.e., horizontal and vertical direction transform kernel) that minimizes the rate-distortion cost, after performing transform and inverse transform up to (2^N+1) times. Accordingly, the time complexity of the encoder may increase rapidly due to MTS. In addition, as the size of the transform kernel increases, implementation complexity generally tends to increase. Accordingly, if the maximum size of a block to which MTS may be applied is signaled at a high level, MTS is applied only if the size of the processing block is less than or equal to the maximum size to which MTS may be applied, and the MTS-related syntax is signaled and parsed, the encoder time complexity described above may be efficiently improved, overhead due to signaling of MTS-related syntax may be reduced, and compression performance may be improved.

FIG. 24 is a diagram illustrating a high level syntax structure and a transform unit syntax structure according to an embodiment to which the present invention is applied. According to an embodiment of the present invention, whether or not MTS is applicable may be signaled in any one of raw byte sequence payload (RBSP) syntaxes of a high level set such as a sequence parameter set (SPS), picture parameter set (PPS), video parameter set (VPS), tile group header, and slice header. In FIG. 24, it is assumed a method of signaling MTS-related information through a syntax of sequence level. In describing an embodiment of the present invention with reference to FIG. 24, a decoder is mainly described for convenience of description, but the MTS signaling method according to the present embodiment may be applied substantially equally to the encoder.

Specifically, first, the decoder may parse sps_mts_enabled_flag (S2401). If sps_mts_enabled_flag is 1, it may represent that a plurality of transform kernels including the basic transform kernel may be used. In addition, it may represent that sps_explicit_mts_inter_enabled_flag and sps_explicit_mts_intra_enabled_flag exist in the corresponding level syntax structure. The sps_explicit_mts_inter_enabled_flag and sps_explicit_mts_intra_enabled_flag represent a syntax (or syntax element) indicating, if inter prediction and intra prediction are applied, whether MTS is available, respectively. If sps_mts_enabled_flag is 0, it may represent that sps_explicit_mts_intra_enabled_flag and sps_explicit_mts_inter_enabled_flag do not exist in the corresponding level syntax structure. That is, it may indicate that only the basic transform kernel is used for transform.

If sps_mts_enabled_flag is 1, the decoder may parse sps_explicit_mts_intra_enabled_flag and sps_explicit_mts_inter_enabled_flag (S2402). The sps_explicit_mts_intra_enabled_flag represents a syntax element indicating whether MTS may be applied to an intra-predicted block. If sps_explicit_mts_intra_enabled_flag is 1, it may represent that an MTS index may exist in a transform unit of an intra predicted coding unit. If sps_explicit_mts_intra_enabled_flag is 0, it represents that the MTS index does not exist in the transform unit of the intra predicted coding unit, which may represent that MTS may not be applied to the intra predicted block. The sps_explicit_mts_inter_enabled_flag is an element indicating whether MTS may be applied to an inter predicted or IBC predicted block. If sps_explicit_mts_inter_enabled_flag is 1, it may represent that an MTS index may exist in a transform unit of an inter predicted or IBC predicted coding unit. If sps_explicit_mts_inter_enabled_flag is 0, it represents that the MTS index for the inter predicted or IBC predicted coding unit does not exist, which may represent that MTS may not be applied to the inter predicted or IBC predicted block.

If sps_explicit_mts_intra_enabled_flag is 1 or sps_explicit_mts_inter_enabled_flag is 1, maximum block size information to which MTS may be additionally applied may be signaled (S2403). Specifically, when the maximum size of a block to which MTS may be applied is MaxMtsSize, a value, which is obtained by taking a logarithm of base 2 to MaxMtsSize and then subtracting 2, may be signaled and parsed. That is, (sps_log 2_max_explicit_mts_size_minus2+2) may represent the maximum size of a block whose MTS index may be greater than 0 in the luma transform block. An MTS index greater than 0 may represent that MTS has been applied to the corresponding transformation block. As an embodiment, the value of sps_log 2_max_explicit_mts_size_minus2 may be a value in a range of [0, 3], and if sps_log 2_max_explicit_mts_size_minus2 does not exist, it may be set to (or inferred as) received value 0. Depending on the of sps_log 2_max_explicit_mts_size_minus2, the variable MaxMtsSize may be set (or induced) 1<<(sps_log 2_max_explicit_mts_size_minus2+2).

According to an embodiment of the present invention, the decoder may obtain MTS information at the transform unit level, based on information obtained from the high level syntax according to the embodiment described with reference to FIG. 24(*a*) in the syntax structure as illustrated in FIG. 24(*b*). For parts not described in FIG. 24(*b*), reference may be made to the contents previously described in FIG. 23. As described above, in FIG. 23(*a*), the block size the condition for signaling and parsing the MTS index may include a case (that is, tbWidth<=32 && tbHeight<=32) where the width of the transform block is 32 or less and the height of the transform block is 32 or less. That is, in this case, it may be interpreted that the maximum size of the block to which MTS may be applied is set to a fixed value of 32 in both the encoder and the decoder.

If MTS is performed (or applied) only to a block in which a width of a transform block is 16 or less and a height of the transform block is 16 or less (i.e, tbWidth<=16 && tbHeight<=16) in order to perform high-speed encoding in the encoder, even if the size of the transform block is greater than 16×16 (e.g., (tbWidth<=16 && tbHeight==32)||(tbWidth==32 && tbHeight<=16)), the encoder should always signal the MTS index as 0. In addition, even if the size of the transform block is greater than 16×16, the decoder should always parse the MTS index. In an embodiment of the present invention, in order to solve inefficiency of such a signaling structure, MTS may be applied based on information on the size of the maximum transform block to which the MTS indicated at a high level may be applied, and a MTS-related syntax element may be signaled and parsed. As an example, from sps_log 2_max_explicit_mts_size_minus2, MaxMtsSize, which is a variable representing the maximum size of a transform block to which MTS may be applied, may be determined. The encoder/decoder may apply MTS to a block (i.e., tbWidth<=MaxMtsSize && tbHeight<=MaxMtsSize) in which a width of a transform block is MaxMtsSize or less and a height of the transform block is MaxMtsSize or less. If this the condition is satisfied, an MTS index may be signaled and parsed.

The encoder may perform transform and inverse transform using multiple preset transform kernel combinations (i.e., horizontal and vertical direction transform kernel) only if the size of the current transform block satisfies the conditions described above, and select the optimal transform kernel combination that minimizes rate-distortion cost. The optimal transform kernel combination may be signaled with an MTS index syntax element. If the block size the condition described above is satisfied (that is, tbWidth<=MaxMtsSize && tbHeight<=MaxMtsSize), the decoder may determine a transform kernel applied to the horizontal and vertical directions of residual samples of the current transform block by parsing the MTS index. If the width of the current transform block is greater than MaxMtsSize or the height of the current transform block is greater than MaxMtsSize (i.e., tbWidth>MaxMtsSize||tbHeight>MaxMtsSize), only one transform kernel combination with which the basic kernel is applied to both the horizontal and vertical directions may be used, and the encoder may not signal the MTS index. The decoder may not parse the MTS index and may set its value to (or infer as) 0, and may apply a basic transform kernel to both the horizontal and the vertical directions. As described above, the basic transform kernel may be DCT-II.

Meanwhile, IBC prediction is a method of generating a prediction block for a current block from a reconstructed region of the current picture in which reconstruction is being progressed and, in which, prediction may be performed by utilizing a block at a position indicated by a block vector of the current block in a current picture as a reference block, unlike intra prediction, in which directional or non-directional prediction is performed using reconstructed reference samples around the current block. In this case, the position indicated by the block vector may be a reconstructed region of the current picture. In addition, unlike inter prediction in which a reference picture is a past picture in which the reference picture has already been reconstructed or a future picture, IBC prediction may use the current picture as a reference picture. As described above, IBC prediction has characteristics different from conventional intra prediction and inter prediction, and may be considered to be similar to inter prediction in that a prediction block is generated from a position indicated by a vector, but since the reference region for prediction is a current picture, IBC prediction may exhibit different characteristics from inter prediction.

The energy distribution characteristics (i.e., the energy distribution of the residual signal in the horizontal direction and the energy distribution of the residual signal in the vertical direction) of the residual signal tends to change depending on the prediction method, and thus the optimal transformation kernel may vary depending on the prediction method. The DST-VII-based and DCT-VIII-based transform kernels used for inter and intra predicted blocks may not be considered to reflect the characteristics of the residual signal of the block predicted by IBC well. For this reason, for a block predicted by IBC, a transform skip or DCT-II as a basic kernel may be more efficient. In particular, in the case of IBC prediction, it generally exhibits high efficiency during screen contents coding and is used relatively often. If screen content coding is performed, an amount of the residual signal may be relatively small and a pattern of the residual signal may be uniform, compared to coding for a general image. In this case, if the basic transform kernel is applied without applying MTS, not only signaling bits may be reduced, but transform efficiency may be improved. Accordingly, according to an embodiment of the present invention, if IBC prediction is used for a current block, MTS is not applied and transform skip or a basic transform kernel may be used. The basic transform kernel may be DCT-II (or DCT-II-based transform kernel).

FIG. 25 is a diagram illustrating a method of selecting, if IBC prediction is applied, a transform method, as an embodiment to which the present invention is applied. For matters not described in the embodiment of FIG. 25, reference may be made to the content of previously described in FIG. 23, and a redundant description thereof will be omitted. Referring back to the condition x) of FIG. 23, when sps_explicit_mts_inter_enabled flag is 1, if CuPredMode [x0][y0] is MODE_INTER or MODE IBC, that is, if inter prediction or IBC prediction is applied to the current block, a transform kernel may be determined by parsing the MTS index according to the conditions y) and z). In other words, not only when inter prediction is applied to the current block, but also when IBC prediction is applied to the current block, if a preset condition is satisfied, the encoder/decoder may determine the transform kernel by signaling/parsing the MTS index.

On the other hand, referring to FIG. 25, in step S2501, if sps_explicit_mts_inter_enabled_flag is 1, the decoder may check whether CuPredMode[x0][y0] is MODE_INTER, and determine whether or not to parse the MTS index. That is, when sps_explicit_mts_inter_enabled_flag is 1, if CuPredMode[x0][y0] is MODE_INTER, that is, if inter prediction is applied to the current block, the decoder may determine the transform kernel by checking the conditions y) and z) and parsing the MTS index. According to an embodiment of the present invention, if CuPredMode[x0][y0] is MODE_IBC, the MTS index may not be signaled regardless of sps_explicit_mts_inter_enabled flag and sps_explicit_mts_intra_enabled_flag. The decoder may not parse the MTS index and may set its value to (or infer as) 0. Accordingly, if IBC prediction is applied to the current block, transform skip or a basic transform kernel may be applied to the horizontal and vertical directions in the current transform unit (or transform block) on the basis of a transform skip flag (i.e., transform_skip_flag[x0][y0]). In this case, the basic transform kernel may be DCT-II.

In addition, according to another embodiment of the present invention, if IBC prediction is applied to the current block, the encoder/decoder utilizes MTS, but a transform kernel set different from the transform kernel set used in intra and/or inter prediction may be configured. Alternatively, if IBC prediction is applied, the encoder/decoder may configure a transform kernel set including all or part of the transform kernel used in intra prediction and/or inter prediction. In this case, the encoder/decoder may determine a transform kernel by signaling and parsing the MTS index with the same structure as that in FIG. 23(*a*) previously described.

FIG. 26 is a diagram showing an example of a transform tree syntax structure according to an embodiment of the present invention. According to an embodiment of the present invention, a transform tree splitting may be processed through a transform tree syntax structure. Leaf nodes of the transform tree may be transform units (TU), and parsing and processing of syntax elements related to the residual signal may be performed in the transform unit. The transform tree syntax may receive (X0, y0) representing the top-left coordinate of the split node (or split block) in the transformation tree, tbWidth representing the width of the split node, tbHeight representing the height of the split node, treeType representing a variable indicating the type of coding tree currently being processed, and a chType variable which is set according to the treeType variable as inputs. If treeType is SINGLE_TREE, it may represent that luma and chroma are coded with the same coding tree structure. When treType is DUAL_TREE_LUMA, if luma and chroma are coded with different coding tree structures, it may represent that the tree currently being processed is a tree for luma components. When the treeType is DUAL_TREE_CHROMA, if the luma and chroma are coded with different coding tree structures, it may represent that the tree currently being processed is a tree for chroma components. The variable chType may be set on the basis of treeType, and if the treeType is DUAL_TREE_CHROMA, chType may be set to 1, otherwise, it may be set to 0. If the transform tree syntax (or function) is called for the first time, (x0, y0) may be the same as the top-left coordinate of the coding unit, and tbWidth, tbHeight, treeType, and chType may be the same as the width, height, treeType, and chType of the coding unit, respectively. A case where the root node of the transform tree having the same size as the coding unit is split may be classified into the following three types. The root node of the transform tree may correspond to the coding unit, and the leaf node of the transform tree may correspond to the transform unit.

i) Case where the size of the root node and the split node is greater than the luma maximum transform size MaxTbSizeY (tbWidth>MaxTbSizeY||tbHeight>MaxTbSizeY): MaxTbSizeY is a variable that represents the size of the luma maximum transform block and may be determined on the basis of the maximum size of the transform kernel defined in the encoder/decoder. In general, as the maximum size of the transform kernel increases, energy compaction increases and coding efficiency may be improved, but sizes of pipeline buffers of a hardware encoder and decoder may be determined according to the maximum size of the transform kernel. Therefore, the maximum size of the transform kernel may be determined in consideration of both complexity and coding efficiency. As an embodiment, MaxTbSizeY may be set to the same fixed constant value in both the encoder and the decoder, or may be set according to a syntax element signaled at a high level. For example, maximum size information of the luma transform block may be indicated by being included in any one of SPS, PPS, and VPS. For example, sps_max_luma_transform_size_64_flag may be signaled by being included in the SPS. If sps_max_luma_transform_size_64_flag is 1, it may represent that the luma maximum transform size is 64, and if sps_max_luma_transform_size_64_flag is 0, it may represent that the luma maximum transform size is 32. On the basis of the sps_max_luma_transform_size_64_flag, the variables MaxTbLog2SizeY and MaxTbSizeY may be set as shown in Equation 1 below.

[Equation 1]

$$\mathrm{Max}Tb\mathrm{Log2Size}Y=\mathrm{sps\_max\_luma\_transform\_size\_64\_flag}\ ?\ 6{:}5$$

$$\mathrm{Max}Tb\mathrm{Size}Y=1<<\mathrm{Max}Tb\mathrm{Log2Size}Y$$

In Equation 1, the variable MaxTbSizeY represents the maximum size of the luma transform block, and MaxTbLog2SizeY is a variable representing a value obtained by taking the logarithm of base 2 to MaxTbSizeY. In the embodiment described above, the maximum size information (or syntax element) of the luma transform block may be signaled in the form of a flag at the SPS level. In describing the embodiment of the present invention, it has been described that the maximum size of the luma transform block is determined to be either 64 or 32, but the present invention is not limited thereto. For example, a value obtained by taking the logarithm of base 2 to the maximum size of the luma transform block may be directly signaled. As an embodiment, MaxTbLo2SizeY and MaxTbSizeY may be determined at a sequence level, and as another example, the parameter (or variable) may be determined at a picture, tile, or slice level lower than the sequence level.

In one embodiment, in the transform tree splitting based on the maximum size of luma transform block, a splitting method (or split-related information) may not be explicitly signaled. On the other hand, in the case of ISP or SBT, the splitting method for the transform tree may be explicitly signaled, and splitting of the transform tree based on the luma maximum transform size may be performed if ISP and SBT are not applied. Accordingly, referring to FIG. 26, in step S2601, the decoder may check whether ISP or SBT is applied to the current coding unit. If IntraSubPartitionsSplitType is ISP_NO_SPLIT, it may represent that ISP is not applied to the current coding unit. If Intra SubPartitionsSplitType is not ISP_NO_SPLIT, it may represent that ISP is applied to the current coding unit. In addition, if cu_sbt_flag is 1, it may represent that SBT is applied to the current coding unit, and if cu_sbt_flag is 0, it may represent that SBT is not applied to the current coding unit. As described above, the transform tree splitting based on the luma maximum transform size may be performed if ISP and SBT are not applied, and thus if IntraSubPartitionsSplitType is ISP_NO_SPLIT and cu_sbt_flag is 0 in the if statement of step S2601, the transform tree splitting may be performed on the basis of the luma maximum transform size.

In one embodiment of the present invention, if the width tbWidth or height tbHeight of the root node and the split intermediate node of the transform tree is greater than the luma maximum transform size, the encoder/decoder does not explicitly signal/parse information on the splitting method, and may split the transform tree until both the width and height of the split node become less than or equal to the luma maximum transform size. If both the width tbWidth and the height tbHeight of the current node are less than or equal to the luma maximum transform size, the current node may be determined as a leaf node of the transform tree, that is, a transform unit.

For example, if the luma maximum transform size is 32 for a 64×64 root node (same size as the coding unit), the root node of the transform tree is split into four nodes each having a size 32×32, and a leaf node having a size of 32×32 may be determined as a transform unit without additional splitting. As another example, if the luma maximum transform size for a 64×32 root node is 32, the root node of the transform tree is split into two nodes each having a size 32×32, and a leaf node having a size of 32×32 may be determined as a transform unit without additional splitting. If the width or height of the root node and/or the split intermediate node of the transform tree is greater than the root node, the encoder/decoder may split the transform tree by recursively calling the transform tree syntax. If the width and height of the root node and/or the split intermediate node of the transform tree are all less than or equal to the luma maximum transform size, the corresponding node may be determined as a transform unit without additional splitting, and parsing and processing of a syntax element related to a residual signal may be performed in the transform unit syntax structure.

ii) Case SBT is applied to the current coding unit(cu_sbt_flag==1): Unlike the case i) described above, if SBT is applied, the transform tree splitting method may be determined through explicit signaling of a syntax element at the coding unit level.

iii) If ISP is applied to the current coding unit (IntraSubPartitionsSplitType!=ISP_NO_SPLIT): Unlike the case i) described above, if ISP is applied, the transform tree splitting method may be determined through explicit signaling of the syntax element at the coding unit level. For example, if IntraSubPartitionsSplitType is ISP_HOR_SPLIT, it may mean horizontal splitting by ISP, and if IntraSubPartitionsSplitType is ISP_VER_SPLIT, it may mean vertical splitting by ISP.

As in the cases of i), ii), and iii) described above, if the transform tree may be classified into the case i) where it is split without explicit signaling of a syntax element, and the cases ii) and iii) where the splitting method is indicated using explicit signaling of a syntax element. According to the transform tree syntax structure shown in FIG. 26, all of the transform tree splitting described in cases i), ii), and iii) may be performed (or applied). The transform tree syntax structure of FIG. 26 may be summarized as shown in Table 15 below.

TABLE 15

```
transform_tree( )
{
  if(IntraSubPartitionsSplitType==ISP_NO_SPLIT && !cu_sbt_flag)
  {
    implicit splitting on the basis of block size
  }
  else if(cu_sbt_flag)
  {
    explicit splitting on the basis of SBT mode
  }
  else if(IntraSubPartitionsSplitType==ISP_HOR_SPLIT)
  {
    explicit splitting on the basis of ISP mode
  }
  else if(IntraSubPartitionsSplitType==ISP_VER_SPLIT)
  {
    explicit splitting on the basis of ISP mode
  }
}
```

Referring to Table 15, first, if IntraSubPartitionsSplitType is ISP_NO_SPLIT and cu_sbt_flag is 0, implicit splitting may be performed on the basis of size information of the current node and the luma maximum transform block size. Next, if IntraSubPartitionsSplitType is ISP_NO_SPLIT and cu_sbt_flag is 1, the encoder/decoder may split the transform tree based on the syntax element related to the SBT signaled/parsed at the coding unit level. Next, if IntraSubPartitionsSplitType is not ISP_NO_SPLIT and cu_sbt_flag is 0, horizontal splitting or vertical splitting of ISP may be performed based on IntraSubPartitionsSplitType.

FIG. 27 is a diagram illustrating a transform unit syntax structure according to an embodiment of the present invention. According to an embodiment of the present invention, the MTS index, which is a syntax element indicating transform skip-related information and/or a transform kernel, may be processed in the transform unit syntax structure. Referring to FIG. 27, an embodiment of the present invention is described mainly on a decoder for convenience of description, but the present invention is not limited thereto, and transform skip and MTS determination method according to the present embodiment may be applied substantially equally to the encoder.

Referring to FIG. 27, the transform unit syntax structure represents a syntax structure related to a transform unit for which a transform process is performed. The transform unit syntax may receive x0, y0, tbWidth, tbHeight, treeType, subTuIndex, and chType as inputs. (x0, y0) may represent the position of the top-left luma sample of the current transform block, and may be a relative position with the position of the top-left luma sample of the current picture as a reference. The variables tbWidth and tbHeight represent the width and height of the current transform block, respectively. A coding tree structure for the luma component and a coding tree structure for the chroma component may be coded with the same structure or different structures. Accordingly, the treeType variable may indicate the type of coding tree currently being processed. If the treeType is SINGLE_TREE, it means that the luma component and the chroma component are coded with the same coding tree structure. In this case, the transform unit may include a luma transform block and a chroma transform block according to a color format. When the treeType is DUAL_TREE_LUMA, if the luma component and the chroma component are coded with a coding tree structure having different structures, it may represent that the coding tree currently being processed is a coding tree of the luma component. In this case, the transform unit may include the luma transform block. When the treeType is DUAL_TREE_CHROMA, if the luma component and the chroma component are coded with a coding tree structure having different structures, it may represent that the coding tree currently being processed is a coding tree of the chroma component. In this case, the transform unit may include the chroma transform block according to the color format. The subTuIndex represents an index of transform unit currently being processed. The chType may be set on the basis of the treeType. If the treeType is DUAL_TREE_CHROMA, the chType may be set to 1, otherwise, it may be set to 0.

In the transform unit syntax structure (i.e., transform_unit( )), first, the encoder may indicate whether the current transform block has one or more non-zero transform coefficients by signaling a coded block flag CBF for a luma block, a Cb chroma block, and a Cr chroma block. Similarly, the decoder may determine (or induce) whether the current transform block has one or more non-zero transform coefficients by parsing the coded block flag CBF for the luma block, Cb block (or Cb chroma block), and Cr block (or Cr chroma block). For example, if tu_cbf_luma[x0][y0] is 1, it may represent that the current luma transform block includes one or more non-zero transform coefficients, and if tu_cbf_luma[x0][y0] is 0, it may represent that all transform coefficients of the current luma transform block are 0. If tu_cbf_cb[x0][y0] is 1, it may represent that the current Cb transform block includes one or more non-zero transform coefficients, and if tu_cbf_cb[x0][y0] is 0, it may represent that all transform coefficients of the current Cb transform block are 0. If tu_cbf_cr[x0][y0] is 1, it may represent that the current Cr transform block includes one or more non-zero transform coefficients, and if tu_cbf_cr[x0][y0] is 0, it may represent that all transform coefficients of the current Cr transform block are 0.

In step S2701 (i.e., the first the conditional statement), the decoder may check (or examine) a preset condition for determining whether or not to apply transform skip and/or MTS. As an example, if the following the conditions i), ii), iii), iv), and v) are all true, the decoder may respectively parse (S2703, S2705) transform skip and MTS information (i.e., syntax elements) according to the second the conditional statement of step S2702 and the third the conditional statement of step S2704, which will be described later.

Condition i) tu_cbf_luma[x0][y0]==1: The decoder may check whether the value of tu_cbf_luma[x0][y0] is 1. If the value of tu_cbf_luma[x0][y0] is 0, it represents that all transform coefficients of the current luma transform block are 0, and thus the decoder may reconstruct the residual signal to zero without performing inverse quantization and inverse transform. Accordingly, if the value of tu_cbf_luma[x0][y0] is 0, transform skip and MTS information may not be signaled and parsed.

Condition ii) treeType!=DUAL_TREE_CHROMA: The decoder may check whether the tree type is a tree type including a luma transform block. Both transform skip and MTS may be applied only to the luma transform block, and thus if the current transform unit (or transform block) does not include the luma transform block, transform skip and MTS information may not be signaled and parsed. That is, if the tree type is DUAL_TREE_CHROMA, the current transform unit does not include the luma transform block, and thus transform skip and MTS information may not be signaled and parsed.

Condition iii) (tbWidth<=32) && (tbHeight<=32): The decoder may check whether the width and height of the current transform block are less than or equal to 32. The maximum size of the transform block to which transform skip and MTS may be applied is 32×32, and thus if the width of the transform block and both are 32 or less, signaling and parsing of transform skip and MTS information may be performed depending on additional the conditions.

Condition iv) IntraSubPartitionsSplitType[x0][y0]== ISP_NO_SPLIT: The decoder may check whether ISP is not applied to the current coding unit (or coding block). If ISP is applied to the current coding unit, transform and inverse transform may be performed according to a preset method. Accordingly, if ISP is applied to the current coding unit, transform skip and MTS information may not be signaled and parsed. The IntraSubPartitionsSplitType represents the variable indicating the block splitting method by ISP. The IntraSubPartitionsSplitType may indicate the block splitting method by ISP according to ISP information signaled at the coding unit level. If IntraSubPartitionsSplitType is not ISP_NO_SPLIT, it may represent that ISP is applied to the current block. Accordingly, if IntraSubPartitionsSplitType is not ISP_NO_SPLIT, transform skip and MTS information may not be signaled and parsed.

Condition v) !cu_sbt_flag: The decoder may check whether sub-block transform (SBT) is not applied to the current coding unit. If SBT is applied to the current coding unit, transform and inverse transform may be performed according to a preset method. Accordingly, if SBT is applied to the current coding unit, transform skip and MTS information may not be signaled and parsed. The cu_sbt_flag represents a syntax element indicating whether SBT is applied to the current coding unit. The cu_sbt_flag may be signaled and parsed at the coding unit level. If cu_sbt_flag is 1, it may represent that SBT is applied to the current coding unit, and transform skip and MTS information may not be signaled and parsed.

If the conditions i) to v) described above are all true, in step S2702, the decoder may check (or examine) the following the conditions a), b), and c) for determining whether or not to apply the transform skip. As an example, if the following the conditions a), b), and c) are all true, transform skip-related information may be signaled and parsed.

Condition a) sps_transform_skip_enabled_flag==1: The decoder may check whether transform skip may be available for (or applied to) the current block. The sps_transform_skip_enabled_flag represents a flag (or syntax element) indicating whether transform skip is available. The flag indicating whether or not the transform skip is available may be signaled and parsed by being included in at least one of high level syntax such as a picture parameter set (PPS), a sequence parameter set (SPS), a video parameter set (VPS), a tile group header, and a slice header. If sps_transform_skip_enabled_flag is 1, whether or not to apply transform skip may be indicated at the transform unit level. Additionally, if sps_transform_skip_enabled_flag is 1, the maximum block size for which transform skip is possible may be signaled from the encoder to the decoder. If sps_transform_skip_enabled_flag is 0, a syntax element indicating the transform skip may not exist (or may not be parsed or may not be explicitly signaled) in the transform unit syntax structure.

Condition b) !BdpcmFlag[x0][y0]: As one of the intra prediction methods, a block-based delta pulse code modulation (BDPCM) method may be defined. If the BDPCM mode is applied, the encoder/decoder may perform intra prediction using a preset prediction mode, apply transform skip, and then express a quantized coefficient as a sum of a sample at a previous position and a sample at a current position according to a preset mode. That is, in the BDPCM mode, transform is not applied, and a difference between the sample at the current position and the sample at the previous position, as the quantized coefficient, may be transmitted from the encoder to the decoder according to the preset mode. BDPCM-related information (or syntax element) may be indicated at the coding unit level. As an embodiment, BdpcmFlag[x0][y0] may be transmitted from the encoder to the decoder. If BdpcmFlag[x0][y0] is 1, it may represent that BDPCM is applied to the current block. If BDPCM is currently applied, it may be seen that transform skip is applied, and thus transform_skip_flag[x0][y0], which is a syntax element representing whether transform skip is applied to the current luma transform block, is not explicitly signaled and may be set to (or inferred as) 1.

Condition c) tbWidth<=MaxTsSize && tbHeight<=MaxTsSize: The decoder may check whether the width and height of the transform block are less than or equal to the maximum transform skip size. If sps_transform_skip_enabled_flag is 1, the maximum block size for which transform skip is possible may be indicated, and through this, a MaxTsSize variable representing the maximum transform size may be set. As an embodiment, the transform skip may be applied to a block in which both the width and the height of the transform block are less than or equal to MaxTsSize.

In step S2703, if the conditions i) to v) and the conditions a), b), and c) described above are all true, transform_skip_flag[x0][y0], which is a syntax element indicating whether the transform skip is applied to the current luma transform block, may be signaled and parsed. If transform_skip_flag[x0][y0] is 1, it may represent that the transform is not applied to the current luma transform block. If transform_skip_flag[x0][y0] is 0, it may represent that transform is applied to the current luma transform block. If transform_skip_flag[x0][y0] does not exist (i.e., is not explicitly signaled), a value of transform_skip_flag[x0][y0] may be set (or inferred) according to BdpcmFlag[x0][y0]. If BdpcmFlag[x0][y0] is 1, the transform_skip_flag[x0][y0] may be set to (or inferred as) 1, and if BdpcmFlag[x0][y0] is 0, transform_skip_flag[x0][y0] may be set to (or inferred as) 0.

When the conditions i) to v) described above are all true, if the following the conditions x and y are all true (S2704), MTS-related information may be signaled and parsed (S2705).

Condition x) (CuPredMode[chType][x0][y0]!=MODE_INTER && sps_explicit_mts_inter_enabled_flag)||(CuPred[chType] Mode[x0][y0]==MODE_INTRA && sps_explicit_mts_intra_enabled_flag): The decoder may check whether a preset condition is satisfied on the basis of the prediction mode of the current block and whether or not explicit MTS is available. A method of prediction (i.e., a prediction mode) may be determined at the coding unit level, and a variable CuPredMode[chType][x0][y0] may be set on the basis of information received at the coding unit level. The prediction mode includes intra prediction and inter prediction. Additionally, the prediction mode may include intra block copy (IBC) prediction for generating a prediction block from a reconstructed region in the current picture. If CuPredMode[chType][x0][y0] is MODE_INTRA, it may represent that the current block is coded with intra prediction, and if CuPred[chType] Mode[x0][y0] is MODE_INTER, it may represent the current block is coded with inter prediction. In addition, if CuPredMode[chType][x0][y0] is MODE_IBC, it may represent that the current block is coded with IBC prediction.

Meanwhile, the flag indicating whether or not MTS is available may be signaled and parsed by being included in at least one of high level syntax such as the picture parameter set (PPS), sequence parameter set (SPS), video parameter set (VPS), tile group header, and slice header. Specifically, whether or not MTS is available for the prediction method may be independently indicated. If sps_explicit_mts_inter_enabled_flag is 1, it represents that an MTS index (in this specification, it may be referred to as tu_mts_idx, mts_idx), which is a syntax element indicating a transform kernel for an inter-predicted coding unit, may exist in the transform unit syntax, and whether or not to apply MTS may be indicated depending on the MTS index at the transform unit level. If sps_explicit_mts_inter_enabled_flag is 0, it represents that the MTS index may not exist (i.e., not explicitly signaled) in the transform unit syntax for the inter predicted, which means that MTS may not be applied to inter predicted block. In other words, if sps_explicit_mts_inter_enabled_flag is 0, it represents that the MTS index is not signaled to the inter predicted coding unit, and if the MTS index does not exist, its value may be inferred as 0. If MTS is not applied, a preset transform kernel may be used, which may be a DCT-II-based transform kernel. If sps_explicit_mts_intra_enabled_flag is 1, it represents that the MTS index may exist in the transform unit syntax for the intra-predicted coding unit, and whether or not to apply MTS may be indicated depending on the MTS index at the transform unit level. If sps_explicit_mts_intra_enabled_flag is 0, it represents that the MTS index may not exist in the transform unit syntax for the intra-predicted coding unit. In other words, if sps_explicit_mts_intra_enabled_flag is 0, it represents that the MTS index is not signaled to the intra-predicted coding unit, and if the MTS index does not exist, its value may be inferred as 0. When MTS is not applied, a preset transform kernel may be used, which may be a DCT-II-based transform kernel.

If the current block is coded with intra prediction and MTS is available for intra prediction through high level syntax signaling (i.e., CuPredMode[x0][y0]==MODE_INTRA && sps_explicit_mts_intra_enabled_flag), or if the current block is coded with inter prediction and MTS is available for inter prediction through high level syntax signaling (i.e., CuPredMode[chTye][x0][y0]==MODE_INTER && sps_explicit_mts_inter_enabled_flag), the condition x) may be true. That is, in the condition x), if the corresponding MTS enabled flag is on in the high level syntax according to the prediction mode (that is, according to the CuPred[chType] Mode[x0][y0] variable), MTS-related information may be signaled and parsed.

Condition y) !transform_skip_flag[x0][y0]: The decoder may check whether transform skip is not applied to the current transform block. If the transform skip is applied to the current transform block, transform is not applied, and thus MTS-related information may not be signaled and parsed.

If the conditions i) to v) and the conditions x) and y) are all true, in step S2705, an MTS index, which is a syntax element indicating a transform kernel (or transform type) applied to the horizontal and vertical directions of residual samples of the luma transform block, may be signaled and parsed. As an embodiment, if the MTS index does not exist, the MTS index may be set to (or inferred as) 0. This may represent that the preset basic kernel is applied to both the horizontal direction and the vertical direction, and the basic kernel may be a DCT-II-based integer kernel. The transform kernel applied to the horizontal direction and the vertical direction according to the MTS index may follow the method previously described in FIG. 14.

On the other hand, in the transform unit syntax structure of FIG. 27, even if the transform tree is split into multiple transform units on the basis of the maximum size (MaxTbSizeY) of the luma transform block, the MTS index may be parsed in each of the split transform units. In addition, a different transform kernel may be applied to each transform unit on the basis of the parsed MTS index. For example, if the luma maximum transform size is 32, a coding unit having a size of 64×64 may be split into four transform units each having a size of 32×32. Each of the split transform units always has a tbWidth of 32 or less (tbWidth<=32) and a tbHeight of 32 or less (tbHeight<=32), and thus the MTS index may be signaled and parsed if the remaining the conditions for signaling/parsing the MTS index are true. In this case, each split transform unit may have a different MTS index value. That is, this means that the transform kernels applied to the horizontal direction and the vertical direction of each split transform unit may be different. For example, it may be possible to apply a DCT-II-based kernel to the horizontal direction and the vertical direction of the split first transform block and apply a DST-VII-based kernel may be applied to the horizontal direction and vertical direction of the split second transform block.

As described above, if different transform kernels are applied to each of the split transform units according to the MTS index, there is an advantage in that an optimal transform kernel may be selected according to characteristics of a residual signal included in the transform unit. However, the prediction method is determined at the coding unit level, and thus the characteristics of the residual signals included in the transform units split at the coding unit level are highly likely to be similar to each other. Accordingly, if the same transform kernel is applied to all of the divided transform units by setting the MTS index to a preset value without explicitly signaling the MTS to the transform units split based on the maximum size of the luma transform block, signaling overhead required for indicating the transform kernel may be reduced. That is, even if the (tbWidth<=32) && (tbHeight<=32) the condition is true in the transform unit split by the maximum size of the luma transform block, the MTS index may not be explicitly signaled, and the MTS index may be set to a preset value. The preset value may be 0, and in this case, a DCT-II-based basic kernel may be applied to both the horizontal direction and the vertical direction.

FIG. 28 is a diagram illustrating a transform unit syntax structure according to an embodiment of the present invention. For matters not described in the embodiment of FIG. 28, reference may be made to the content of FIG. 27 previously described, and redundant descriptions thereof will be omitted. According to an embodiment of the present invention, the MTS index, which is a syntax element indicating transform skip-related information and/or a transform kernel, may be processed in the transform unit syntax structure. Referring to FIG. 28, an embodiment of the present invention is described mainly on a decoder for convenience of description, but the present invention is not limited thereto, and transform skip and MTS determination method according to the present embodiment may be applied substantially equally to the encoder.

In step S2801 (i.e., the first the conditional statement), the decoder may check (or examine) a preset condition for determining whether or not to apply transform skip and/or MTS. As an example, if the following the conditions i), ii), iii), and iv) are all true, the decoder may respectively parse (S2703, S2705) transform skip and MTS information (i.e., syntax element) according to the second the conditional statement of step S2802 and the third the conditional statement of step S2804, which will be described later.

Condition i) tu_cbf_luma[x0][y0]==1: The decoder may check whether the value of tu_cbf_luma[x0][y0] is 1. If the value of tu_cbf_luma[x0][y0] is 0, it represents that all transform coefficients of the current luma transform block are 0, and thus the decoder may reconstruct the residual signal to zero without performing inverse quantization and inverse transform. Accordingly, if the value of tu_cbf_luma [x0][y0] is 0, transform skip and MTS information may not be signaled and parsed.

Condition ii) tree Type!=DUAL_TREE_CHROMA: The decoder may check whether the tree type is a tree type including a luma transform block. Both transform skip and MTS may be applied only to the luma transform block, and thus if the current transform unit (or transform block) does not include the luma transform block, transform skip and MTS information may not be signaled and parsed. That is, if the tree type is DUAL_TREE_CHROMA, the current transform unit does not include the luma transform block, and thus transform skip and MTS information may not be signaled and parsed.

Condition iii) IntraSubPartitionsSplitType[x0][y0]== ISP_NO_SPLIT: The decoder may check whether ISP is not applied to the current coding unit (or coding block). If ISP is applied to the current coding unit, transform and inverse transform may be performed according to a preset method. Accordingly, if ISP is applied to the current coding unit, transform skip and MTS information may not be signaled and parsed. The IntraSubPartitionsSplitType represents the variable indicating the block splitting method by ISP. The IntraSubPartitionsSplitType may indicate the block splitting method by ISP according to ISP information signaled at the coding unit level. If IntraSubPartitionsSplitType is not ISP_NO_SPLIT, it may represent that ISP is applied to the current block. Accordingly, if IntraSubPartitionsSplitType is not ISP_NO_SPLIT, transform skip and MTS information may not be signaled and parsed.

Condition iv) !cu_sbt_flag: The decoder may check whether sub-block transform (SBT) is not applied to the current coding unit. If SBT is applied to the current coding unit, transform and inverse transform may be performed according to a preset method. Accordingly, if SBT is applied to the current coding unit, transform skip and MTS information may not be signaled and parsed. The cu_sbt_flag represents a syntax element indicating whether SBT is applied to the current coding unit. The cu_sbt_flag may be signaled and parsed at the coding unit level. If cu_sbt_flag is 1, it may represent that SBT is applied to the current coding unit, and transform skip and MTS information may not be signaled and parsed.

If the conditions i) to iv) described above are all true, in step S2802, the decoder may check (or examine) the following the conditions a), b), and c) for determining whether or not to apply the transform skip. As an example, if the following the conditions a), b), and c) are all true, transform skip-related information may be signaled and parsed. The conditions a), b), and c) described above may be defined to be the same as the conditions a), b), and c) previously described in FIG. 27.

In step S2803, if the conditions i) to iv) and the conditions a), b), and c) described above are all true, transform_skip_flag[x0][y0], which is a syntax element indicating whether the transform skip is applied to the current luma transform block, may be signaled and parsed. If transform_skip_flag[x0][y0] is 1, it may represent that transform is not applied to the current luma transform block. If transform_skip_flag[x0][y0] is 0, it may represent that transform is applied to the current luma transform block. If transform_skip_flag[x0][y0] does not exist, a value of transform_skip_flag[x0][y0] may be set (or inferred) according to BdpcmFlag[x0][y0]. If BdpcmFlag[x0][y0] is 1, transform_skip_flag[x0][y0] may be set to (or inferred as) 1, and if BdpcmFlag[x0][y0] is 0, transform_skip_flag[x0][y0] may be set to (or inferred as) 0.

According to an embodiment of the present invention, even if the transform tree is split into multiple transform units according to the maximum size the condition of the luma transform block (i.e., implicitly split on the basis of the luma transform maximum size), if all of the conditions i) to iv) and the conditions a), b), and c) are satisfied, the decoder may parse transform_skip_flag[x0][y0] and apply transform skip to the split transform units according to the value of transform_skip_flag[x0][y0].

When the conditions i) to iv) described above are all true, if the following the conditions x), y), and z) are all true (S2804), MTS-related information may be signaled and parsed (S2805).

Condition x) (CuPredMode[chType][x0][y0]!=MODE_INTER && sps_explicit_mts_inter_enabled_flag)||(CuPredMode[chType][x0][y0]==MODE INTRA && sps_explicit_mts_intra_enabled_flag): The decoder may check whether or not a preset condition is satisfied on the basis of the prediction mode of the current block and whether or not explicit MTS is available. A method of prediction (i.e., a prediction mode) may be determined at the coding unit level, and a variable CuPredMode[chType][x0][y0] may be set on the basis of information received at the coding unit level. The prediction mode includes intra prediction and inter prediction. Additionally, the prediction mode may include intra block copy (IBC) prediction for generating a prediction block from a reconstructed region in the current picture. If CuPred[chType] Mode[x0][y0] is MODE_INTRA, it may represent that the current block is coded with intra prediction, and if CuPred[chType] Mode[x0][y0] is MODE_INTER, it may represent the current block is coded with inter prediction. In addition, if CuPred[chType] Mode[x0] [y0] is MODE_IBC, it may represent that the current block is coded with IBC prediction.

Meanwhile, the flag indicating whether or not MTS is available may be signaled and parsed by being included in at least one of high level syntax such as the picture parameter set (PPS), sequence parameter set (SPS), video parameter set (VPS), tile group header, and slice header. Specifically, whether or not MTS is available for the prediction method may be independently indicated. If sps_explicit_mts_inter_enabled_flag is 1, it represents that an MTS index (in this specification, it may be referred to as tu_mts_idx, mts_idx), which is a syntax element indicating a transform kernel for an inter predicted coding unit, may exist in the transform unit syntax, and whether or not to apply MTS may be indicated depending on the MTS index at the transform unit level. If sps_explicit_mts_inter_enabled flag is 0, it represents that the MTS index may not exist (i.e., not explicitly signaled) in the transform unit syntax for the inter predicted coding unit, which means that MTS may not be applied to inter predicted blocks. In other words, if sps_explicit_mts_inter_enabled_flag is 0, it represents that the MTS index is not signaled to the inter predicted coding unit, and if the MTS index does not exist, its value may be inferred as 0. If MTS is not applied, a preset transform kernel may be used, which may be a DCT-II-based transform kernel. If sps_explicit_mts_intra_enabled_flag is 1, it represents that the MTS index may exist in the transform unit syntax for the intra-predicted coding unit, and whether or not to apply MTS may be indicated depending on the MTS index at the transform unit level. If sps_explicit_mts_intra- _enabled_flag is 0, it represents that the MTS index may not exist in the transform unit syntax (not explicitly signaled) for the intra-predicted coding unit. In other words, if sps_explicit_mts_intra_enabled_flag is 0, it represents that the MTS index is not signaled to the intra-predicted coding unit, and if the MTS index does not exist, its value may be inferred as 0. If MTS is not applied, a preset transform kernel may be used, which may be a DCT-II-based transform kernel.

If the current block is coded with intra prediction, and MTS is available for intra prediction through high level syntax signaling (i.e., CuPred[chType] Mode [x0][y0]==MODE_INTRA && sps_explicit_mts_intra_enabled_flag) or if the current block is coded with inter prediction and MTS is available for inter prediction through high level syntax signaling (CuPredMode[chType] [x0][y0]!=MODE_INTRA && sps_explicit_mts_inter_enabled_flag), the condition x) may be true. That is, in the condition x), if the corresponding MTS enabled flag is on in the high level syntax according to the prediction mode (that is, according to the CuPred[chType] Mode[x0][y0] variable), MTS-related information may be signaled and parsed.

Condition y) !transform_skip_flag[x0][y0]: The decoder may check whether transform skip is not applied to the current transform block. If the transform skip is applied to the current transform block, transform is not applied, and thus MTS-related information may not be signaled and parsed.

Condition z) (CbWidth[chType][x0][y0]<=32) && (CbHeight[chType][x0][y0]<=32): CbWidth[chType][x0] [y0] and CbHeight[chType][x0][y0] may represent the width and height of the current coding block, respectively. The transform unit may be split by the transform tree using the coding unit as the root node, and thus it may satisfy the relationship of CbWidth[chType][x0][y0]>=tbWidth, CbHeight[chType][x0][y0]>=tbHeight. That is, according to an embodiment of the present invention, in the transform unit syntax structure of FIG. 28, the MTS index may be explicitly signaled only if both the width and height of the coding block, which is the root node, in the transform tree structure are less than or equal to a preset value. In addition, as an embodiment, the preset value may be 32. Accordingly, the encoder/decoder does not signal/parse the MTS index for the transform unit split according to the maximum size the condition of the luma transform block, and may set the MTS index to (or infer as) a preset value of 0. In this case, a DCT-II-based basic transform kernel may be applied to the horizontal direction and vertical direction.

In one embodiment, assuming that the luma maximum transform size is 64 and both ISP and SBT are not applied to the current block, when both the width and height of the coding block are 32 or less, the transform tree is not split, and the size of the transform unit may be determined to be the same as the size of the coding unit. In this case, both the width and height of the transform block are guaranteed to be 32 or less, and thus the decoder may parse the MTS index and determine/use the transform kernel according to the MTS index value.

In addition, in an embodiment, assuming that the luma maximum transform size is 32 and both ISP and SBT are not applied to the current block, if both the width and height of the coding block are 32 or less, the transform tree is not split, and the size of the transform unit may be determined to be the same as the size of the coding unit. Accordingly, both the width and height of the transform block are guaranteed to be 32 or less, and thus the decoder may parse the MTS index and determine/use the transform kernel according to the MTS index value. On the other hand, even if both the width and height of the transform block are 32 or less, if the width or height of the coding block is greater than 32, this indicates that it is a transform unit split according to the condition of the maximum size of the luma transform block, and thus the MTS index is not parsed and may be set to (or inferred as) a preset value. That is, even if the width and height of the transform block are both less than 32, if the width or height of the coding block is greater than 32, the MTS index is not parsed and may be set to (or inferred as) a preset value. The preset value may be 0, and in this case, a DCT-II-based basic kernel may be applied to both the horizontal direction and the vertical direction.

If the conditions i) to iv) and the conditions x), y), and z) described above are all true, in step S2805, an MTS index, which is a syntax element indicating a transform kernel (or transform type) applied to the horizontal and vertical directions of residual samples of the luma transform block, may be signaled and parsed. As an embodiment, if the MTS index does not exist, the MTS index may be set to (or inferred as) 0. This may represent that the preset basic kernel is applied to both the horizontal direction and the vertical direction, and the basic kernel may be a DCT-II-based integer kernel. The transform kernel applied to the horizontal direction and the vertical direction according to the MTS index may follow the method previously described in FIG. 14.

FIG. 29 is a diagram illustrating a transform unit syntax structure according to an embodiment of the present invention. For matters not described in the embodiment of FIG. 29, reference may be made to the content of FIG. 27 described above, and redundant descriptions thereof will be omitted. In the transform unit syntax structure of FIG. 29, a trafoDepth variable may be additionally received as an input. Here, trafoDepth is a variable representing the degree of splitting (or splitting depth) of a transform tree. For example, if trafoDepth is 0, it may represent that the transform tree is not split, and in this case, the size of the coding unit and the transform unit may be the same. If trafoDepth is greater than 0, it may represent that the transform tree is split by using the coding unit as a root node, and in this case, the coding unit may include a plurality of transform units. For the computation of trafoDepth, the transform tree syntax structure may also receive the trafoDepth variable as input, and if the transform tree syntax structure is executed for the first time, trafoDepth as 0 may be received as an input.

In the transform tree syntax structure previously described in FIG. 26, when IntraSubPartitionsSplitType is ISP_NO_SPLIT and cu_sbt_flag[x0][y0] is 0, if the transform tree is split according to the maximum size the condition of the luma transform block (i.e., tbWidth>MaxTbSizeY||tbHeight>MaxTbSizeY), the encoder/decoder may trafoDepth to trafoDepth+1 (i.e., (current splitting depth+1)) in performing a transform tree process (or syntax). On the other hand, when IntraSubPartitionsSplitType is ISP_NO_SPLIT and cu_sbt_flag[x0][y0] is 0, if the transform tree is not split (i.e., tbWidth<=MaxTbSizeY && tbHeight<=MaxTbSizeY), the transform unit syntax structure may be performed, and the encoder/decoder may set trafoDepth of the transform unit to trafoDepth (i.e., set equal to the current split depth). If the transform tree is split by applying SBT or ISP, in performing a transform unit processing process, the encoder/decoder may set trafoDepth to trafoDepth+1 ((current split depth+1)).

In step S2901 (i.e., the first the conditional statement), the decoder may check (or examine) a preset condition for determining whether or not to apply transform skip and/or MTS. As an example, if the following the conditions i), ii), iii), iv), and v) are all true, the decoder may respectively parse (S2903, S2905) transform skip and MTS information (i.e., syntax element) according to the second the conditional statement of step S2902 and the third the conditional statement of step S2904, which will be described later.

Condition i) tu_cbf_luma[x0][y0]==1: The decoder may check whether a value of tu_cbf_luma[x0][y0] is 1. If the value of tu_cbf_luma[x0][y0] is 0, it represents that all transform coefficients of the current luma transform block are 0, and thus the decoder may reconstruct the residual signal to zero without performing inverse quantization and inverse transform. Accordingly, if the value of tu_cbf_luma [x0][y0] is 0, transform skip and MTS information may not be signaled and parsed.

Condition ii) treeType!=DUAL_TREE_CHROMA: The decoder may check whether the tree type is a tree type including a luma transform block. Both transform skip and MTS may be applied only to the luma transform block, and thus if the current transform unit (or transform block) does not include the luma transform block, transform skip and MTS information may not be signaled and parsed. That is, if the tree type is DUAL_TREE_CHROMA, the current transform unit does not include the luma transform block, and thus transform skip and MTS information may not be signaled and parsed.

Condition iii) (tbWidth<=32) && (tbHeight<=32): The decoder may check whether the width and height of the current transform block are less than or equal to 32. The maximum size of the transform block to which transform skip and MTS may be applied is 32×32, and thus if both the width and height of the transform block are 32 or less, signaling and parsing of transform skip and MTS information may be performed according to additional the conditions.

Condition iv) IntraSubPartitionsSplitType[x0][y0]==ISP-_NO_SPLIT: The decoder may check whether ISP is not applied to the current coding unit (or coding block). If ISP is applied to the current coding unit, transform and inverse transform may be performed according to a preset method. Accordingly, if ISP is applied to the current coding unit, transform skip and MTS information may not be signaled and parsed. The IntraSubPartitionsSplitType represents the variable indicating the block splitting method by ISP. The IntraSubPartitionsSplitType may indicate the block splitting method by ISP according to ISP information signaled at the coding unit level. If IntraSubPartitionsSplitType is not ISP_NO_SPLIT, it may represent that ISP is applied to the current block. Accordingly, if IntraSubPartitionsSplitType is not ISP_NO_SPLIT, transform skip and MTS information may not be signaled and parsed.

Condition v) !cu_sbt_flag: The decoder may check whether sub-block transform (SBT) is not applied to the current coding unit. If SBT is applied to the current coding unit, transform and inverse transform may be performed according to a preset method. Accordingly, if SBT is applied to the current coding unit, transform skip and MTS information may not be signaled and parsed. The cu_sbt_flag represents a syntax element indicating whether SBT is applied to the current coding unit. The cu_sbt_flag may be signaled and parsed at the coding unit level. If cu_sbt_flag is 1, it may represent that SBT is applied to the current coding unit, and transform skip and MTS information may not be signaled and parsed.

If the conditions i) to v) described above are all true, in step S2902, the decoder may check (or examine) the following the conditions a), b), and c) for determining whether or not to apply the transform skip. As an example, if the following the conditions a), b), and c) are all true, transform skip-related information may be signaled and parsed. The conditions a), b), and c) may be defined to be the same as the conditions a), b), and c) previously described in FIG. 27.

In step S2903, if the conditions i) to v) and the conditions a), b), and c) described above are all true, transform_skip_flag[x0][y0], which is a syntax element indicating whether the transform skip is applied to the current luma transform block, may be signaled and parsed. If transform_skip_flag[x0][y0] is 1, it may represent that the transform is not applied to the current luma transform block. If transform_skip_flag[x0][y0] is 0, it may represent that transform is applied to the current luma transform block. If transform_skip_flag[x0][y0] does not exist (i.e., is not explicitly signaled), a value of transform_skip_flag[x0][y0] may be set (or inferred) according to BdpcmFlag[x0][y0]. If BdpcmFlag[x0][y0] is 1, the transform_skip_flag[x0][y0] may be set to (or inferred as) 1, and if BdpcmFlag[x0][y0] is 0, the transform_skip_flag[x0][y0] may be set to (or inferred as) 0.

According to an embodiment of the present invention, even if the transform tree is split into multiple transform units according to the maximum size the condition of the luma transform block (i.e., implicitly split on the basis of the luma transform maximum size), if all of the conditions i) to v) and the conditions a), b), and c) are satisfied, the decoder may parse transform_skip_flag[x0][y0] and also apply transform skip to the split transform units depending on the value of transform_skip_flag[x0][y0].

When the conditions i) to v) described above are all true, if the following the conditions x), y), and z) are all true (S2904), MTS-related information may be signaled and parsed (S2905).

Condition x) (CuPredMode[chType][x0][y0]!=MODE_INTER && sps_explicit_mts_inter_enabled_flag)||(CuPredMode[chType][x0][y0]==MODE_INTRA && sps_explicit_mts_intra_enabled_flag): The decoder may check whether or not a preset condition is satisfied on the basis of the prediction mode of the current block and whether or not explicit MTS is available. A method of prediction (i.e., a prediction mode) may be determined at the coding unit level, and a variable CuPredMode[chType][x0][y0] may be set on the basis of information received at the coding unit level. The prediction mode includes intra prediction and inter prediction. Additionally, the prediction mode may include intra block copy (IBC) prediction for generating a prediction block from a reconstructed region in the current picture. If CuPred[chType] Mode[x0][y0] is MODE_INTRA, it may represent that the current block is coded with intra prediction, and if CuPred[chType] Mode[x0][y0] is MODE_INTER, it may represent the current block is coded with inter prediction. In addition, if CuPred[chType] Mode[x0][y0] is MODE_IBC, it may represent that the current block is coded with IBC prediction.

Meanwhile, the flag indicating whether or not MTS is available may be signaled and parsed by being included in at least one of high level syntax such as the picture parameter set (PPS), sequence parameter set (SPS), video parameter set (VPS), tile group header, and slice header. Specifically, whether or not MTS is available for the prediction method may be independently indicated. If sps_explicit_mts_inter_enabled_flag is 1, it represents that an MTS index (in this specification, it may be referred to as tu_mts_idx, mts_idx), which is a syntax element indicating a transform kernel for an inter predicted coding unit, may exist in the transform unit syntax, and whether or not to apply MTS may be indicated depending on the MTS index at the transform unit level. If sps_explicit_mts_inter_enabled_flag is 0, it represents that the MTS index may not exist (i.e., not explicitly signaled) in the transform unit syntax for the inter predicted coding unit, which means that MTS may not be applied to inter predicted blocks. In other words, if sps_explicit_mts_inter_enabled_flag is 0, it represents that the MTS index is not signaled to the inter predicted coding unit, and if the MTS index does not exist, its value may be inferred as 0. If MTS is not applied, a preset transform kernel may be used, which may be a DCT-II-based transform kernel. If sps_explicit_mts_intra_enabled_flag is 1, it represents that the MTS index may exist in the transform unit syntax for the intra-predicted coding unit, and whether or not to apply MTS may be indicated depending on the MTS index at the transform unit level. If sps_explicit_mts_intra_enabled_flag is 0, it represents that the MTS index may not exist in the transform unit syntax (not explicitly signaled) for the intra-predicted coding unit. In other words, if sps_explicit_mts_intra_enabled_flag is 0, it represents that the MTS index is not signaled to the intra-predicted coding unit, and if the MTS index does not exist, its value may be inferred as 0. If MTS is not applied, a preset transform kernel may be used, which may be a DCT-II-based transform kernel.

If the current block is coded with intra prediction, and MTS is available for intra prediction through high level syntax signaling (i.e., CuPred[chType] Mode[x0][y0]==MODE_INTRA && sps_explicit_mts_intra_enabled_flag) or if the current block is coded with inter prediction and MTS is available for inter prediction through high level syntax signaling (CuPredMode[chType][x0][y0]!=MODE_INTRA && sps_explicit_mts_inter_enabled_flag), the condition x) may be true. That is, in the condition x), if the corresponding MTS enabled flag is on in the high level syntax according to the prediction mode (that is, according to the CuPred[chType] Mode[x0][y0] variable), MTS-related information may be signaled and parsed.

Condition y) !transform_skip_flag[x0][y0]: The decoder may check whether transform skip is not applied to the current transform block. If the transform skip is applied to the current transform block, transform is not applied, and thus MTS-related information may not be signaled and parsed.

Condition z) trafoDepth==0: The decoder may check whether trafoDepth is 0. The trafoDepth is a variable representing the degree of splitting (or splitting depth) of a transform tree. If trafoDepth is 0, it may represent that the size of the coding unit and the size of transform unit are the same. On the other hand, if trafoDepth is greater than 0, it may represent that transform tree splitting is performed by using the coding unit as a root node, and in this case, the coding unit and the transform unit may have different sizes. According to an embodiment of the present invention, in the transform unit syntax structure of FIG. 29, the MTS index may be signaled only if trafoDepth is 0. The decoder does not signal an MTS index for a transform unit split according to the maximum size the condition of the luma transform block, and may set the MTS index to a preset value of 0. In this case, the decoder may perform transform using a DCT-II-based basic kernel to the horizontal and vertical directions.

In one embodiment, assuming that the luma maximum transform size is 64 and both ISP and SBT are not applied to the current block, if the width and height of the coding block are both 32 or less, the transform tree is not split, and the trafoDepth variable may always be 0. In this case, the decoder may parse the MTS index, and determine/use a transform kernel according to the MTS index value.

In addition, in one embodiment, assuming that the luma maximum transform size is 32 and both ISP and SBT are not applied to the current block, if both the width and the height of the coding block are 32 or less, whether or not to parse the MTS index may be determined depending on trafoDepth. If trafoDepth is 0, the transform tree is not split, and the size of the transform unit may be determined to be the same as the size of the coding unit. In this case, the decoder may parse the MTS index and determine/use a transform kernel according to the MTS index value. On the other hand, if trafoDepth is not 0, it may represent that the transform tree is split according to the maximum size the condition of the luma transform block by using the coding unit as the root node, and the MTS index is not parsed and may be set to (or inferred as) a preset value. The preset value may be 0, and in this case, a DCT-II-based basic kernel may be applied to both the horizontal direction and the vertical direction.

If the conditions i) to v) and the conditions x), y), and z) are all true, in step S2905, an MTS index, which is a syntax element indicating which transform kernel is applied to the horizontal and vertical directions of the residual samples of the luma transform block, may be signaled and parsed. As an embodiment, if the MTS index does not exist, the MTS index may be set to (or inferred as) 0. This may represent that the preset basic kernel is applied to both the horizontal direction and the vertical direction, and the basic kernel may be a DCT-II-based integer kernel. The transform kernel applied to the horizontal direction and the vertical direction according to the MTS index may follow the method previously described in FIG. 14.

Figure 30:
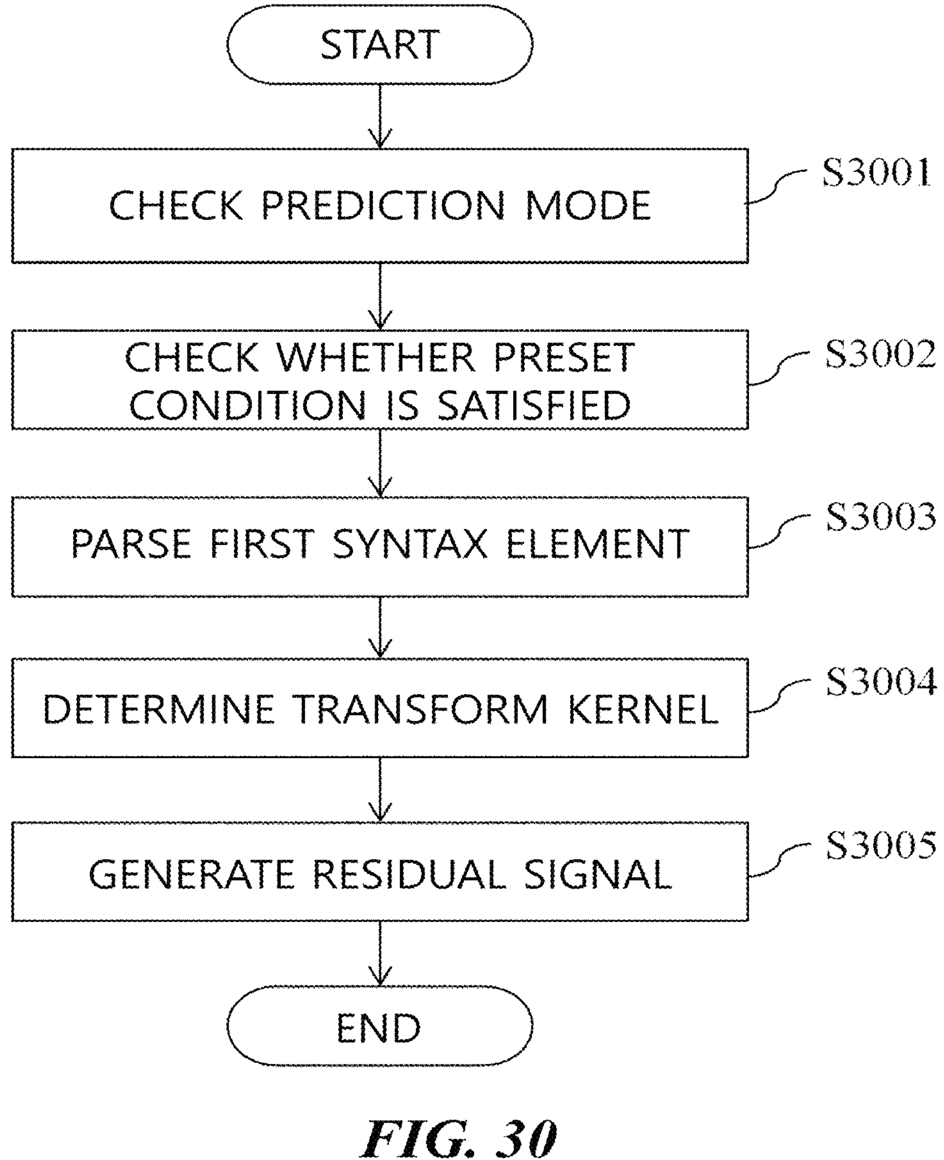
FIG. 30 is a flowchart representing a video signal processing method according to an embodiment of the present invention.

FIG. 30 is a flowchart representing a video signal processing method according to an embodiment of the present invention. Referring to FIG. 30, a decoder is mainly described for convenience of description, but the present invention is not limited thereto, and the video signal processing method according to the present embodiment may also be applied to an encoder in substantially the same way.

The decoder checks a prediction mode applied to the current coding unit (S3001).

The decoder checks whether a plurality of preset conditions are satisfied on the basis of at least one of a prediction mode of the current coding unit or a size of the current coding unit (S3002).

If the plurality of preset conditions are satisfied, the decoder parses a first syntax element indicating a transform kernel applied to a transform unit included in the current coding unit (S3003).

The decoder determines a transform kernel applied to the horizontal and vertical directions of the current transform unit on the basis of the first syntax element (S3004).

The decoder generates a residual signal of the current transform unit by performing inverse transform on the current transform unit using the determined transform kernel (S3005).

As described above, if the plurality of preset conditions are not satisfied, the first syntax element may be inferred as 0.

In addition, as described above, if the first syntax element is 0, the transform kernel applied to the horizontal and vertical directions of the current transform unit may be determined as a discrete cosine transform Type-2 (DCT-2)-based transform kernel.

In addition, as described above, in the case of an intra mode, the decoder may obtain a second syntax element indicating whether a multiple transform selection (MTS) mode may be used in the current sequence. Here, the MTS mode represents a mode in which transform is performed using a transform kernel selected from among a plurality of transform kernels. In addition, in the case of an inter mode, the decoder may obtain a third syntax element indicating whether the MTS mode may be used in the current sequence.

In addition, as described above, the plurality of preset conditions may include whether the prediction mode of the current coding unit is an intra mode and the second syntax element is true, or the prediction mode of the current coding unit is an inter mode and the third syntax element is true.

In addition, as described above, if the prediction mode of the current coding unit is an intra block copy mode, the plurality of preset conditions may be determined as being not satisfied regardless of the second syntax element and the third syntax element.

In addition, as described above, the plurality of preset conditions may include whether or not a width and height of the current coding unit are less than or equal to 32.

In addition, as described above, a step of receiving information on the luma maximum transform size of the current sequence may be further included, and if at least one of the width and height of the current coding unit is greater than the luma maximum transform size, the current coding unit may be split into a plurality of transform units.

In addition, as described above, the luma maximum transform size may be 32 or 64.

In addition, as described above, if the current coding unit includes the plurality of transform units split on the basis of the luma maximum transform size, the plurality of preset conditions may be determined as being not satisfied.

The above-described embodiments of the present invention may be implemented through various means. For example, embodiments of the present invention may be implemented by hardware, firmware, software, or a combination thereof.

In the case of implementation by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code may be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

What is claimed is:

1. A video signal decoding device comprising a processor, wherein the processor is configured to:

when a preset condition for parsing a first syntax element is satisfied, parse the first syntax element from a bitstream, determine a value of the first syntax element to be a first value among a plurality of values, the first value being any one among the plurality of values, determine a first horizontal transform kernel indicated by the first value among a plurality of transform kernels to be applied to a horizontal direction of a transform block and a first vertical transform kernel indicated by the first value among the plurality of transform kernels to be applied to a vertical direction of the transform block, and obtain a residual signal of the transform block by inverse-transformation using the first horizontal transform kernel and the first vertical transform kernel, and when the preset condition is not satisfied, determine the value of the first syntax element to be a second value among the plurality of values without parsing the first syntax element from the bitstream, determine a second horizontal transform kernel indicated by the second value among the plurality of transform kernels to be applied to the horizontal direction of the transform block and a second vertical transform kernel indicated by the second value among the plurality of transform kernels to be applied to the vertical direction of the transform block, and obtain the residual signal of the transform block by inverse-transformation using the second horizontal transform kernel and the second vertical transform kernel, the second horizontal transform kernel and the second vertical transform kernel being the same transform kernel, wherein the preset condition includes whether prediction mode of a current coding block is an intra mode and a second syntax element is true, or whether the prediction mode of the current coding block is an inter mode and a third syntax element is true, wherein the value of the first syntax element indicates a kernel set among a plurality of kernel sets, the kernel set comprising a horizontal transform kernel and a vertical transform kernel, the horizontal transform kernel being one of the plurality of transform kernels and the vertical transform kernel being one of the plurality of transform kernels, wherein the second syntax element indicates whether the first syntax element exists or not in the bitstream for a coding block with an intra mode in a current sequence, wherein the third syntax element indicates whether the first syntax element exists or not in the bitstream for a coding block with an inter mode in the current sequence, wherein when a width of the transform block or a height of the transform block is greater than a defined value, it is determined that the preset condition is not satisfied, and wherein when the prediction mode of the current coding block is an Intra Block Copy (IBC) mode, it is determined that the preset condition is not satisfied.

2. A video signal encoding device comprising a processor, wherein the processor is configured to:

generate a bitstream encoded by an encoder using an encoding method, wherein the encoding method comprises:

when a preset condition for encoding a first syntax element is satisfied, perform transformation on a residual signal of a transform block of a current coding block using a first horizontal transform kernel applied to a horizontal direction of the transform block and a first vertical transform kernel applied to a vertical direction of the transform block, and encode the first syntax element into the bitstream, wherein a value of the first syntax element is determined to be a first value among a plurality of values, the first value being any one among the plurality of values, and the first value of the first syntax element indicates the first horizontal transform kernel among a plurality of transform kernels and the first vertical transform kernel among the plurality of transform kernels, and when the preset condition is not satisfied, perform transformation on the residual signal of the transform block of the current coding block using a second horizontal transform kernel applied to the horizontal direction of the transform block and a second vertical transform kernel applied to the vertical direction of the transform block, and determine the value of the first syntax element to be a second value among the plurality of values without encoding the first syntax element, wherein the second value of the first syntax element indicates the second horizontal transform kernel among the plurality of transform kernels and the second vertical transform kernel among the plurality of transform kernels, and the second horizontal transform kernel and the second vertical transform kernel are the same transform kernel, wherein the preset condition includes whether a prediction mode of the current coding block is an intra mode and a second syntax element is true, or whether the prediction mode of the current coding block is an inter mode and a third syntax element is true, wherein the value of the first syntax element indicates a kernel set among a plurality of kernel sets, the kernel set comprising a horizontal transform kernel and a vertical transform kernel, the horizontal transform kernel being one of the plurality of transform kernels and the vertical transform kernel being one of the plurality of transform kernels, wherein the second syntax element indicates whether the first syntax element exists or not in the bitstream for a coding block with an intra mode in a current sequence, wherein the third syntax element indicates whether the first syntax element exists or not in the bitstream for a coding block with an inter mode in the current sequence, wherein when a width of the transform block or a height of the transform block is greater than a defined value, it is determined that the preset conditions is not satisfied, and wherein when the prediction mode of the current coding block is an Intra Block Copy (IBC) mode, it is determined that the preset condition is not satisfied.

3. A method of storing a bitstream into a non-transitory computer-readable medium, the bitstream being generated by a video signal encoding device of claim 2.

* * * * *